Figure 1:
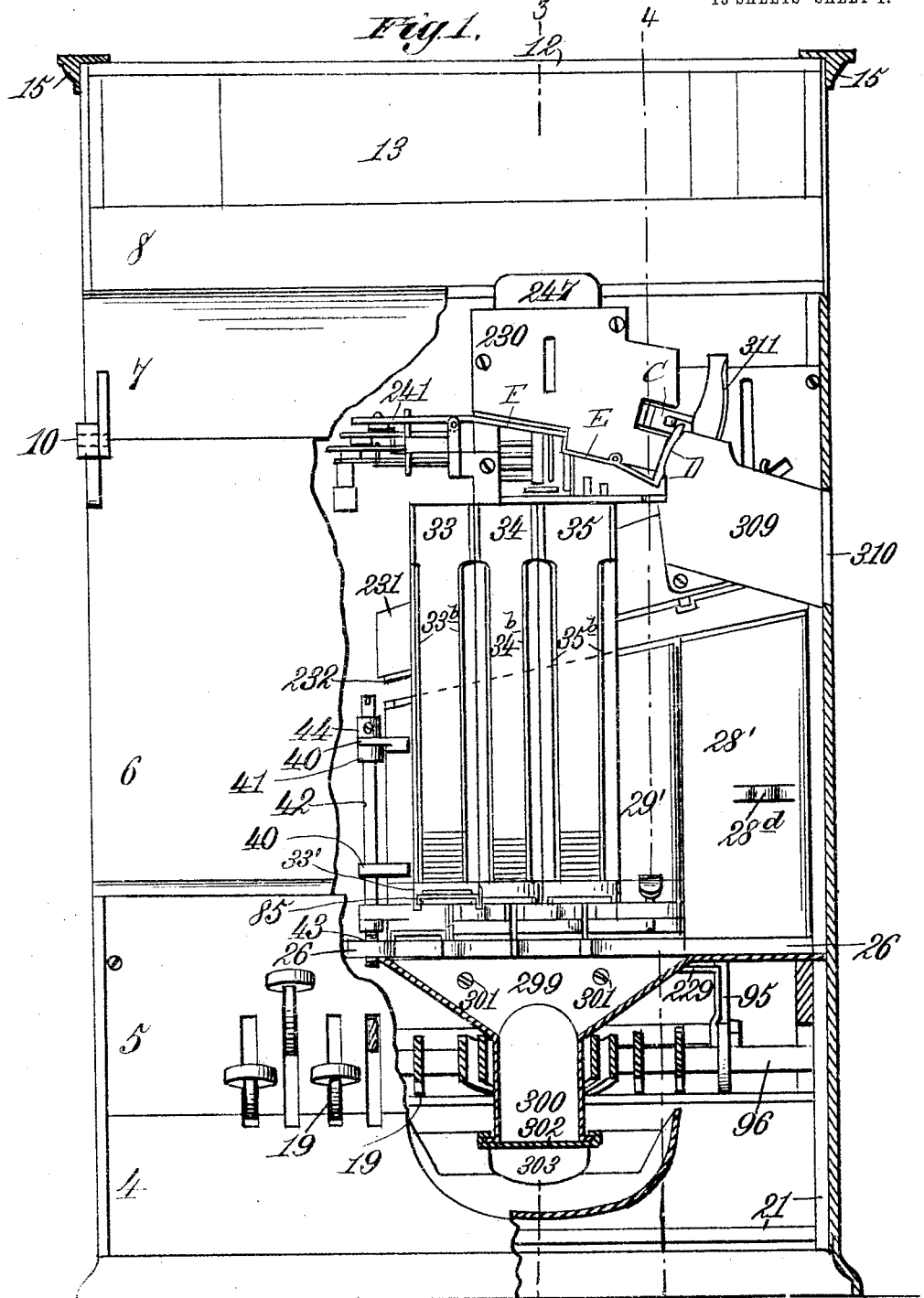

No. 802,829. PATENTED OCT. 24, 1905.
E. H. SPEAR.
COMBINED CASH REGISTER, CHANGE MAKER, CHANGE DELIVERER,
AND PURCHASE CHECK DISCHARGING MACHINE.
APPLICATION FILED AUG. 15, 1904.

13 SHEETS—SHEET 1.

Witnesses.
Robert Everett,
James L. Norris, Jr.

Inventor:
Edwin H. Spear.
By James L. Norris
Atty.

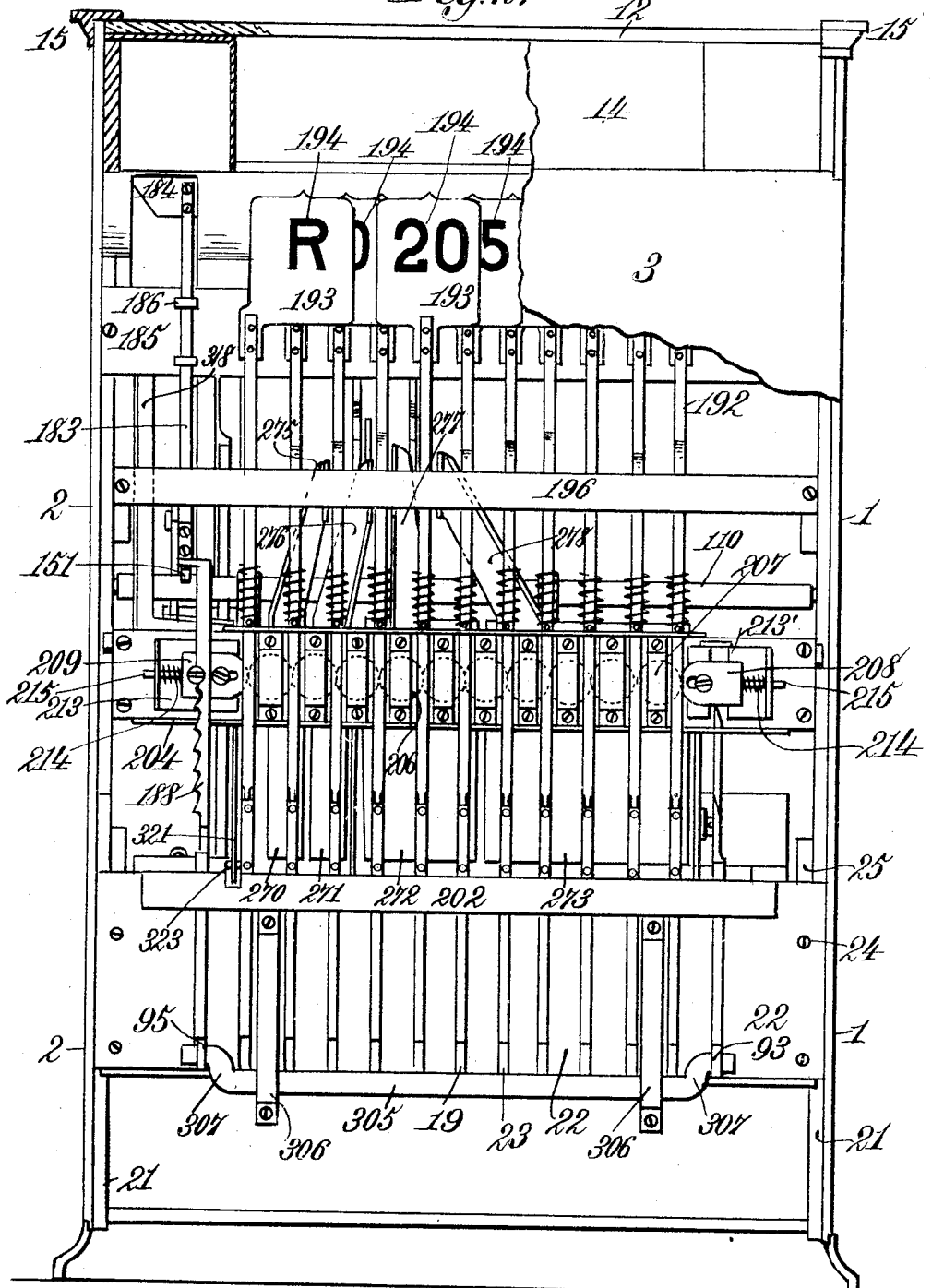

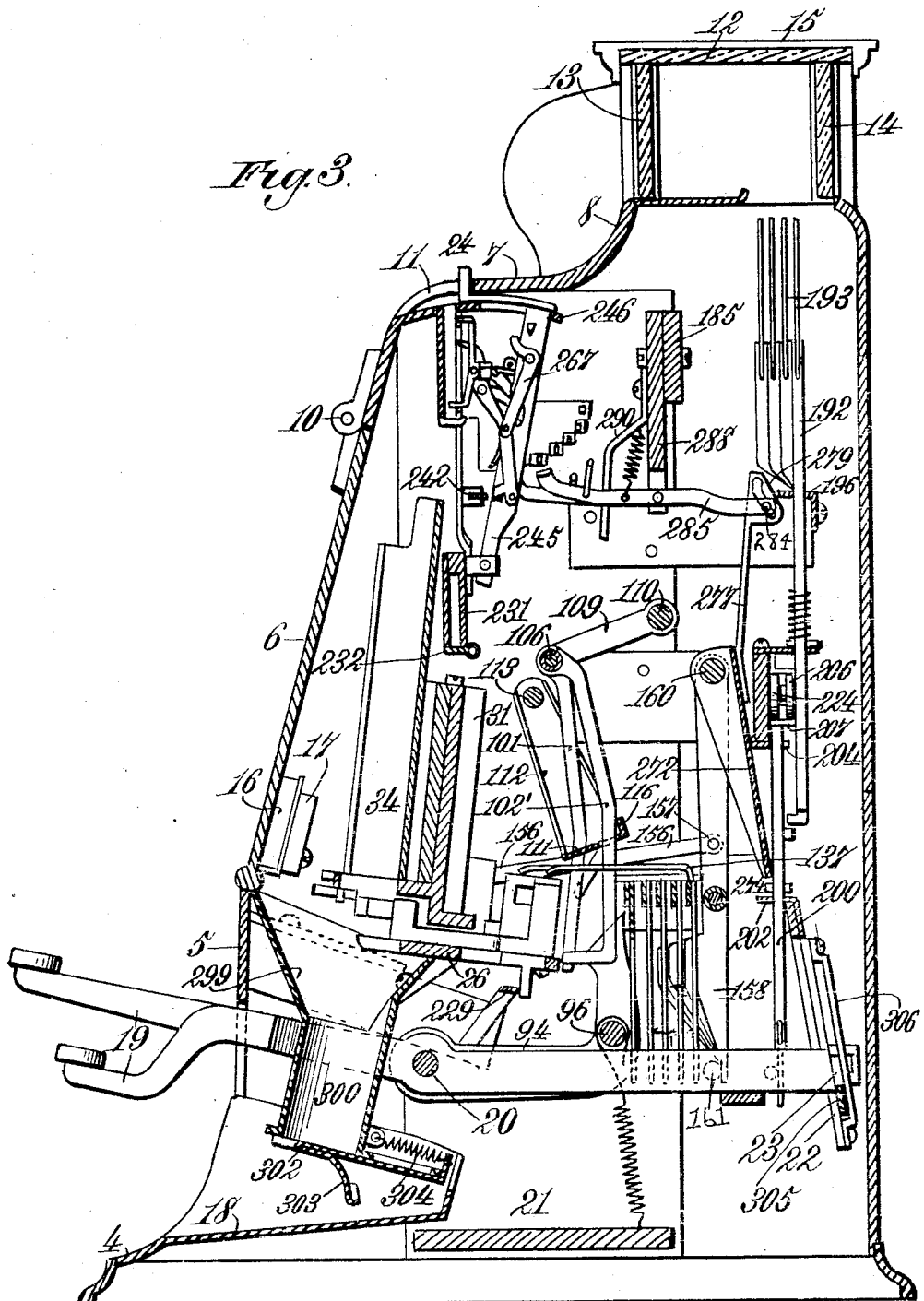

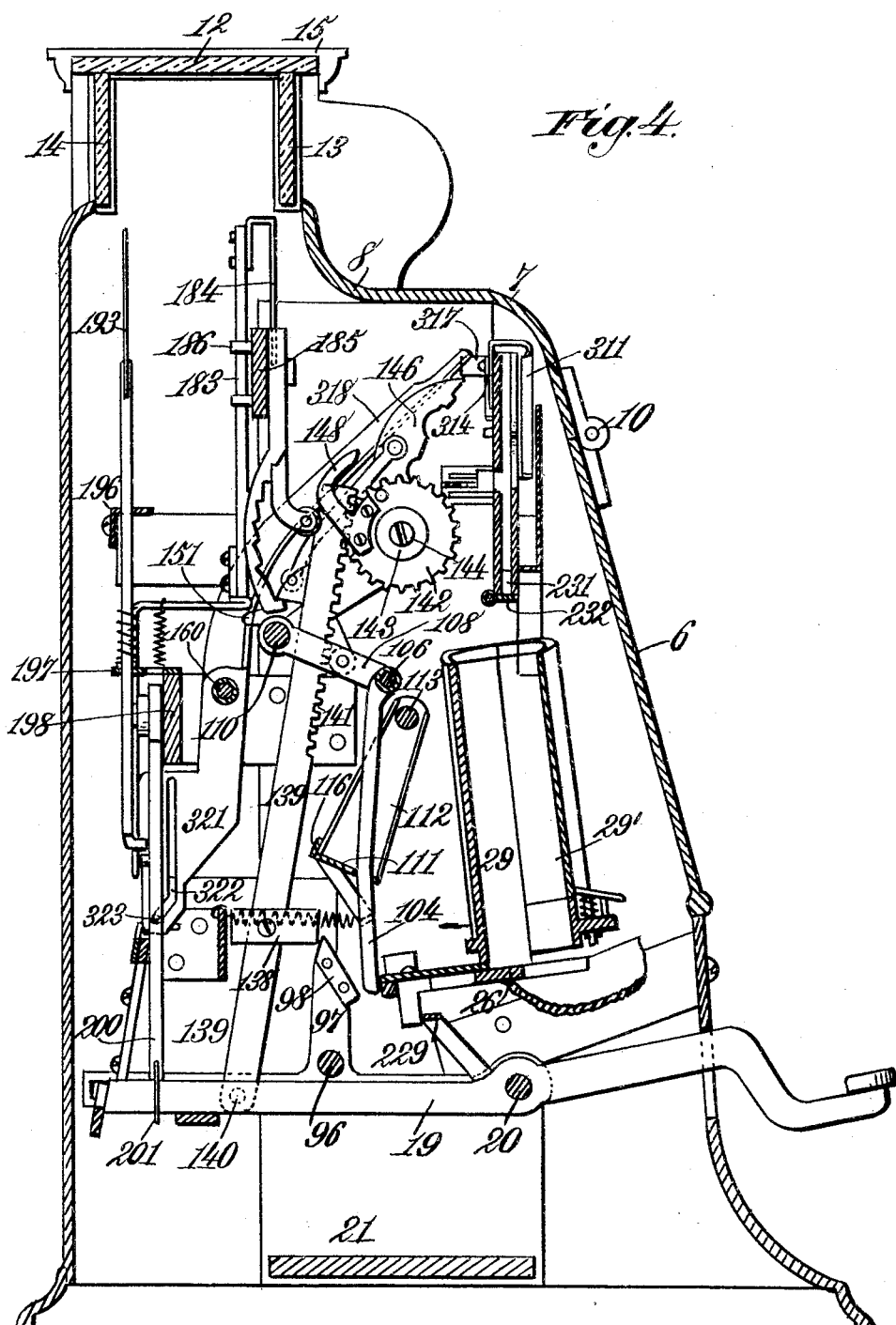

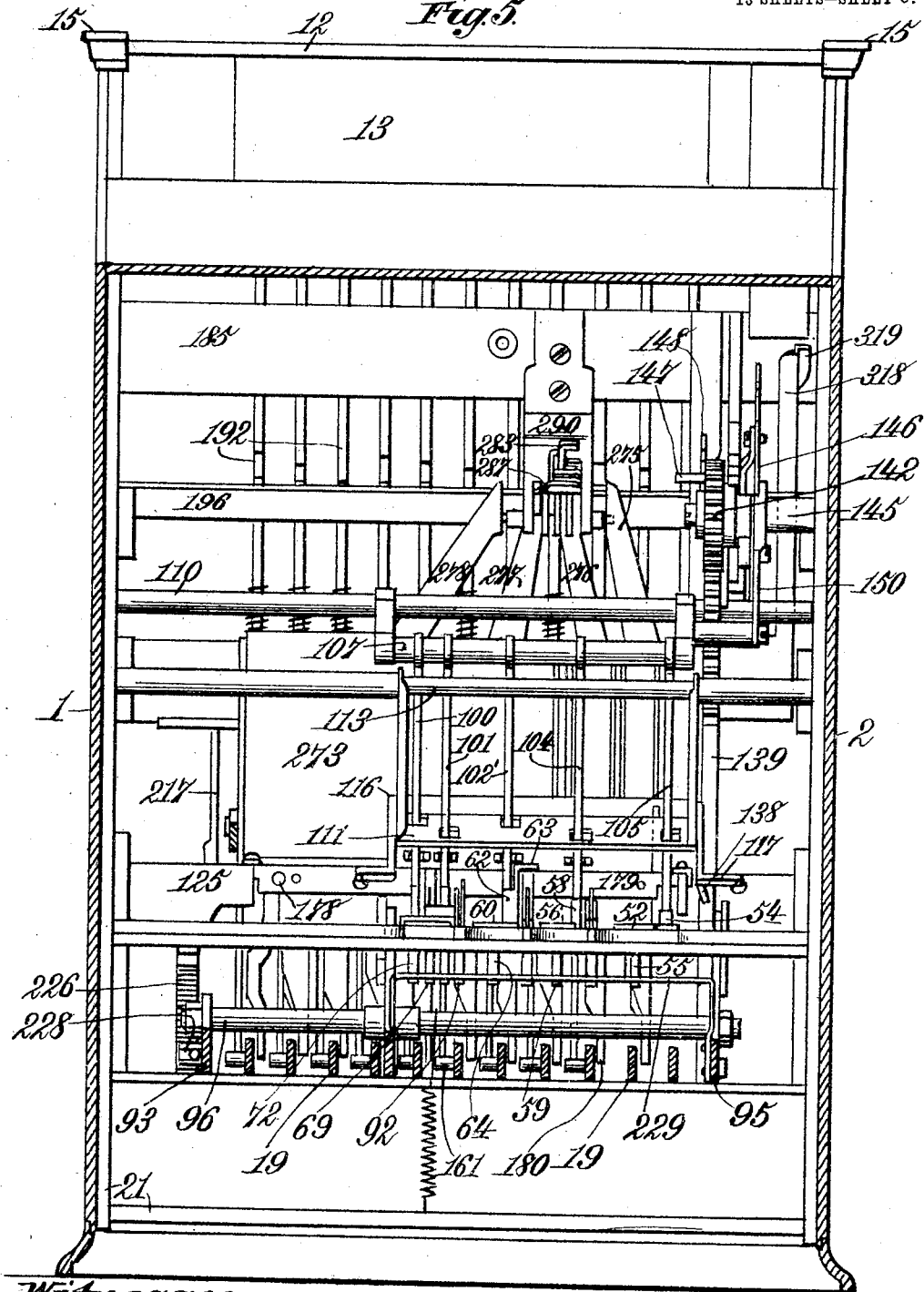

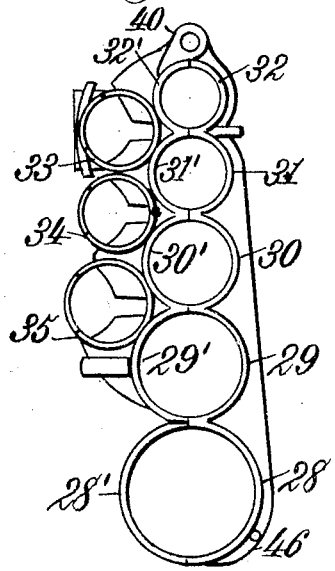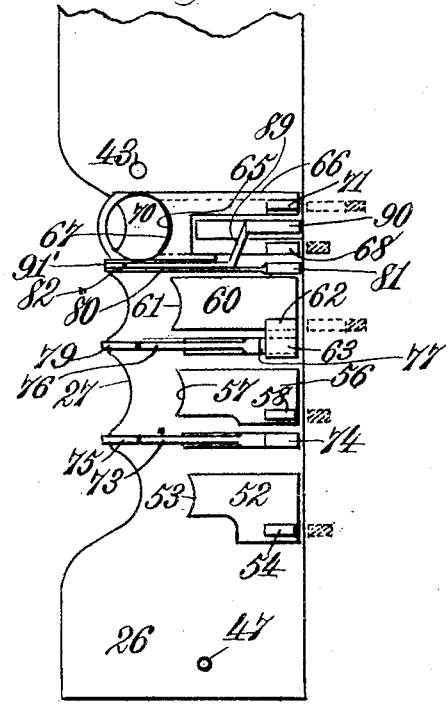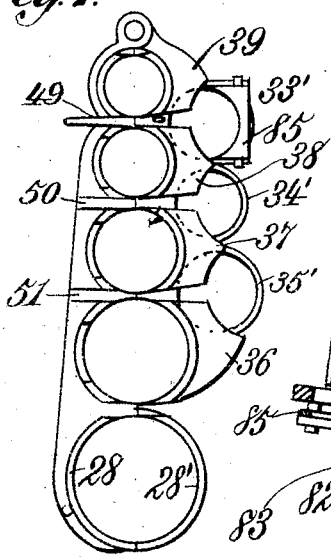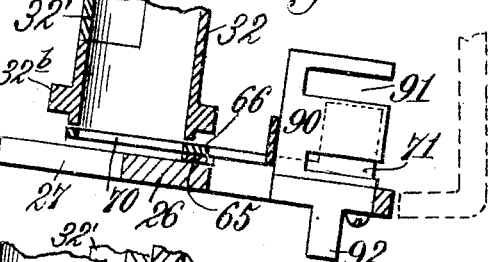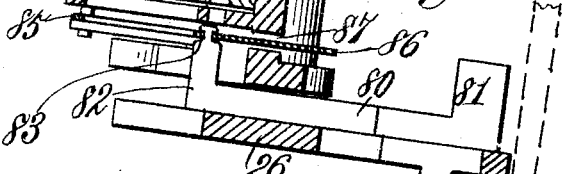

No. 802,829. PATENTED OCT. 24, 1905.
E. H. SPEAR.
COMBINED CASH REGISTER, CHANGE MAKER, CHANGE DELIVERER,
AND PURCHASE CHECK DISCHARGING MACHINE.
APPLICATION FILED AUG. 15, 1904.
13 SHEETS—SHEET 7.
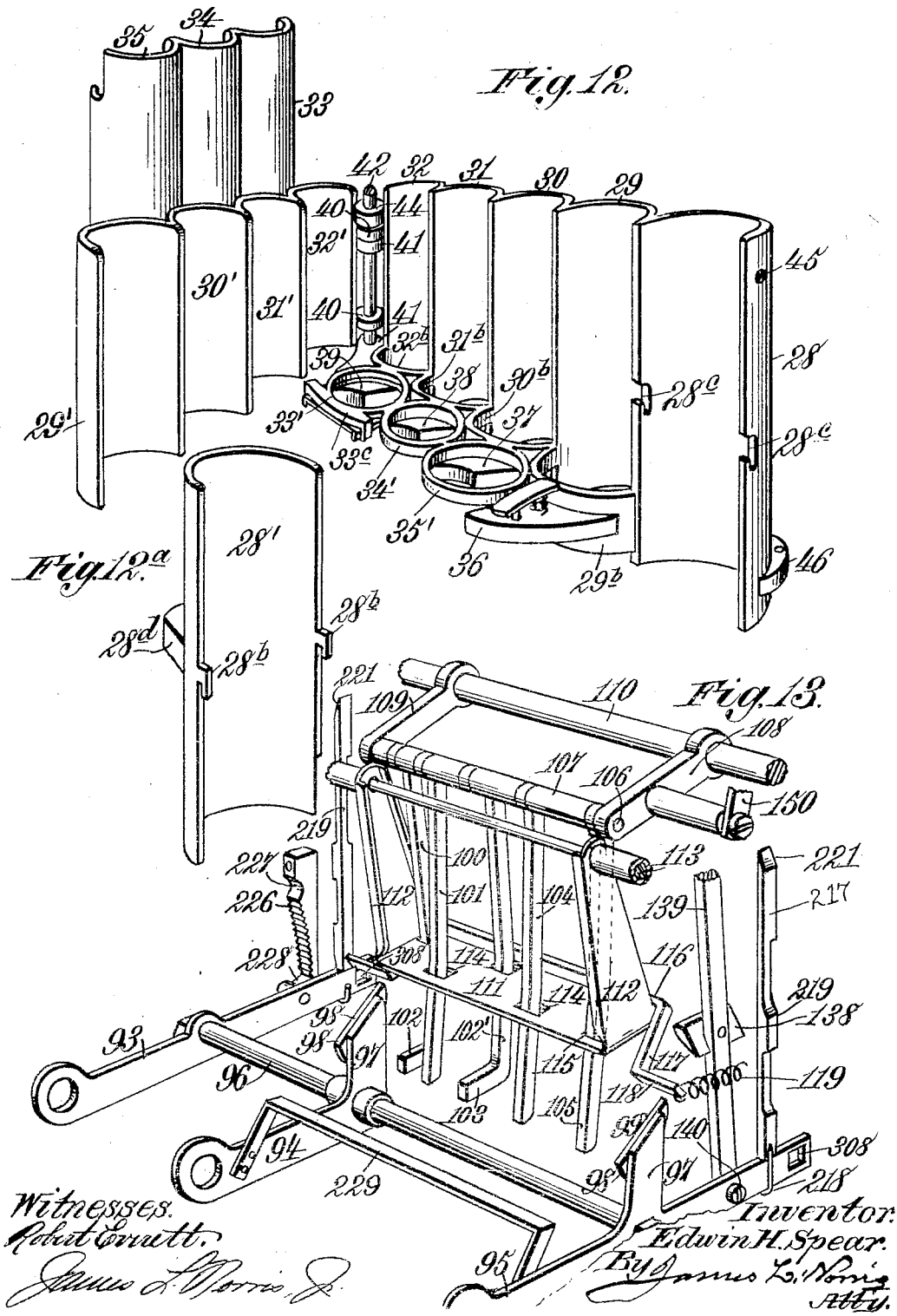

No. 802,829. PATENTED OCT. 24, 1905.
E. H. SPEAR.
COMBINED CASH REGISTER, CHANGE MAKER, CHANGE DELIVERER,
AND PURCHASE CHECK DISCHARGING MACHINE.
APPLICATION FILED AUG. 15, 1904.
13 SHEETS—SHEET 8.
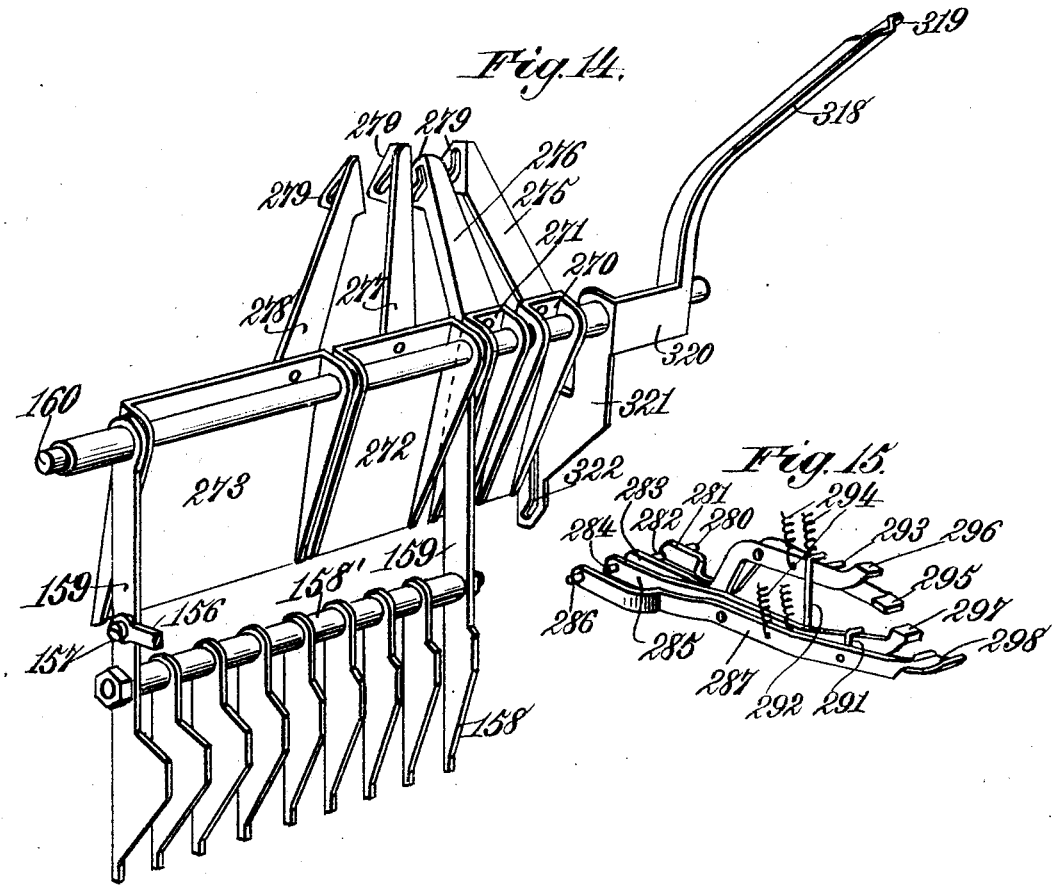
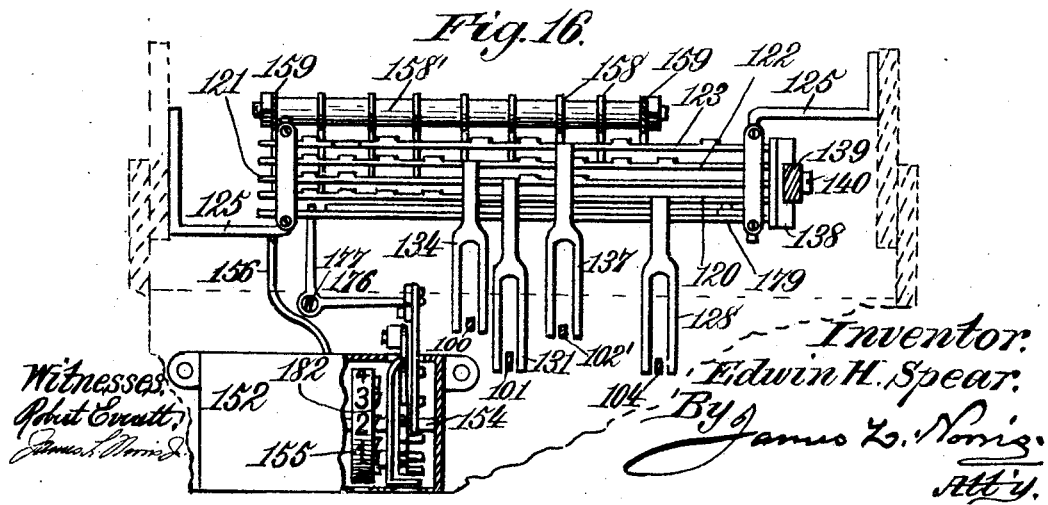

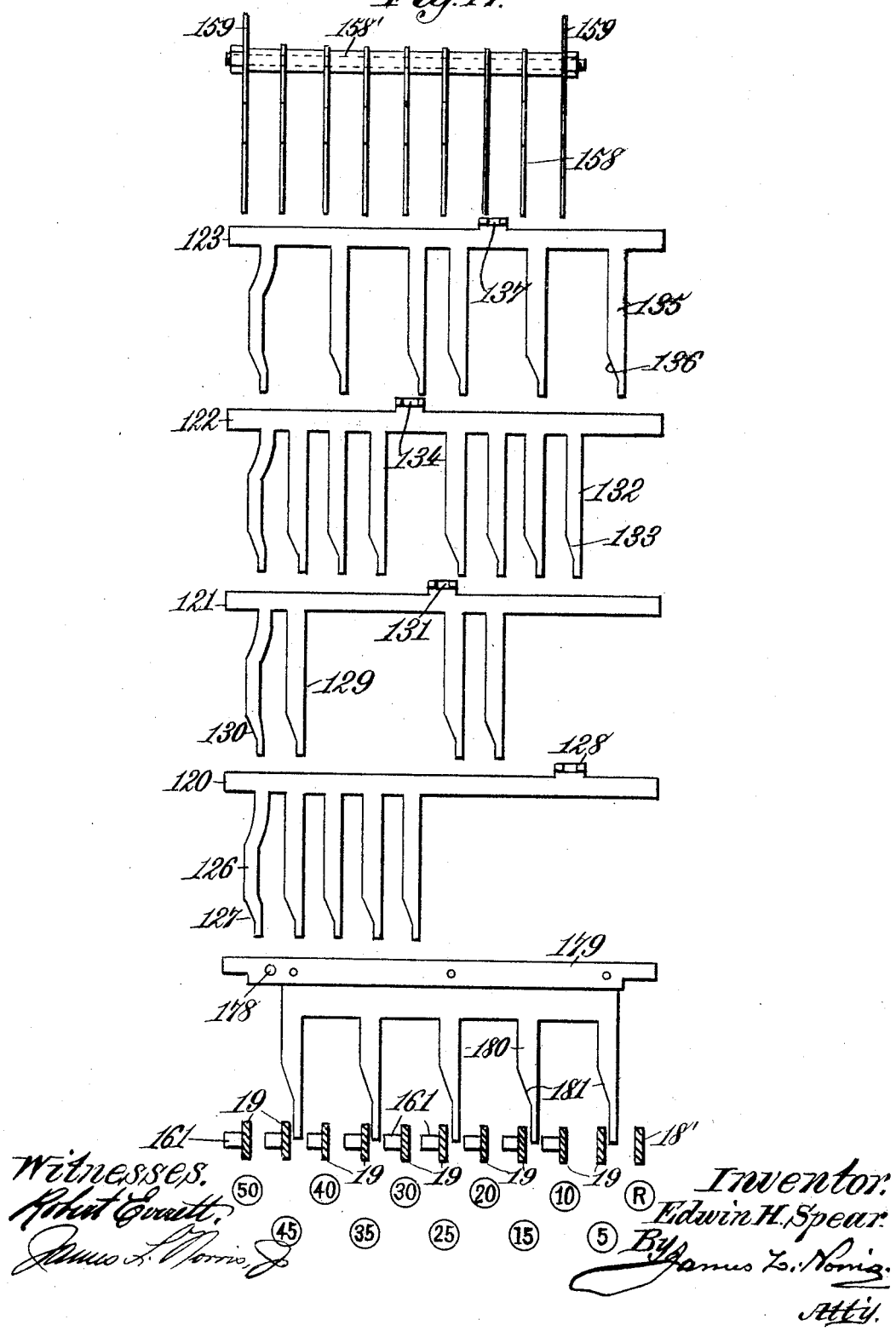

No. 802,829. PATENTED OCT. 24, 1905.
E. H. SPEAR.
COMBINED CASH REGISTER, CHANGE MAKER, CHANGE DELIVERER,
AND PURCHASE CHECK DISCHARGING MACHINE.
APPLICATION FILED AUG. 15, 1904.
13 SHEETS—SHEET 10.
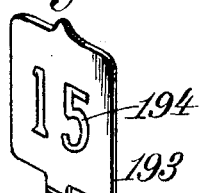
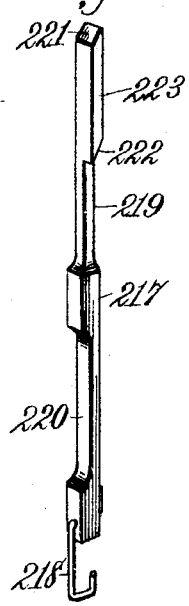
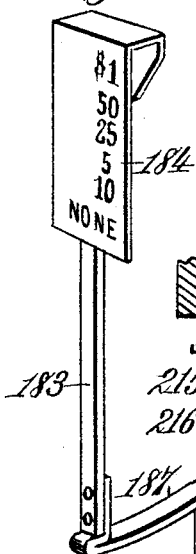
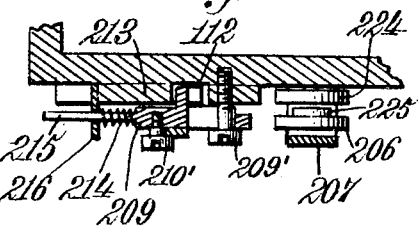
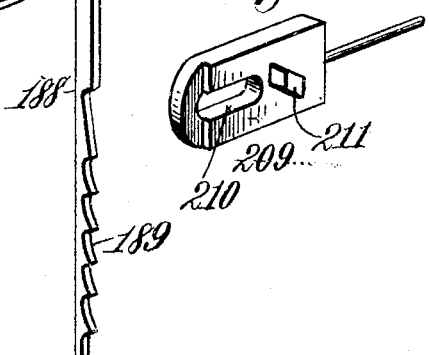
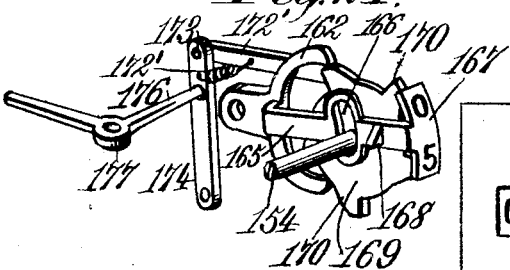
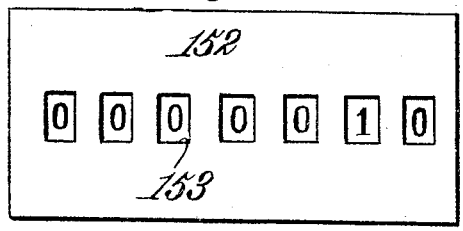
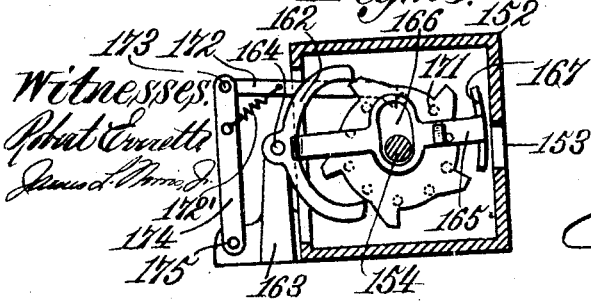
Witnesses
Inventor:
Edwin H. Spear.
By James L. Norris.
Atty.

No. 802,829. PATENTED OCT. 24, 1905.
E. H. SPEAR.
COMBINED CASH REGISTER, CHANGE MAKER, CHANGE DELIVERER,
AND PURCHASE CHECK DISCHARGING MACHINE.
APPLICATION FILED AUG. 15, 1904.
13 SHEETS—SHEET 11.
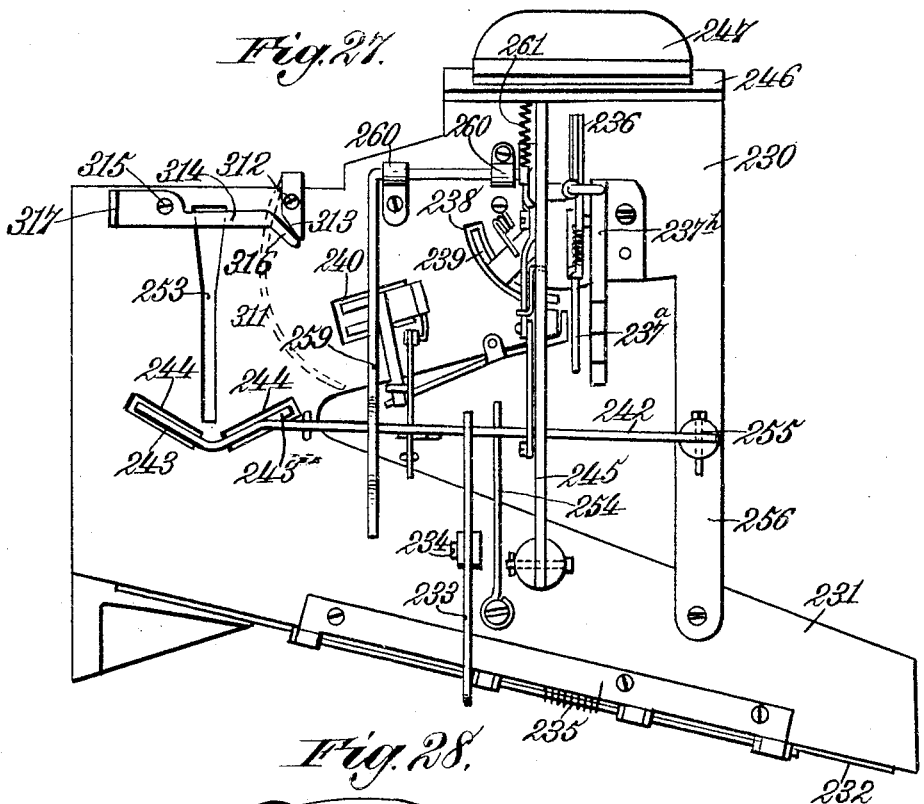

No. 802,829. PATENTED OCT. 24, 1905.
E. H. SPEAR.
COMBINED CASH REGISTER, CHANGE MAKER, CHANGE DELIVERER,
AND PURCHASE CHECK DISCHARGING MACHINE.
APPLICATION FILED AUG. 15, 1904.
13 SHEETS—SHEET 12.
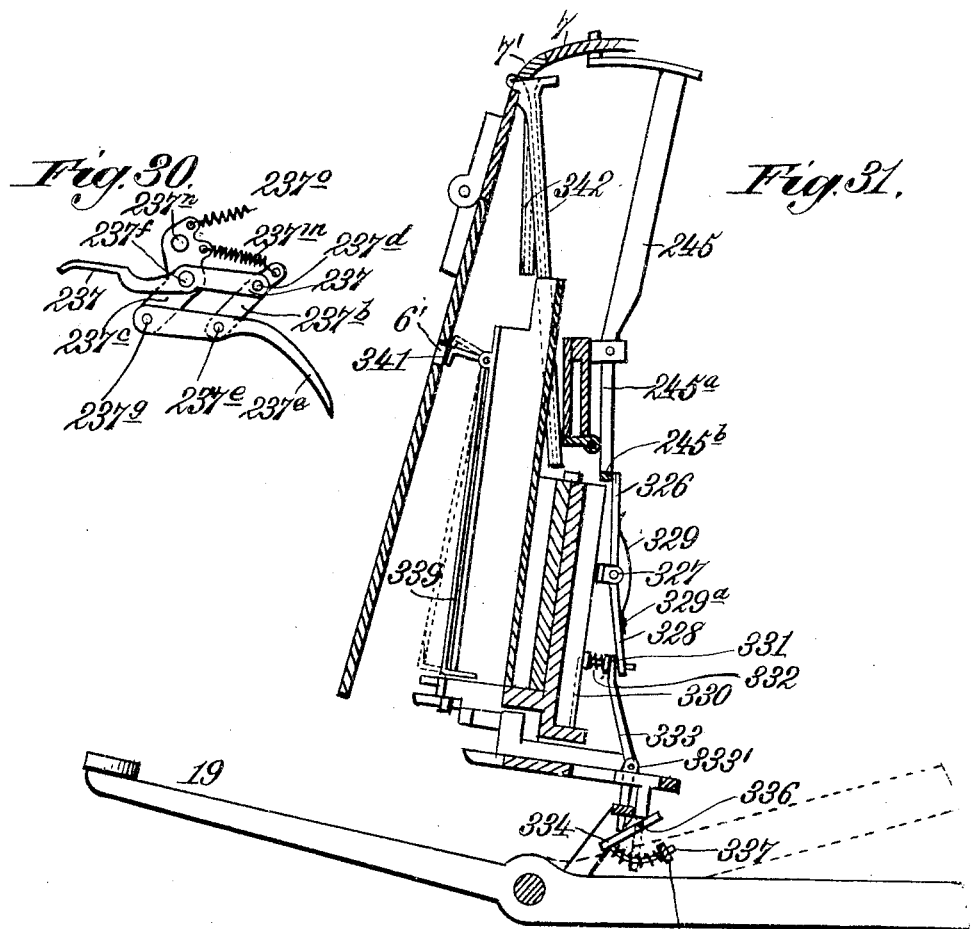
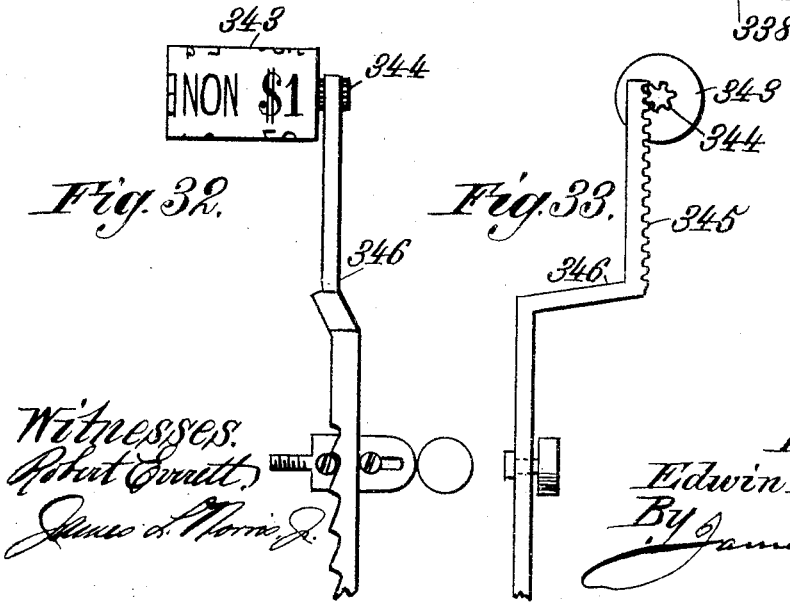
Witnesses.
Inventor.
Edwin H. Spear,
By James L. Norris.
Atty.

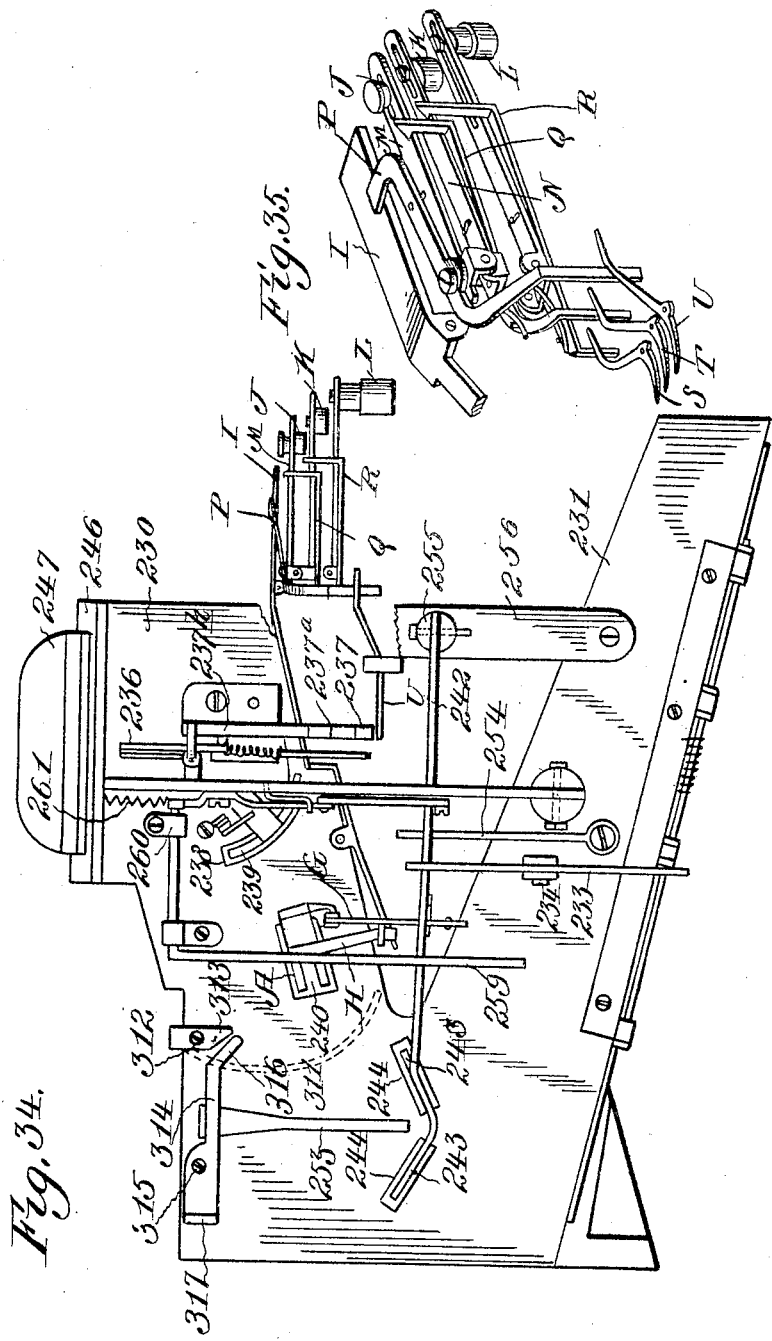

UNITED STATES PATENT OFFICE.

EDWIN HUDSON SPEAR, OF NEW YORK, N. Y.

COMBINED CASH-REGISTER, CHANGE-MAKER, CHANGE-DELIVERER, AND PURCHASE-CHECK-DISCHARGING MACHINE.

No. 802,829.   Specification of Letters Patent.   Patented Oct. 24, 1905.

Application filed August 15, 1904. Serial No. 220,853.

*To all whom it may concern:*

Be it known that I, EDWIN HUDSON SPEAR, a citizen of the United States, residing at New York, in the county of New York and State of New York, have invented new and useful Improvements in a Combined Cash-Register, Change-Maker, Change-Deliverer, and Purchase-Check-Discharging Machine, of which the following is a specification.

This invention relates to a combined cash-register, change-maker, change-deliverer, and purchase-check-discharging machine.

The machine is what may be termed a "mechanical cashier," and is adapted for use in connection with soda-fountains, ice-cream parlors, restaurants, and other places of business wherein the purchasing and the payment of the refreshments, articles, and the like from the attendant, waiter, or clerk is done by checks obtained from a cashier by the customer tendering cash in payment for the checks received when the customer enters the place of business. The machine, which is hereinafter more specifically referred to, acts as the cashier and receives the cash, automatically discharges the amount of change when necessary, automatically discharges the necessary purchase check or checks when the cash therefor is inserted in the machine, registers the total amount of cash received for the purchase-checks delivered, indicates the value of the purchase check or checks delivered at each operation of the machine, indicates the amount of cash inserted in the machine when it is desired to have a check or checks delivered, and detects and discharges any counterfeit coins inserted, so that the machine cannot be tampered with or beaten.

Primarily the invention aims to provide a machine of the character referred to with means controlled by the diameter of the coin inserted for delivering a purchase-check of the same value as the coin inserted or for delivering a purchase check or checks of the value desired and the difference in cash between the value of the coin inserted and the value of the purchase check or checks desired if the coin is of greater value than the purchase check or checks, said delivery of the cash change being simultaneous with the delivery of the purchase check or checks.

The invention further aims to construct a combined cash-register, change-maker, change-deliverer, and purchase-check-discharging machine which shall be simple in construction, strong, durable, efficient in its use, and comparatively inexpensive to set up.

With the foregoing and other objects in view the invention consists of the novel combination and arrangement of parts hereinafter specifically described, illustrated in the accompanying drawings, and particularly pointed out in the claims hereunto appended.

In describing the invention in detail reference is had to the accompanying drawings, forming a part of this specification, wherein like reference characters denote corresponding parts throughout the several views, and in which—

Figure 1 is a front view, partly broken away, of the machine. Fig. 2 is a rear elevation of the machine with the back of the inclosing casing therefor removed. Fig. 3 is a longitudinal section on the line 3 3 of Fig. 1 looking toward one side of the machine. Fig. 4 is a longitudinal section on the line 4 4 of Fig. 1 and looking toward the opposite side of the machine. Fig. 5 is a transverse section looking from the front to the rear of the machine. Fig. 6 is a top plan view of the coin and check holding tubes. Fig. 7 is a bottom plan view thereof. Fig. 8 is a sectional plan view of the combined check and coin ejecting mechanism. Fig. 9 is a sectional detail of the combined check and coin ejecting mechanism. Fig. 10 is a sectional detail of another portion of the combined check and coin ejecting mechanism. Fig. 11 is a detail of the combined check and coin mechanism. Fig. 12 is a perspective view of the check and coin tubes, the coin-tubes being open. Fig. 12$^a$ is a perspective view of the front section of the dollar coin-tube. Fig. 13 is a perspective view of the operating mechanism for the combined check and coin ejecting mechanism. Fig. 14 is an elevation of the locking-plates for the key-levers, showing also the cams for operating the registering mechanism. Fig. 15 is a perspective view of the operating-levers for the locking-plates. Fig. 16 is a top plan view, partly in section, showing the shifting means for the operating mechanism for the combined check and coin ejecting mechanism and also showing the registering mechanism. Fig. 17 is a diagrammatical view of the controlling mechanism for the registering mechanism and the shiftable regulating mechanism for the combined check and coin ejecting mechanism, said view also showing the arrangement of the key-levers with respect to said controlling and shifting mechanisms. Fig. 18 is an elevation of one of the vertically-operable rods carrying the indicating means for displaying the value of the check or checks delivered from the machine at each operation. Fig. 19 is an elevation of one of the lift-rods for the vertically-operable rods carrying an indicating means. Fig. 20 is a detail of a portion of the releasing mechanism for the vertically-movable indicator-rod. Fig. 21 is an elevation of the means for indicating the value of the cash inserted in the machine. Fig. 22 is a sectional detail of the releasing mechanism for the indicating-rods. Fig. 23 is a detail of the releasing mechanism for the indicator-rods. Fig. 24 is a perspective view of the operating means for the registering mechanism. Fig. 25 is a sectional view of a portion of the registering mechanism. Fig. 26 is a front view of the casing of the registering mechanism. Fig. 27 is a rear elevation of the cash receiving and separating mechanism. Fig. 28 is a perspective view of a portion of the cash receiving and separating mechanism. Fig. 29 is an elevation of the weighted follower. Fig. 30 is a detail view of the finger mechanism for operating the locking mechanism for certain key-levers; and Fig. 31 is a sectional elevation showing the arrangement of the mechanism for locking the machine when a coin-tube is empty, an indicating mechanism for indicating a nearly empty tube, and a chute device for filling the check and coin tubes. Figs. 32 and 33 are a front and side elevation, respectively, of a modified form of means for indicating the value of the cash inserted in the machine. Fig. 34 is a rear view of the cash receiving and separating mechanism, showing the detecting and deflecting mechanism; and Fig. 35 is a perspective view of the detecting mechanism, partly broken away.

The machine comprises what may be termed a "cash receiving and separating mechanism," combined coin and check holding tubes, a combined check and coin ejecting mechanism, a shiftable operating mechanism for the combined check and coin ejecting mechanism, a shiftable regulating mechanism for the operating mechanism for the combined check and coin ejecting mechanism, a mechanism controlled by the diameter of the coin inserted in the machine for controlling the operation of the operating means for the check and coin ejecting mechanism, a registering mechanism, a locking mechanism for the key-levers, an indicating mechanism for indicating the value of the cash inserted in the machine, an indicating mechanism for indicating the value of the check or checks delivered at each operation of the machine, a detecting and deflecting mechanism for counterfeit coin, a compulsory complete-stroke mechanism for the key-levers, a locking device for the machine operated by the discharge of a counterfeit, and an arresting means for the key-levers to prevent their return to normal position unless their stroke has been completed.

The machine also comprises various other details of construction in connection with the mechanisms just set forth to cause said mechanisms to operate in conjunction with each other or in the necessary manner. The various mechanisms which go to make up the machine and as heretofore referred to will be described specifically under the various terms used for them.

The various mechanisms which constitute the machine are supported upon suitable standards to be hereinafter referred to and which are arranged in a closed casing. The latter is preferably constructed of detachable top, front, rear, and side plates. The side plates 1 and 2 are removably attached to the supporting-standards by any suitable holdfast devices. The rear plate 3, which may be of one piece or formed of a plurality of sections, is preferably connected in any suitable manner to the side plates 1 2. The front plate of the casing is formed of a plurality of sections 4, 5, 6, 7, and 8. The section 6 of the front plate forms what may be termed a "door" to permit of access to the interior of the machine when occasion requires. Preferably it is employed to permit of replenishing the check-tubes (to be hereinafter referred to) and to also permit of removing the cash from the coin-tubes (to be hereinafter referred to) and to replenish the coin-tubes when occasion requires. Section 4 is secured to and between the side plates 1 and 2 at the bottom thereof. Section 5 is secured to the supporting-standards at the front thereof and between the side plates 1 2, and said section 4 is provided with a plurality of vertically-extending slots 9 to permit of the operation of the key-levers, (to be hereinafter referred to.) The section 6 is hinged to the section 7, as at 10, and said section 7 is secured to the side plates 1 2. The section 7 is cut away, as at 11, to form an opening to permit of the entrance of a coin into the cash receiving and separating mechanism, (to be hereinafter referred to.) The opening in the section 7 is of such size as to permit of the operation of the operating-slide (to be hereinafter referred to) of the cash receiving and separating mechanism when a coin is inserted in the machine. The section 8 is secured to the top of the supporting-standards. The rear plate of the casing as well as the front plate of the casing are not as high as the side plates, and such construction permits of forming a compartment or chamber at the top of the machine to permit of reading the indicators, (to be hereinafter referred to.) The compartment at the top of the machine is formed in connection with the side plates 1 2 of the casing by the transparent top, front, and rear plates 12, 13, and 14, respectively. These transparent plates are suitably secured in position through the medium of the top plates 15 of the casing and side plates 1 2. The top plates 15 are secured upon the top edges of the side plates 1 2.

The section 6 of the front plate of the casing is provided with a lock 16, which when operated in one direction engages with the section 5 of the front plate, and consequently prevents the opening of the section 6. The lock 16 is provided with a suitable registering mechanism 17, so that said mechanism will indicate how often the lock has been operated when opening the machine. Any suitable form of lock or any suitable form of registering mechanism operated in conjunction with the lock may be employed.

The section 4 of the front plate is cut away, and to said cut-away portion is secured a receptacle 18, open at its front and top, and said receptacle 18 permits of the ingress and egress of the operator's hand into the casing so as to open the coin and check receiving receptacle (to be hereinafter referred to) and receive the discharged check or checks and change, if any change is discharged with the check or checks.

The machine is operated through the medium of any one of a bank of key-levers. The machine as shown comprises for its operating means a single bank of key-levers. The levers of the bank of key-levers consist of a releasing or change-giving lever (indicated by the reference character 18') and a five-cent, ten-cent, fifteen-cent, twenty-cent, twenty-five-cent, thirty-cent, thirty-five-cent, forty-cent, forty-five-cent and fifty-cent lever, which are indicated by the reference character 19; but it is evident that the number of key-levers which constitute the bank can be increased or diminished as occasion requires, or additional banks of key-levers used, and the machine altered in accordance with the number of key-levers employed. The key-levers and the shifting mechanism engaged thereby are best shown in Fig. 17. The key-levers project forwardly from the casing and through the slots 9 of the section 5 of the front plate, so that said key-levers can be engaged and operated. The key-levers are one of the two parts of the various mechanisms of the machine when set up that can be handled by a person, and it is essential that the key-levers should project from the casing, for the reason that said key-levers form the means for operating the machine. The other part of the machine which is accessible to the operator is the operating-slide for the cash receiving and separating mechanism.

All of the key-levers are fulcrumed upon a bar 20, secured to the supporting-standards 21. The key-levers extend rearwardly, and the rear portion thereof is of such length as to project through a slotted plate 22, Fig. 2, and said rear end of the key-levers which projects through said plate 22 is indicated by the reference character 23. The slotted plate 22 is arranged at the rear of the machine and is secured, as at 24, to a rearwardly-extending support 25, carried by the supporting-standards 21.

The reference character 26 denotes a flat supporting-plate, (best shown in Fig. 8,) which is arranged near the front of the machine and adapted to support the registering mechanism, check and coin ejecting mechanism, and check and coin tubes. The plate 26 is slightly inclined upwardly in a forward direction, is secured to the standards 21, and cut away at its front, as indicated by the reference character 27, so as to permit of the discharge of the checks and coins from their tubes into the combined check and coin receiving receptacle, to be hereinafter referred to.

The machine is shown provided with a series of coin-tubes, which are adapted to contain dollars, half-dollars, quarters, nickels and dimes, and a series of check-tubes adapted to contain twenty-five-cent checks, five-cent checks, and ten-cent checks. The check-tubes are of much greater height than the coin-tubes and are arranged at the front thereof, and as many may be employed as is necessary.

The coin and check tubes are best shown in Figs. 6, 7, and 12. The coin-tube for the dollars is constructed of two separate sections 28 and 28', semicylindrical in contour, the section 28' being the forward section, and the said sections of the dollar coin-tube are detachably connected together through the means of a bayonet-joint. (Indicated by the reference characters $28^b$ and $28^c$. Best shown in Figs. 12 and $12^a$.) The section 28' of the dollar-tube is provided with a thumb-piece $28^d$ to permit of disengaging the sections 28 and 28'. The tube for the half-dollars is constructed of two sections 29 and 29'. The section 29' is semicylindrical in contour throughout, and the section 29 is semicylindrical in contour a portion of its length, and the lower portion thereof is cylindrical in contour, as at $29^b$. The section 29 of the half-dollar tube is formed integral with the section 28 of the dollar-tube. The twenty-five-cent coin-tube is formed of two sections 30 and 30'. The section 30' is semicylindrical in contour throughout and is formed integral with the section 29' of the half-dollar tube. The section 30 of the quarter coin-tube is semicylindrical in contour a portion of its length, and its lower end is formed cylindrical in contour, as indicated by the reference character $30^b$. The section 30 is formed integral with the section 29 of the half-dollar tube. The nickel coin-tube is constructed of two sections 31 and 31', said section 31' being semicylindrical in contour throughout and formed integral with the section 30' of the twenty-five-cent coin-tube. The section 31 of the nickel-tube is semicylindrical in contour a portion of its length, and its lower end is formed cylindrical in contour, as indicated by the reference character 31$^b$. The section 31 of the nickel-tube is formed integral with the section 30 of the twenty-five-cent coin-tube. The dime coin-tube is formed of two sections 32 and 32', and said section 32' is semicylindrical in contour throughout and formed integral with the section 31' of the nickel-tube. The section 32 of the dime coin-tube is semicylindrical in contour a portion of its length, and its lower end is formed cylindrical in contour, as indicated by the reference character 32$^b$. The section 32 of the dime-tube is formed integral with the section 31 of the nickel coin-tube.

The dime check-tube is formed of two sections 33 and 33', the section 33 being the upper section and the section 33' the lower section. The section 33 is substantially cylindrical in contour and has its forward portion cut away in a vertical manner from end to end to form an opening, as at 33$^b$, to permit of the operation of a weight having a protuberance, said weight forming a follower which retains the checks against one another. As the same kind of follower is employed for each of the check-tubes, the specific construction thereof will be hereinafter referred to. The follower is shown in Fig. 29. The cutting away of the section 33 to form the opening 33$^b$ also permits of replenishing the dime check-tube in a convenient manner. The section 33 of the dime check-tube is formed integral with the outer face of the sections 31' and 32' of the nickel and dime coin-tubes. The section 33' of the dime check-tube is cylindrical in contour and is formed integral with the outer face of the cylindrical portions 31$^b$ and 32$^b$ of the nickel and dime coin-tubes. The section 33' of the dime check-tube has formed integral with its forward portion a depending guide 33$^c$, the function of which will be hereinafter referred to. This guide 33$^c$ is used in connection with what may be termed the "upper check-ejector" for the dime check-tube.

The nickel check-tube is formed of two sections 34 and 34', the section 34 being the upper section and 34' being the lower section. The section 34 is substantially cylindrical in contour and has its forward portion cut away in a vertical manner from end to end to form an opening, as at 34$^b$, to permit of the operation of the follower, to be hereinafter specifically referred to. The opening 34$^b$ also permits of replenishing the nickel check-tube in a convenient manner. The section 34 of the nickel check-tube is formed integral with the outer face of the sections 31' and 30' of the nickel and quarter coin-tubes. The section 34' of the nickel check-tube is cylindrical in contour and is formed integral with the outer face of the cylindrical portions 31$^b$ and 30$^b$ of the nickel and quarter coin-tubes.

The twenty-five-cent or quarter check-tube is formed of two sections 35 and 35'. The section 35 is the upper section and the section 35' the lower section. The section 35 is substantially cylindrical in contour and has its forward portion cut away in a vertical manner from end to end to form an opening, as at 35$^b$, to permit of the operation of the follower to be hereinafter referred to. The opening 35$^b$ also permits of replenishing the quarter check-tube in a convenient manner. The section 35 of the quarter check-tube is formed integral with the outer face of the section 30' and 29' of the quarter and half-dollar coin-tubes. The section 35' of the quarter check-tube is cylindrical in contour and is formed integral with the outer face of the cylindrical portions 30$^b$ and 29$^b$ of the quarter and one-half-dollar coin-tubes.

The cylindrical portion 29$^b$ of the half-dollar coin-tube is provided with a forwardly-extending projection 36. The cylindrical portion 30$^b$ of the quarter coin-tube is provided with a forwardly-extending projection 37. The cylindrical portion 31$^b$ of the nickel coin-tube is provided with a forwardly-extending projection 38, and the cylindrical portion 32$^b$ of the dime coin-tube is provided with a forwardly-extending projection 39. These projections 36, 37, 38, and 39 act as supports for the rear portion of the lower sections 35', 34', and 33' of the check-tubes. The section 35' rests upon the projections 36 and 37, the section 34' rests upon the projections 37 and 38, and the section 33' rests upon the projections 38 and 39.

It will be evident from the foregoing construction that the coin-tube sections 29', 30', 31', and 32' and the check-tube sections 33, 34, and 35 are an integral structure, and it will also be evident from the foregoing description that the coin-tube sections 28, 29, 30, 31, and 32 and the check-tube sections 33', 34', and 35' are an integral structure. For convenience in description the sections 29', 30', 31', and 32' will be termed the "forward" portion of the coin-tubes and the sections 28, 29, 30, 31, and 32 will be termed the "rear" portion of the coin-tubes. The forward portion of the coin tubes is hinged to the rear portion of the coin-tubes. It may be stated that when the machine is set up the front portion of the coin-tubes is movable and the rear portion is stationary. The forward portion of the coin-tubes is hinged to the rear portion through the medium of a pair of eyes 40, integral with the section 32' of the dime coin-tube, and a pair of eyes 41, integral with the sections 32 and 32$^b$ of the dime coin-tube, and through the said two pairs of eyes is adapted to extend a vertically-extending rod 42, secured at its lower end into the plate 26, as at 43. The rod 42 carries near the top thereof a removable stop-collar 44. The rod 42 not only acts as a pivot to enable the swinging out of the forward portion of the coin-tubes so that access can be had to the rear portion of the coin-tubes, but also acts as a means for retaining one end of the rear portion of the coin-tubes stationary. The other end of the rear portion of the coin-tubes is retained stationary through the medium of a suitable holdfast device extending through one of the standards 21 and engaging in an opening 45, formed in the section 28 of the dollar coin-tube. The end just referred to of the rear portion of the coin-tubes is further retained fixedly in position through the medium of a rearwardly-extending apertured lug 46, carried by the section 28 of the dollar coin-tube and through which is adapted to extend a stationary pin 47, carried by the plate 26. (See Figs. 8 and 12.) The free end of the forward portion of the coin-tubes is removably connected to the rear portion of the coin-tubes through the medium of a depressible spring-latch 48, carried by the projection 36 and engaging with the lower portion of the section 29' when the forward portion of the coin-tubes is closed against the rearward portion.

Between the dime and nickel coin-tubes, at the bottom thereof, is arranged a channel or groove 49 to permit of the operation of a portion of the check-ejecting mechanism for the dime-checks. Between the nickel and quarter coin-tubes, at the bottom thereof, is formed a channel or groove 50 to permit of the operation of a part of the check-ejecting mechanism for the nickel-checks, and between the quarter coin-tube and the half-dollar coin-tube is arranged a groove or channel 51 to permit of the operation of a portion of the check-ejecting mechanism for the twenty-five-cent checks.

The combined check and coin ejecting mechanism (best shown in Figs. 5, 8, 9, 10, and 11) comprises an ejector for the half-dollars, an ejector for the quarters, an ejector for the nickels, two ejectors for the dimes, an ejector for the quarter-checks, an ejector for the nickel-checks, and two ejectors for the dime-checks, the ejectors for the coins and checks operating in conjunction when occasion requires. The ejector for the half-dollars is in the form of a flat slide, which is indicated by the reference character 52 and has its forward edge curvilinear in contour, as at 53. The slide 52 on its upper face, at one side near the rear end thereof, is provided with an upwardly-extending lug 54 and on its lower face, approximately centrally thereof, with a downwardly-extending lug 55. The slide 52 is mounted upon the plate 26, and the lug 55 extends through a slot in the plate 26. The forward wall of the slot limits the forward movement of the slide, and the rear wall of the slot limits the rearward movement of the slide. The ejector for the quarters is in the form of a flat slide (indicated by the reference character 56) and has its forward edge curvilinear in contour, as at 57. The slide 56 is mounted upon the plate 26 and on its upper face, at one side at the rear thereof, is provided with an upwardly-extending lug 58. The slide 56 on its lower face, approximately centrally thereof, is provided with a downwardly-extending lug 59, which extends through a slot in the plate 26, the forward wall of the slot in the plate 26 limiting the forward movement of the slide 56 and the rear wall of the slot limiting the rearward movement of the slide 56. The ejector for the nickels or five-cent pieces is in the form of a flat slide, (indicated by the reference character 60,) and which has its forward edge formed in a curvilinear manner, as at 61, and its upper face, at one rear corner thereof, provided with an upwardly-extending lug 62, carrying an inverted upwardly-extending L-shaped arm 63, the function of said arm being hereinafter referred to. The slide 60 is mounted upon the plate 26 and has its lower face provided with a downwardly-extending lug 64, extending through a slot in the plate 26. The forward wall of the slot in the plate 26 limits the forward movement of the slide 60, and the rear wall of the slot in the plate 26 limits the rearward movement of the slide 60. Two ejectors are provided for the dimes and which are indicated by the reference characters 65 66. The ejector 66 is mounted upon the ejector 65, and said lower ejector 65 is in the form of a slide and has its forward edge formed in a curvilinear manner, as at 67, and at the rear corner of one side of its upper face is provided with an upwardly-extending lug 68. The ejector 65 is mounted upon the plate 26 and has its lower face provided with a depending lug 69, extending through a slot in the plate 26. The forward wall of the slot in the plate 26 limits the forward movement of the slide 65, and the rear wall of the slot in the plate 26 limits the rearward movement of the slide 65. The upper dime-ejector 66 is in the form of a slide and has its forward end provided with a circular opening 70, the wall of which is adapted to surround the coin in the tube, so that when the slide 66 is operated forwardly it will eject the dime. The slide 66 at its rear end on its upper face is provided with an upwardly-extending lug 71 and on its lower face with a downwardly-extending lug 72, which extends through a slot in the plate 26, so that the forward and rearward movement of the slide 66 will be limited by the forward and rear wall of the slot.

The ejector for the quarter-checks is arranged upon the plate 26 between the slides 52 and 56 and in close proximity to one side of the slide 56 and consists of a sliding bar 73, having its rear end provided with an upwardly-extending lug 74, which is in alinement with the lug 58 of the slide 56, and said bar 73 has its forward end provided with an upwardly-extending projection 75. The ejector for the quarter-checks operates in the groove or channel 51, Fig. 7. The ejector for the nickel or five-cent checks is arranged between the slides 56 and 60 and in close proximity to one side of the slide 60 and consists of an elongated bar 76, having its rear end provided with an upwardly-extending lug 77, and said lug 77 has the horizontally-extending portion of the L-shaped arm 63 of the lug 62 overlapping it. The function of such an arrangement is to permit of the ejector 60 for the nickels and the ejector for the nickel-checks to be operated simultaneously when occasion requires. The forward end of the bar 76 of the nickel-check ejectors is provided with an upwardly-extending projection 79, and said nickel-check ejector is adapted to operate through the channel 50, Fig. 7. One of the dime-check ejectors is arranged at one side of the slide 60 and consists of an elongated bar 80, having its rear end provided with an upwardly-extending lug 81 and its forward end with an upwardly-extending projection 82, having a shouldered extension 83, adapted to engage in an opening 84 in a dime-check discharger 85. Said dime-check discharger 85 is supported in the guide 33°, Fig. 12, and has a rearwardly-extending guide-arm 86, which extends between the sections 31 and 32 of the nickel and dime coin-tubes, a suitable opening 87 being provided for such purpose. The dime-check discharger 85 is provided with a circular opening 88, the wall of which is adapted to surround the dime-check in the check-tube 33. The dime-check discharger 85 forms a part of the uppermost one of the two dime-check ejectors and is operated in a manner as hereinafter described when it is necessary to discharge two dime-checks simultaneously. When it is only required to discharge one dime-check, then the lower one of the dime-check ejectors is operated. The bar 80 of the ejecting portion of the dime-check ejector just described operates through the channel 49, Fig. 7. The dime-check ejector, which is provided with the separate dime-check discharger, is best shown in Figs. 10 and 11. The other dime-check ejector consists of a bar 89 of zigzag form and has its rear end provided with an upwardly-extending lug 90, having a recess 91. The ejector 89 has a portion of its length operating in the channel 49, Fig. 7, and that portion is arranged along the side of the bar 80 of the other dime-check ejector. The forward end of the ejector 89 is provided with an upwardly-extending projection 91'. Each of the check-ejectors is provided with a downwardly-extending lug 92, operating through a slot therefor in the plate 26, so that the forward and rear movements of the ejectors will be arrested by the forward and rear wall of the slots.

The lug 54 of the slide 52 is not as great in height as the lugs 58, 62, 68, and 71 of the other coin-ejectors. The lug 62 of the slide 60 is the highest of any of the lugs for the coin-ejectors, and the lug 58 of the slide 56 is not as high as the lugs 68 and 71 of the slides 65 and 66. Making the various lugs of the coin-ejectors of different size enables, when occasion requires, the operating mechanism for the coin-ejectors to ride over certain of the said lugs and not operate the slides of the lugs over which the operating mechanism rides. In connection with the check-ejectors in this particular the lug 74 is not as high as the lug 77 and the lugs 81 and 90 are higher than the lug 74, but not as high as the lug 77. The arrangement of the lugs for the check-ejectors is for the same purpose as that set forth for the lugs of the coin-ejectors.

The recess 91 of the lug 90 is employed to permit of the forward movement of a part of the operating mechanism for the ejectors without said part engaging the projection 90. The horizontally-extending portion of the L-shaped arm 63, carried by the lug 62 of the slide 60, also permits of a part of the operating means for the ejectors engaging with the lug 77 of the check-ejector, so as to operate the nickel-check ejector without operating the nickel-coin ejector.

The shiftable operating mechanism for the combined coin and check ejectors comprises three rearwardly-extending forwardly-operable supporting-arms 93, 94, and 95, connected together by a transversely-extending bar 96. The forward ends of the bars 93, 94, and 95 are loosely mounted upon the bar 20, on which the key-levers are fulcrumed, and the bar 96 rests upon the key-levers at the rear of the bar 20. By such an arrangement when the key-levers are operated the bar 96 is moved therewith, thereby elevating in a forward direction the arms 93, 94, and 95. The arms 93 and 95 extend rearwardly past the bar 96, and the reason for such extension will be hereinafter referred to. The arms 94 and 95 are adapted to operate the operating means for the coin and check ejectors, so that the checks and coins will be discharged from the machine, and for this purpose the arms 94 and 95 are provided with an upwardly-extending protuberance 97, carrying a plate 98, having an inclined upper edge 99. The manner in which the plates 98 engage with certain parts of the check and coin ejecting mechanism, so that the checks and coins will be discharged from the machine, will be hereinafter referred to. The means which engages the various ejectors, so as to move them forwardly, thereby discharging the checks and coins, consists of a series of depending fingers in the form of vertically-extending bars. For ejecting the dimes and dime-checks a pair of fingers are employed and are designated by the reference characters 100 and 101. The finger 100 at its lower end is bent forwardly at right angles, as at 102, or, in other words, the finger 100 is substantially L-shaped. The finger 100 is adapted to engage the lug 71 of the ejector 66 and the lug 90 of one of the dime-check ejectors, or, in other words, the finger 100 is adapted to engage and operate the upper dime-ejector and what may be termed the "lower dime-check ejector." The finger 101 is adapted to engage the lug 68 of the lower dime-ejector 65 and the lug 81 of the dime-check ejector 80, or, in other words, the finger 101 is adapted to engage and operate the lower dime-ejector and what may be termed the "upper dime-check ejector." For operating the ejectors for the nickels and nickel-checks a single finger is employed and which is designated by the reference character 102', and said finger 102' has its lower end bent forwardly at right angles, as at 103, or, in other words, the finger 102' is substantially L-shaped. The finger 102' is adapted to engage the lug 62 or the L-shaped arm 63 of the slide 60 and the lug 77 of the ejector 76, or, in other words, the finger 102' is adapted to engage and operate simultaneously or separately the nickel and nickel-check ejectors. For operating the ejectors for the quarters and quarter-checks a single finger is employed, which is designated by the reference character 104. Said finger 104 is adapted to engage separately with the lug 58 of the slide 56 and operates said slide or with the lug 74 of the sliding bar 73 and operates said bar. For operating the ejector for the half-dollars a single finger is employed and is designated by the reference character 105. The finger 105 is adapted to engage with the lug 54 to operate the slide 52.

The fingers 100, 101, 102', 104, and 105 are pivotally supported upon a bar 106 at their upper ends, and said upper ends of said fingers are spaced apart through the medium of the collars 107. The bar 106 is connected by a pair of rearwardly-extending arms 108 and 109 to a rock-shaft 110, which is loosely supported in the standards 21.

The fingers 101, 104, and 105 are arranged in advance of the fingers 100 and 102', and for this purpose a combined spacing and carrying plate 111 is provided. The plate 111 is suspended through the medium of a pair of arms 112, loosely mounted upon a bar 113, fixed in the standards 21. The fingers 100, 101, 102', 104, and 105 extend through the plate 111, and for this purpose the plate is provided with the openings 114 for the fingers 100, 101, 102', and 104 and an opening 115 for the finger 105. The openings 114 in the plate 111 are of such size as to enable the shifting transversely in the manner hereinafter described of the fingers 100, 101, 102', and 104; but as the finger 105 is not shifted it is not necessary to have an enlarged opening therefor. It may be well to state that the spacing-collars 107 are of such length as to permit of the shifting of the fingers 100, 101, 102', and 104. To the arms 112, which suspend the plate 111, is secured, at the rear thereof, a rod 116, which is bent forwardly at each end, as at 117, and then in the direction of the length of the rod, as at 118. That portion of the rod indicated by the reference character 118 is adapted to be engaged by the plates 99, so that when the arms 94 and 95 are elevated and moved in a forward direction the rod 116 will carry the plate 111 therewith, which in turn will carry the fingers 100, 101, 102', 104, and 105 in a forward direction, and the fingers will engage with certain coin and check ejectors and discharge the necessary checks and coins from the machine as occasion requires. The fingers and the plate 111 are returned to their normal or inoperative position through the medium of a spring 119, secured to one end of the rod 116 and to a suitable portion of the back part of the machine.

The fingers 100, 101, 102', 104, and 105 are transversely shiftable and vertically adjustable. The shifting of the fingers is to cause them to be positioned at the back of the ejectors' lugs which are intended to be operated, and the vertical adjusting of the fingers is for the purpose of causing the fingers to pass over the ejectors' lugs which are not to be operated.

The shiftable regulating mechanism for the fingers is operated by the key-levers and is best shown in Figs. 16 and 17 and consists of a plurality of combs, (designated by the reference characters 120, 121, 122, and 123,) and these combs are arranged at the rear of the operating mechanism for the ejectors and are supported at each end in the arms 125, extending inwardly from the standards 21.

The tines of the comb 120 are indicated by the reference character 126, and the lower portion of these tines is beveled, as at 127. The tines 126 of the comb 120 are adapted to be engaged by the thirty-cent, thirty-five-cent, forty-cent, forty-five-cent, and fifty-cent key-levers, so that when one of these key-levers is operated its respective tine will be operated and the comb 120 shifted, thereby shifting the finger 104, and for the purpose of shifting the finger 104 a forwardly-projecting yoke 128 is carried by the comb 120, and said yoke 128 engages at its outer end the finger 104. The tines of the comb 121 are indicated by the reference character 129, and they have their lower portions beveled, as at 130. The tines 129 are adapted to be operated by any of the key-levers for registering twenty cents, twenty-five cents, forty-five cents, and fifty cents, so that when one of the said key-levers is operated its respective tine will be engaged and the comb 121 shifted, which will cause the shifting of the finger 101, and for this purpose the comb 121 is provided with a forwardly-extending yoke 131, which engages at its outer end the finger 101. The tines of the comb 122 are indicated by the reference character 132, and they have their lower portions beveled, as at 133. The tines 132 are adapted to be engaged and operated by the ten-cent, fifteen-cent, twenty-cent, twenty-five-cent, thirty-five-cent, forty-cent, forty-five-cent, and fifty-cent key-levers, so that when any of the said key-levers is operated it will engage with its respective tine and shift the comb 122, thereby shifting the finger 100, and for this purpose the comb 122 is provided with a forwardly-extending yoke 134, having its outer portion engaging the finger 100. The tines of the comb 123 are designated by the reference character 135, and the lower portion thereof is beveled, as at 136. The tines 135 are adapted to be operated by the five-cent, fifteen-cent, twenty-five-cent, thirty-cent, forty-cent, and fifty-cent key-levers, so that when one of said key-levers is operated it will engage its respective tine, thereby shifting the comb 123, which in turn will shift the finger 102', and for this purpose the comb 123 is provided with a forwardly-extending yoke 137, the outer end of which engages the finger 102', so that when the comb is shifted a like movement will be imparted to said finger 102'.

The combs 120, 121, 122, and 123 after being shifted are returned to their normal position through the medium of a beveled cam-piece 138, Figs. 13 and 16, said cam-pieces 138 being carried by a part of the mechanism controlled by the diameter of the coin inserted for controlling the operation of the operating means for the check and coin ejecting mechanism. Said controlling mechanism will now be referred to.

The controlling mechanism for the check and coin ejecting mechanism and which has its operation controlled by the diameter of the coin inserted in the machine is best shown in Figs. 4, 13, and 16 and is substantially the same as that shown in Patent No. 750,718, granted February 26, 1904, but is slightly modified, so as to enable the adaptation of the controlling means of the character shown in the patent referred to for the machine herein set forth. Said controlling mechanism comprises a rack-bar 139, which is pivotally connected at its lower end, as at 140, to the supporting-arm 95 near the rear end thereof. It may be now stated that the cam-piece 138 for returning the combs 120, 121, 122, and 123 to their normal positions is connected to said bar 139 and that said bar 139 is adapted to rise and fall when said arm 95 is actuated through the medium of the key-levers. The bar 139 at its upper end is provided with teeth 141, at the forward edge thereof, which are adapted to mesh with the gear-wheel 142. The gear-wheel 142 is carried by a sleeve 143, mounted upon a shaft 144, which is secured to one of the standards 21. The shaft 144 has loosely mounted thereon a sleeve 145, carrying a controlling or feeling finger 146, which is substantially of the same character as the feeling or controlling finger shown in Patent No. 750,718, with the exception that the controlling-finger 146 is much longer. The gear-wheel 142 is provided on one side with a stop-pin for limiting its movement and on its opposite side with a stud 147, adapted to engage a part of the cash receiving and separating mechanism for returning said mechanism to its normal position. Said mechanism will be hereinafter referred to. The gear-wheel 142 has also connected to one side thereof an inverted-L-shaped arm 148, adapted to engage in a manner as hereinafter set forth with a part of the cash receiving and separating mechanism. As the parts which go to operate the feeling or controlling finger 146 are substantially the same as that shown in Patent No. 750,718, it is thought unnecessary to specifically describe the various parts. It will be stated, however, that the arm 108, Fig. 13, is operatively connected, through the medium of a stud 149 and a link 150, with said controlling mechanism, so that when said controlling mechanism is operated the arm 108 will be elevated, carrying the bar 106 therewith, which in turn will elevate the fingers 100, 101, 102', 104, and 105, so that said fingers will be raised to the proper height, so that certain of said fingers will engage and operate the necessary check and coin ejectors and the other fingers will pass over and not operate their respective check and coin ejectors.

The controlling mechanism employed in this machine, as before stated, is the same as that in Patent No. 750,718; but the rack-bar is not provided with the enlarged slotted lower end and connections therefor, as in Patent No. 750,718. The controlling mechanism in this application is also provided with a rearwardly-extending lug 151, Fig. 4, which is adapted to engage and operate a means for indicating the value of the coin inserted in the machine in the same manner as the device for the same purpose employed in Patent No. 750,718. The operation and purpose of the controlling mechanism, which has its movement controlled by the diameter of the coin inserted, is the same as the controlling mechanism of Patent No. 750,718; but it will be stated that such operation will be hereinafter referred to.

The registering mechanism, which operates in conjunction with the various other mechanisms which constitute the machine, is best shown in Figs. 16, 24, 25, and 26. The registering mechanism comprises an indicating means for the nickels and a series of registering-wheels for recording amounts above a nickel, and these registering-wheels may be of the general form of construction of such devices and with any suitable transferring mechanism therefor.

The registering mechanism is preferably mounted upon the plate 26 at one side of the coin and check tubes and is inclosed in a suitable casing 152, having the front thereof provided with sight-openings 153, and supported by the said casing 152 is a shaft 154 for the register-wheels 155, which are provided with the necessary digits. The shaft 154 also supports the registering device for the nickels, as well as a portion of the operating mechanism therefor. The register-wheels 155 are actuated through any suitable lever mechanism 156, connected at one end, as at 157, to a bodily-movable series of graduated cams 158, connected together, as at 158', and suspended, through the medium of the arms 159, from a bar 160, arranged in the rear of the machine. The cams 158 are adapted to be engaged and actuated by a stud 161, carried on the rear end of the ten-cent, fifteen-cent, twenty-cent, twenty-five-cent, thirty-cent, thirty-five-cent, forty-cent, forty-five-cent, and fifty-cent key-levers. When one of the just-noted key-levers is depressed, its stud 161 will engage with its respective cam and move the body of cams rearwardly, which will carry the lever 157 therewith and suitably actuate the register-wheels 155 to register the proper amount. The lever mechanism for actuating the register-wheels 155 may be similar to that as shown in Patent No. 750,718. The means for registering the five-cent pieces or nickels consists of a lever 162 in the form of an escapement, which is pivoted to a suitable support 163, as at 164. Said lever 162 carries a forwardly-projecting arm 165, having an oval-shaped opening, as at 166, and is mounted at this point on the shaft 154. The forward end of arm 165 carries a curved plate 167, having the digits "5" and "0" thereon, the "5" being arranged below the "0." The arm 165 also carries a beveled tooth 168, the function of which will be hereinafter referred to. Mounted upon the shaft 154 is a toothed wheel 169, provided with five beveled teeth, which are indicated by the reference character 170, and one face of the wheel 169 is provided with a concentrically-arranged series of pins or studs 171, there being ten in number. The wheel 169 is actuated through the medium of an actuating-arm 172, having its forward end normally engaging with one of the pins or studs 171, so that when said arm 172 is operated it will impart movement to the wheel 169. The arm 172 is pivoted at its rear end, as at 173, to the upper end of an operating-lever 174, which is pivoted at its lower end, as at 175, to a suitable support. The lever 174 is operated through the medium of the forward arm of a bell-crank lever 176, said lever 176 being pivoted at 177 to a suitable support and has its rear end extending through an opening 178, formed in a shiftable comb 179. The comb 179 is arranged at the front of the comb 120 and at its ends supported in the arms 125. The tines of the comb 179 are indicated by the reference character 180 and have their lower portions beveled, as at 181. The tines 180 are adapted to be engaged by the five-cent, fifteen-cent, twenty-five-cent, thirty-five-cent, and forty-five-cent key-levers, so that when one of the key-levers noted is depressed it will engage its respective tine and shift the cone 179 transversely, which in turn will rock the bell-crank lever. The latter will rock the lever 174, which in turn will move the arm 172 forward and impart motion to the wheel 169. The comb 179 is returned to its normal position through the medium of the cam-piece 138, carried by the rack-bar 139, and the arm 172 is normally retained in engagement with one of the pins 171 through the medium of the spring 172'. The normal position of the escape-lever 162 is that one of its arms will rest upon the upper end of the beveled side of one of the teeth 170, and the other of its arms will rest upon one of the teeth 170 at the beginning of the beveled side thereof. Therefore when motion is imparted to the wheel 169 in the manner as hereinbefore set forth the escape-lever will be caused to rock or oscillate, carrying the arm 165 therewith and raise or lower the plate 167 and expose the digit "5" or "0," as the case may be. The beveled tooth 168 on the arm 165 is what may be termed a "transferring-tooth," and it is adapted to engage with any one of a series of teeth 182, carried by one side of that register-wheel 155 which is arranged in close proximity to wheel 169. The arm 165 is somewhat yielding, so that on the upward movement thereof the tooth 168 will pass by the teeth 182, but on the downward movement of said arm 165 the tooth 168 will engage one of the teeth 182, carrying it therewith and impart movement to the said register-wheel, which is arranged in close proximity to the wheel 169. If the "0" on the plate 167 is opposite its sight-opening, the arm 165 is moved upwardly to expose the digit "5" through said sight-opening. Then the tooth 168 will not engage and move the register-wheel, which is arranged in close proximity to the wheel 169; but if it is desired to expose the "0," owing to the fact that there has been the register of one nickel, and it is desired to register a dime, or rather an additional nickel to make the dime, then the plate 167 is moved downwardly, and therefore it will be evident that the tooth 168 will engage one of the teeth 182 and impart the necessary movement to the register-wheel which is arranged in close proximity to the wheel 169, so as to register the necessary amount transfer.

The mechanism for indicating the value of the coin inserted in the machine (best shown in Figs. 2 and 21) consists of an upright rod 183, having attached to its upper end a plate 184, provided on its outer face with separate indications to denote the value of the various coins which can be inserted in the machine—for example, one dollar, fifty cents, twenty-five cents, five cents, and ten cents—and said plate is further provided with an inscription, such as "None," to indicate that no coin has been inserted in the machine, if such should be the case when the releasing-key lever is operated. The plate 184 is vertically movable into the compartment at the top of the machine, and the various indications thereon can be read through the transparent front plate 13 of said compartment. The rod 183 is arranged against the back plate 185, secured to the supports 2, and moves through the keepers 186, carried on the rear of said back plate 185. The rod 183 has its lower end attached to the rearwardly and horizontally extending member 187 of a substantially inverted-L-shaped operating-arm for said rod. The vertically-extending member 188 of said L-shaped arm is notched, as at 189, and said notches when said L-shaped arm is operated are adapted to rest on one of a pair of guide-supports, Figs. 2 and 22, to be hereinafter referred to. The horizontally-extending member 187 of the L-shaped operating-arm is adapted to be engaged by the rearwardly-extending lug 151 of the controlling mechanism, so that when said controlling mechanism is operated the rod 183 will be elevated to expose the proper inscription or indication, the elevating of the rod 183 being controlled by the operation of the controlling mechanism, or, in other words, is controlled by the diameter of the coin inserted in the machine. If no coin is inserted in the machine, then the inscription "None" will be exposed. If a dime is inserted, the rod 183 will be elevated, so as to expose the indication "10;" if a nickel, so as to expose the indication "5;" if a quarter, so as to expose the indication "25;" if fifty cents, so as to expose the indication "50;" if a dollar, so as to expose the indication "$1." When the rod 183 is elevated through the medium of the L-shaped arm, the notches 189 of the latter will rest upon one of the guide-supports and retain the rod 183 in its elevated position until the vertically-extending member of the L-shaped arm is released from the support. It may be well to state that there is a notch for each inscription upon the plate 184. As six inscriptions or indicating means are provided upon the plate 184, there are six notches in the member 188, so that the plate 184 will be retained in such position when elevated, so as to expose the correct indication through the transparent plate 13 of the compartment at the top of the machine.

The means for indicating the value of the check or checks discharged from the machine at each operation thereof consists of a series of vertically-movable rods carrying indicators or cards each provided with a suitable indication to indicate the amount of the check or checks discharged. As all the rods and the indicators or cards carried thereby are the same with the exception that the indication upon each of the cards is different, the construction of one of the rods will only be referred to. There is employed a vertically-movable rod carrying an indicator for each of the key-levers—that is to say, a rod carrying an indicator-card for the five, ten, fifteen, twenty, twenty-five, thirty, thirty-five, forty, forty-five, and fifty cent key-levers. The inscription on the card carried by the rod corresponds with the indicated value of its respective key-lever. For example, the card for the rod for the five-cent key-lever would have the indication "5" thereon. The card for the rod for the ten-cent key-lever would have its card provided with the indication "10." The same scheme is carried out in connection with all of the key-levers. Each of the rods is indicated by the reference character 192, the card carried thereby by the reference character 193, and the inscription upon the card by the reference character 194. The rod 192 has a forwardly-projecting tongue at its lower end, as at 195. The rods 192, carrying the indicator-cards, are best shown in Figs. 2 and 18. The rods 192 are arranged at the rear of the machine and when elevated the cards 193 are adapted to be moved into the compartment at the top of the machine, so that the inscription upon the cards 193 can be read through the transparent plates 13 and 14 of said compartment. Certain of the indicator-cards 193 are arranged in front of the other cards and this is obtained by bending forwardly and upwardly the upper part of certain of the rods. The rods 192 extend through a guide-bar 196 in the form of an angle-iron, the forwardly-extending portion of said guide-bar being provided with openings through which the rods 192 extend. The bar 196 is secured to the supporting-standards 21. The rods 192 also extend through a stop-plate 197, secured to a vertically-extending plate 198, attached to the rear of the standards 21. The stop-plate 197 is adapted to arrest the downward movement of the rods 192, and for this purpose each of the rods is provided with a pin 199, which engages the said plate 197, consequently arresting the downward movement of the rods 192. The rods 192 are operated through the medium of a series of lift-rods 200, one for each of the key-levers—that is to say, a separate lift-rod 200 for the five-cent key-lever, for the ten-cent key-lever, for the fifteen-cent key-lever, for the twenty-cent key-lever, for the twenty-five-cent key-lever, for the thirty-cent key-lever, for the thirty-five-cent key-lever, for the forty-cent key-lever, for the forty-five-cent key-lever, and for the fifty-cent key-lever. The lift-rods 200 rest upon the top edge at the rear end of the key-levers and are also connected thereto through the medium of the attaching members 201, connected to the lower end of the lift-rods 200. The attaching members 201 are in the form of hooks and extend around one side of the key-levers and then around the bottom edge thereof and then upwardly against a portion of the other side of the key-levers. By such an arrangement the lift-rods 200 cannot be vertically moved unless the key-levers are operated—that is to say, it requires the operation of a key-lever to permit of the operation of its respective rod 200. The rods 200 are suitably spaced apart through the medium of a guide-bar 202, mounted upon the top of the slotted plate 22. The guide-bar 202 is in the form of an angle-iron, and the forwardly-projecting portion thereof is provided with openings through which extend the lift-rods 200. The guide-bar 202 also forms what may be termed a "stop-bar" to arrest the downward movement of the lift-rods 200, and for this purpose the rods 200 are provided with studs 203, which, if occasion requires, engage the bar 202, and consequently arrest the downward movement of the rods 200. At the rear of the machine and connected to the back plate 198 is an additional guide and arresting plate 204 for the lift-rods 200. The plate 204 is provided with openings to permit of the operation of the rods 200, and said plate is adapted to be engaged by the pins or stud 203 to arrest the upward movement of said rods 200. The rods 200 are also provided with lugs 205, which engage with the tongues 195 of the indicator-rods 192, so that when said rods 200 are operated the lugs 205 will engage the tongues 195 of the rods 192, carrying the rods 192 therewith, consequently elevating said rods 192 and exposing the indicator-cards through the transparent front plate 13. The lift-rods 200 operate also through the plate 197 at the front of the rods 192.

The upward movement of the indicator-rods 192 is also arrested through the medium of a series of locking-disks 206, which are adapted to abut against each other and when in their abutting positions prevent the vertical movement of the rods 192. Each of the disks 206 is supported in a keeper 207, secured to the rear of the plate 198. When the disks 206 are released, the rod 192, which is to be lifted by the rod 200, will be allowed to pass between two of the disks. The disks 206 are retained in their abutting positions through the medium of a pair of sliding retaining-blocks 208 209, and each of said blocks 208 209 is provided with a transversely-extending slot 210 and on its inner face with a lug 211, beveled on each side thereof, and said lug 211 is adapted to extend in a channel 212, formed between a pair of offsets 213 213', carried by the plate 198. There are two pairs of offsets 213 213' employed, and one pair is arranged at one end of the series of locking-disks and the other pair is arranged at the other end of the series of locking-disks. The retaining-block 208 is mounted against the pair of offsets 213 213' at that side of the machine in which is arranged the registering mechanism, and the retaining-block 209 is mounted against the other pair of offsets 213 and 213' at that side of the machine in which is arranged the controlling mechanism. The retaining-blocks 208 and 209 are normally held so as to abut against the outer disk at each end of the series of disks 206 through the medium of a compression-spring 214, mounted upon a transversely-extending arm 215, carried by each of the blocks 208 209, and said arm 215 is guided and supported by a rearwardly-extending projection 216, carried by each of the offsets 213'. The projections 216 form abutments for the springs 214, so that when said blocks 208 209 are moved transversely in an outer direction in a manner as hereinafter referred to the springs 214 will be compressed, so that when said blocks 208 and 209 are released the springs 214 will cause the blocks to move in an opposite or inner direction and return to their normal positions against the outer disk at each end of the series of disks, so as to cause the said disks to abut against each other and prevent the elevation of one of the rods 192 to expose the indicator carried thereby. Each of the blocks 208 and 209 has its outward movement limited through the medium of a headed pin 209', extending through the slot 210, through the offset 213, and secured in the plate 198. Said pins 209' also form a means for retaining the blocks 208 and 209 against the offsets 213 and 213'.

The blocks 208 and 209 are moved transversely, or rather outwardly, through the medium of a pair of vertically-extending operating-rods 217, resting upon and connected to the rear of the arms 93 and 95 through the medium of the hooks 218. The rods 217 on their upward movement are adapted to engage one side of the beveled lugs 211, so as to move the blocks 208 and 209 away from the disks 206, and on their downward movement are adapted to engage the other side of the beveled lugs 211, so as not to move the blocks 208 and 209 away from the disks 206, owing to the fact that after the blocks 208 and 209 have been moved away from the disks on the upward movement of the rods 217 to enable the passage of one of the rods 192 between a pair of the disks 206 the blocks 208 and 209, through the medium of the springs 214, will have then been moved against the disks, so as to cause the disks to abut against each other, and under such circumstances it is necessary that the rods 217 on their downward movement should not move the blocks 208 and 209 to release the disks 206. Therefore the rods 217 must be constructed as to move the blocks away from the disks on their upward movement, but on their downward movement should have a tendency to retain the blocks 208 and 209 against the disks 206. The rods 217 are cut away portions of their length, so as to obtain the function just set forth in regard to moving or shifting the blocks 208 and 209 and so as to form portions of the rods 217 of less thickness than the remaining part of the rods, and such thin portions of the rods 217 are indicated by the reference characters 219 220. The upper end of each of the rods 217 is beveled, as at 221, and the rods 217 are also provided with the beveled surface 222. The rods 217 extend upwardly through the guide-bar 202, suitable openings being provided for such purpose. The thin portion 220 of the rods 217 is provided to allow of the necessary play of the rods 217 in the openings of the guide-bar 202, through which the rods extend. This play is necessary owing to the fact that the rods 217 on their upward movement engage one side of the beveled lugs 211 of the blocks 208 and 209 and on their downward movement engage the opposite side of said lugs. The thin portion 219 of the rods 217 permits of the blocks 208 and 209 returning to their normal positions after they have been moved by the enlarged portion 223 at the upper end of the rods 217. If the rods 217 were of the same thickness throughout, the rods 217 would prevent the returning of the blocks 208 and 209 to their normal positions, so as to retain the disks 206 in an abutting position to enable said disks 206 to retain the indicator-rod 192, which has been moved to an elevated position to expose the indicators carried thereby. It would be well to state that the disks 206 not only prevent the movement of the indicator-rods 192 to expose their indicators, but when the rods 192 have been moved and the indicators exposed the disks retain the indicator-rods in their elevated position. When the arms 93 and 95 are operated through the medium of depressing a key-lever, the rods 217 are lifted and the enlarged upper end 223 of the rods 217 engages one side of the lugs 211 and forces the blocks 208 and 209 away from the outer disk of the series of disks, so that the rod 200 for the key-lever, which has been depressed, will be lifted and the tongue 195 of the rod 192 corresponding to the rod 200 will be engaged by the lug 205 of the rod 200, thereby elevating the rod 192 and allowing the tongue 195 of the rod 192 to pass between two of the disks of the series 206, so that the rod 192 for the rod 200, which has been lifted, will be elevated so the indicator of the elevated rod 192 will be exposed in the compartment at the top of the machine. When the enlarged end 223 of the rods 217 has passed the lugs 211, the blocks 208 and 209 will be caused to assume their normal position owing to the action of the springs 214, and consequently the disks 206 will abut against each other, and when in such position will form a support for the rod 192, which has been elevated, the tongue 195 of said rod 192 resting upon a pair of abutting disks 206, and said rod 192 is retained in this elevated position until the disks are again released in a manner as hereinbefore set forth, when said elevated rod 192 will be returned to its normal position through the action of the compression-spring 192', carried thereby, there being a compression-spring 192' for each rod 192. When the key-lever which has been depressed is released, the rods 217 will be caused to return to their normal positions; but on the downward movement of said rods 217 the beveled surface 222 will engage the opposite side of the beveled lugs 211, and consequently retain the blocks 208 and 209 in their normal positions. A series of locking-disks is also employed for the lift-rods 200, and these disks are indicated by the reference character 224, Fig. 22, and the disks 224 are arranged in front of the disks 206, but are separated from said disks through the medium of a bushing 225, carried by the disks 206. The keepers 207 also retain the disks 224 at the back of the plate 198, and the disks 224 are arranged to correspond with the disks 206. The disks 224 are movable and are not in their abutting positions until a lift-rod 200 passes between a pair of the disks. When this action takes place, the disks are caused to abut against each other, thereby preventing the operation of another lift-rod 200 until the lift-rod 200 which has been operated is returned to its normal position, which is accomplished when the depressed key-lever is returned to its normal position, said action carrying the rod 200 therewith. The guide-supports for the vertically-extending notched member 188 of said L-shaped arm, the latter constituting the means for operating the device to indicate the value of the coin inserted in the machine, is best shown in Fig. 22 and consists of the headed retaining-pin 209' of the block 209 and a headed stud 210', carried by the block 209. The member 188 passes between the head of the pin 209' and the stud 210' when it is elevated, and when said member 188 is elevated in the manner as hereinbefore set forth it will be evident that the rods 217 will also be operated, consequently allowing the member 188 to be moved. When the rods 217 are operated, one of them, as before stated, will move back the block 209, and when the block 209 has assumed its normal position it will cause the stud 210' to be in close proximity to the pin 209', and one of the notches 189 of the member 188 will engage on the headed stud 210', and consequently the rod 183 will be retained in an elevated position until the block 209 is moved again away from the disk 206, so that said rod 183 can be lowered or elevated, as occasion requires. The rod 183 has connected to it a suitable spring 183', so as to assist in lowering said rod.

The complete-stroke mechanism of the ordinary character is employed for the key-levers and consists of a rack-bar 226, having a recess 227, said rack-bar being suitably secured at the rear of the machine and is engaged by a double-acting pawl 228, carried by the arm 93, Fig. 13. This complete-stroke mechanism operates in the known manner.

The arms 94 and 95 carry a means for returning the combined check and coin-ejecting mechanism to its normal position, and said means consists of a yoke-shaped bar 229, Fig. 13, which is adapted to be moved rearwardly and engage the depending lugs of the ejectors when the arms 94 and 95 are lowered so as to move the ejectors to their normal positions. The yoke-shaped bar 229 is arranged at the front of these depending lugs and is shown in such position in Fig. 5. Therefore it is evident that when the arms 94 95 are lowered said bar 229 will operate in a manner as stated. It would be well to state that the lower portion of the coin-tubes is cut away to enable the operation of the coin-ejectors into and out of the tubes to eject the coins and to return them to their normal or inoperative positions.

The cash receiving and separating mechanism (best shown in Figs. 27 and 28) is arranged over the coin-tubes so that the coins can be discharged from said mechanism into their respective tubes. The mechanism is secured to one of the standards 21 and also suitably connected with the back plate 185, so that said mechanism will be rigidly suspended over the coin-tubes. The cash receiving and separating mechanism in this application is of the same character as such mechanism disclosed in Patent No. 750,718 and operates in the same manner and for the same purpose as said mechanism of Patent No. 750,718. Various details of the mechanism of Patent No. 750,718 have been modified, so that said mechanism can be adapted for the machine disclosed in this application, and said modifications will be referred to as well as any additions to the mechanism as shown in Patent No. 750,718. It is thought unnecessary to describe every detail which constitutes this mechanism, especially for the reason that it is fully disclosed in Patent No. 750,718. The cash receiving and separating mechanism consists of an upper chute 230, extending downwardly and outwardly at an inclination, and a lower chute 231, extending inwardly and downwardly at an inclination. The lower end of the chute 230 opens into the outer end of the chute 231. These chutes are substantially the same as those shown in Patent No. 750,718, and the lower chute 231 is provided with a means similar to that shown in Patent No. 750,718 for separating the coins inserted in the cash receiving and separating mechanism, so that said coins will be discharged into their respective tubes. The bottom of the chute 231 is open and is closed when occasion requires through the medium of a spring-actuated closure-plate 232, normally held in its closing position through the medium of a hooked arm 233, pivoted, as at 234, to the back of the chute 231. The hooked end of the arm 233 is adapted to engage with the plate 232 for retaining said plate in its closing position. When the arm 233 is shifted so that its hooked end will be removed from the plate 232 in a manner as hereinafter described, the plate 232 through the action of the spring 235 will fly back, consequently opening the chute 231, so that if the coin is therein said coin can be dropped into its respective tube. The upper chute 230 is provided with a vertically-extending opening 236 to permit of the movement of a finger mechanism, Figs. 3 and 30, so as to engage with the edge of the coin inserted to control the locking mechanism for the key-levers, to be hereinafter referred to, and the counterfeiting and detecting mechanism. The finger mechanism (best shown in Fig. 30) consists of a forwardly-extending section 237 and a rearwardly-extending section $237^a$, which are pivotally connected together by the links $237^b$ and $237^c$, as at $237^d$, $237^e$, $237^f$, and $237^g$. The pivot $237^f$ is pivotally connected to the offset $237^h$, Fig. 27, on the rear of the chute 230. The section 237 projects forwardly into the opening 236 in the chute 230, so as to engage with the edge of the coin inserted to control the movement of the section $237^a$, thereby controlling the locking mechanism for the key-levers, to be hereinafter referred to, and the counterfeiting and detecting mechanism. The link $237^c$, as well as the link $237^b$, projects upwardly a suitable distance above the section 237, and the said links are connected together through the medium of a tension-spring $237^m$. The upwardly-projecting end of the link $237^c$ is connected with the offset $237^h$ through the medium of a tension-spring $237^o$, and said upwardly-extending end of the link $237^c$ carries a stud $237^n$, the function of which will be hereinafter referred to. The finger mechanism is adapted to be operated through the medium of a trip-lever, to be hereinafter referred to. The chute 230 is also provided with an inclined slot 238, in which operates a holding-lever 239 to retain the coin inserted momentarily until the cash receiving and separating mechanism is operated. The holding-lever 239 is for the same purpose and substantially of the same character as the holding-lever in Patent No. 750,718. The chute 230 is also provided with an opening 240 to permit of a portion of the detecting and deflecting mechanism operating.

The deflecting and detecting mechanism (best shown in Figs. 34 and 35) is substantially along the lines of the same character of mechanism as disclosed in Patent No. 750,718, and the said mechanism will be briefly referred to, as under the circumstances it is thought unnecessary to fully and specifically describe such mechanism. The mechanism comprises a deflecting-arm A, Fig. 34, extending into an opening 240 in the chute 230, a deflecting and holding member C, Fig. 1, operated by the arm D, carried by a pivoted section of the balance-arm, the other section of said balance-arm being indicated by the reference character F. The deflecting-arm A is carried by the upright G, and said arm A is retained in position by the member H, actuated by the pivoted section E. The reference character I denotes the weighted portion of the balance-arm. Said weighted portion I forms the weight for the dimes. The reference characters J, K, and L denote a series of adjustable weights. The weight J, in connection with the weighted portion I, forms the weight for the quarters. The weight K, in connection with the weight J and weighted portion I, forms the weight for the half-dollars, and the weight L, in connection with the weights K J and weighted portion I, forms the weight for the dollars. The weights J K L are suitably connected to the lifting-arms M N O, respectively. A series of spring-return connecting-arms operated by a series of angle-levers is adapted to connect the weights together in a proper manner. The spring-return connecting-arms are indicated by the reference characters P Q R; the angle-levers, by the reference characters S T U, Fig. 35. The angle-levers are suitably actuated through the medium of the element 237 of the finger mechanism. It is thought unnecessary to specifically describe the operation of the detecting and deflecting mechanism, as the same is fully set forth in Patent No. 750,718.

In the cash receiving and separating mechanism disclosed in Patent No. 750,718 an elongated trip-lever is provided, which not only retains the closure-plate 232 for the chute 231 in its normal or closing position, but also carries the finger 237. In this machine the trip-lever is dispensed with and in lieu thereof the arm 233 is employed, which is operated by the holding-arm 242, which is of a like construction as the holding-arm 155 in Patent No. 750,718, and said holding-arm 242 is provided with a pair of offsets 243, operating in the inclined slots 244, formed in the lower end of the chute 230, said offsets 243 holding the coin inserted until it is engaged by the feeling-finger 146 for the purpose set forth herein. The holding-arm 242 is adapted to retain the hooked arm 233 in its normal position—that is, in engagement with the plate 232, so as to close the opening in the chute 231. When the holding-arm 242 is moved forwardly so as to cause its offsets 243 to extend through the slots 244 and across the chute 230, the arm 233 is released, so that the action of the spring 235 will cause the plate 232 to fly back, and consequently open the chute 231. The arm 242 is operated through the medium of an elongated lever 245, which moves the finger 237 and its connections by engaging the stud 237ⁿ, and said lever 245 projects through a rearwardly-extending plate 246 and is connected at its upper end to an operating-slide 247, mounted upon the plate 246. The slide 247 operates within the opening 11 of the section 7 of the front of the casing and is adapted on its forward movement to close the entrance-opening of the chute 230 for the coin. The slide 247 is moved forwardly by the operator after dropping a coin in the chute 230, and on the forward movement of the slide 247 the lever 245 is carried therewith, which in turn will engage the stud 237ⁿ and move the section 237 of the finger mechanism in the slot 236, and when said section 237 engages the coin in the chute the section 237ª will be given an independent downward movement and at the same time will move the holding-arm 242 forwardly and cause the offsets 243 to extend in the slots 244. On the forward movement of the lever 245 a projection 248, secured to the front of said lever 245, will engage the holding-arm 239, rock the same so as to withdraw it from the chute 230, and permit the passage of the coin down said chute 230, where the coin will be arrested by the offsets 243, which extend through the slots 244.

A mechanism is provided to close the entrance-opening of the chute 230 when a coin is placed therein, so that another coin cannot be inserted until the first coin has passed down the chute 230 and to prevent the operation of the slide 247 before a coin has been deposited, and said mechanism consists of a rock-arm 249, suitably connected to the rear of the chute 230 and having a bevel rearward extension 250. The upper end of the rock-arm 249 is provided with a closure-plate 251, which is adapted to extend across the entrance-opening of the chute 230 to close it, and the lower end is provided with a forwardly-extending bend 252, which also extends in the chute 230. The rearward extension 250 is weighted so that the normal position of the plate 251 will be out of the chute 230 and the forwardly-extending bend 252 will be in the chute 250. When a coin is inserted in the chute 230, it will drop upon the bend 252, and as said bend extends downwardly at an inclination the coin will have a tendency to slightly rock the arm 249 and cause the arm 249 at its upper end to swing forwardly and the closure-plate 251 will then extend across the entrance-opening of the slot 230. The projection 248 in its normal position is in the rear of and contiguous to the extension 250 of the rock-arm 249, so that the extension 250 acts as a block to the forward movement of the projection 248 and its carrier, the trip-lever 245 and the slide 247 thus preventing the closing of the chute 230. When a coin is placed in the slot 230, it will fall on the bend 252 in the lower part of the rock-arm 249 and cause that part of the rock-arm 249 to move rearwardly and rock the upper end forwardly, causing the closure-plate 251 to move across and close the slot 230. At the time that the rock-arm 249 is actuated the extension 250, being on the rearward side of the upper part of the said arm just above the fulcrum, is elevated out of the path of the projection 248, and said projection is free to pass under the extension 250 and perform the other functions assigned thereto. On the release of the trip-lever 245 after the passage of the coin down the chute all of the parts again assume their normal position. The projection 248 when in engagement with the extension 250 retains the plate 251 across the entrance of the chute 230; but when the lever 245 is moved rearwardly in the manner as hereinafter set forth the projection 248 will be moved out of engagement with the extension 250, and consequently the weighted extension 250 will rock the arm 249 and cause the plate 251 to be removed from across the entrance of the chute 230. The chute 230 is provided with a vertically-extending slot 253 to permit of the operation of the feeling-finger 146, so that the said finger can engage the edge of the coin supported by the offsets 243 and control the operation of the operating mechanism for the combined check and coin ejectors. The feeling-finger 146 is employed for the same purpose as the feeling-finger 225 of Patent No. 750,718, and its function is identically the same and the construction substantially the same, with the exception that the finger 146 is somewhat elongated. The holding-arm 242 is returned to its normal position through the action of an upwardly-extending spring 254, secured to the back of the chute 231, and extends through the arm 242. The holding-arm 242 is pivoted, as at 255, to a brace-bar 256, which forms a part of the chute 230, and is connected at its lower end to the chute 231. The holding-arm 242, if not returned to its normal position through the action of the spring 254, is caused to return to its normal position through the action of the L-shaped arm 148 engaging therewith, said arm being carried by the gear 142, Figs. 28 and 4. The lever 245, which may be termed the "main operating-lever" of the cash receiving and separating mechanism, is retained in its forward position—that is, when the slide 247 is operated after a coin is placed in the chute 230—through the medium of a beveled lug 257, engaging with a rearwardly-extending rack-bar 258, carried by the releasing-lever 259. The releasing-lever projects rearwardly and out past the holding-arm 242 and is pivotally mounted in the brackets 260, secured to the back of the chute 230. The rack-bar 258 is retained normally in engagement with the lug 257, through the medium of a spring 261, secured at one end to said rack-bar 258 and to the rearwardly-extending plate 246. The spring 261 also retains the releasing-lever 259 in its operative position. When the slide 247 is moved forward, the lever 245 is carried therewith and the lug 257 engages in one of the teeth of the rack-bar 258, and thereby retains the slide 247 in its forward position. When a key-lever is depressed, the controlling mechanism—that is to say, that mechanism which has its operation controlled by the diameter of a coin—is operated, which causes the gear-wheel 142 to partly rotate and the stud 147 to come into engagement with the lower end of the releasing-lever 259, rocking said lever, lowering the rack-bar 258, so that the lug 257 will not be in engagement therewith, and consequently the action of the spring 254 will move the holding-arm 242 rearwardly, carrying the lever 245 therewith, and return the slide 247 to its normal position. A means is employed to permit of the releasing of the holding-arm 242 if an operator should hold the slide 247 in its forward position when depressing a key-lever, and said means consists of providing the lever 245 with an elongated notch 262, which is arranged in the front of the lever 245 opposite the rear side of the holding-arm 242. Said notch is closed by means of an offset 263, carried on the lower end of an arm 264, pivoted at its lower end, as at 265, to the lever 245. The arm 264 at its upper end is pivoted, as at 266, (one of the holes for the pivot being slotted,) to a lever 267, which is in turn pivoted at its upper end, as at 268, to the lever 245 and has a forwardly-projecting curvilinear extension 269 resting against the lower face of the rack-bar 258. If the slide 247 should be held by the operator while depressing a key-lever, the stud or pin 147 will engage with the releasing-lever 259, consequently lowering the rack-bar 258, which in turn will rock the lever 267. The lever 267 in turn will rock the arm 264 and remove the offset 263, so that the arm 242 can ride in the notch 262, and the offsets 243 will be withdrawn from the slots 244, so that the coin can then enter the chute 231. When the operator releases the slide, the lever 245 may move rearwardly and move its notch 262 away from the holding-arm 242, and the offset 263 will assume its normal position and again close the notch 262. It may be well to state that the cash receiving and separating mechanism is adapted to operate in the same manner as that of Patent No. 750,718—that is to say, it receives the coin, holds it temporarily, so that the operation of the deflecting and ejecting mechanism can be had through the medium of the finger 237 and that the operation of the locking-plates for the key-levers can also be had through the medium of the finger 237. The cash receiving and separating mechanism also acts to hold the coin in the chute 230, so that the feeling-finger 146 can engage the edge of the coin, and consequently control the operation of the operating means for the combined check and coin ejectors. The cash receiving and separating mechanism also acts to separate the coins inserted, so that they will be disposed in their respective tubes. Such separation is caused by providing the chute 231 with shoulders in the same manner as the lower chute of the cash receiving and separating mechanism, as shown in Patent No. 750,718.

The locking mechanism for the key-levers, Figs. 3, 14 and 15, is adapted to prevent the registration or recording of a larger amount than the value of the coin placed in the machine, or rather to prevent the operation of a key-lever which indicates a greater value than the value of the coin which is inserted in the cash receiving and separating mechanism, and said locking mechanism consists of a series of vertically-hanging flat locking-plates loosely mounted upon the bar 160 and indicated by the reference characters 270, 271, 272, and 273. These locking-plates are normally in engagement with the studs or pins 274, carried by the lifting-rods 200. The plate 270 is adapted to normally retain the lifting-rod for the five-cent key-lever in its lowered or inoperative position, the plate 271 is adapted to normally retain the lifting-rod 200 for the ten-cent key-lever in its lowered or inoperative position, the plate 272 is adapted to normally retain the lifting-rods 200 for the fifteen-cent, twenty-cent, and twenty-five-cent key-levers in their lowered or inoperative positions, and the plate 273 is adapted to normally retain the lifting-rods 200 for the thirty-cent, thirty-five-cent, forty-cent, forty-five-cent, and fifty-cent key-levers in their lowered or inoperative positions. By providing these locking-plates the key-levers are normally locked and cannot be operated unless a coin is inserted in the machine. When a nickle is inserted, the only locking-plate released is the plate 270; when a dime is inserted, the locking-plates released are the plates 270 and 271; when a twenty-five-cent piece is inserted, the only locking-plates released are the plates 270, 271, and 272, and when a fifty-cent piece is inserted all of the plates 270, 271, 272, and 273 are released. The plate 270 has an upwardly and rearwardly extending arm 275, the plate 271 a similar arm 276, the plate 272 a similar arm 277, and the plate 273 a similar arm 278. Each of the arms 275, 276, 277, and 278 at its upper end is provided with a forwardly-projecting slotted protuberance 279. Within the slotted protuberance 279 of the arm 275 operates a stud 280, carried on the rear end of a shifting-lever 281 for the plate 270; within the slotted protuberance 279 of the arm 276 operates a stud 282, carried on the rear end of a shifting-lever 283 for the plate 271; within the slotted protuberance 279 of the arm 277 operates a stud 284, carried on the rear end of a shifting-lever 285 for the plate 272, and within the slotted protuberance 279 of the arm 278 operates a stud 286, carried on the rear end of a shifting-lever 287 for the plate 273. The levers 281, 283, 285, and 287 are of different lengths, the lever 287 being the longest, the lever 285 shorter than the lever 287, and the lever 283 shorter than the lever 281. The levers 281, 283, 285, and 287 project forwardly and are pivotally supported in a hanger 288, depending from the plate 185. Projecting forwardly from the hanger 288 is a spacing-comb 290 for the levers. The lever 287 is operatively connected with the lever 285 through the medium of a hook 291, carried by the lever 287 and adapted to engage with the lever 285 when the lever 287 is operated. The lever 285 is operatively connected with the lever 283 through the medium of a hook 292, carried by said lever 285, and which is adapted to engage with the lever 283 when said lever 285 is operated. The lever 283 is operatively connected with the lever 281 through the medium of a hook 293, which is adapted to engage with the lever 281 when said lever 283 is operated. The lever 281 is operated independently of the other levers. The lever 283 is operated independently of the levers 285 and 287; but when it is operated it carries the lever 281 therewith through the medium of the hook 293. The lever 285 is operated independently of the lever 287; but when operated it carries the levers 281 and 283 therewith through the medium of the hooks 292 and 293. When the lever 287 is operated, it carries the levers 281, 283, and 285 therewith through the medium of the hooks 291, 292, and 293. The levers after being operated are returned to their normal positions through the medium of the springs 294, connected to the levers and to the hanger 288. The levers 281, 283, 285, and 287 are adapted to extend in the path of the finger 237, so that when said finger is operated the rear end of said finger, which has its movement controlled by the diameter of the coin inserted in the machine, and consequently when the finger 237 is operated the rear end of the finger 237 will engage with a certain one of the levers 281, 283, 285, and 287, and thereby operate the locking-plates. For example, if a nickel is placed in the machine the section 237$^a$ of the finger mechanism will engage the forward end 295 of the lever 281 and operate it, thereby removing the plate 270 from the stud 274 of the rod 200 and permit the operation of the nickel key-lever. If a dime is inserted in the machine, the rear end of the section 237$^a$ will engage with the forward end 296 of the lever 283, consequently operating the plates 270 and 271 and releasing the five and ten cent key-levers. If a quarter is placed into the machine, the rear end of the section 237$^a$ will be deflected, so as to engage the forward end 297 of the lever 285, and consequently release the plates 272, 271, and 270 and permit of the operation of any of the key-levers up to twenty-five cents, and if a fifty-cent piece is inserted in the machine the rear end of the section 237$^a$ will engage the forward end 298 of the lever 287, and consequently release all the locking-plates and permit of the operation of any of the key-levers.

The operation of the finger mechanism in connection with the operating-levers for the locking-plates is as follows: On the insertion of a coin in the chute 230 and the drawing forward of the actuating-slide 247 and trip-lever 246 the trip-lever engages with the stud 237$^n$ and carries it forward and with it the upper part of the link 237$^c$. The lower part moving rearwardly causes the rear end of section 237, because of the connection between them, to be elevated, and the forward end of the section 237 is consequently depressed. As soon as the forward end of the section 237 comes in contact with the edge of a coin in the chute 230 the downward movement is arrested and the section 237$^a$ begins an independent movement (the section 237$^a$ in its normal position resting against the under side of the section 237, owing to the tension of the spring 287$^m$, which by its action draws the section 237$^a$ forwardly) because of the continued movement of the link 237$^c$. After the section 237 has been arrested by the coin the rearward movement of the lower end of the link 237$^c$ carries with it the section 237$^a$ in the same direction because of the connection at 237$^e$ and 237$^g$. The lower or rear end of the section 237$^a$ then actuates the proper lever and the proper locking-plate according to the denomination of the coin. The advantage of this improved form of finger mechanism is that the section 237$^a$, before the section 237 comes in contact with the coin, is always well out of the way of the parts it is to actuate, the rear end of the section 237$^a$ moves through a greater arc, the section 237 is arrested by the coin, and when arrested the section 237$^a$ has a rearward movement and comes into contact with the parts it is to actuate in a more positive manner. The increased arc through which the section 237$^a$ moves at its rearward end, together with its rearward movement, enable a better disposition of the various parts it is to actuate.

The combined check and coin receiving receptacle, which is adapted to receive the checks and coins when they are discharged from their tubes, is best shown in Figs. 1 and 3 and is arranged below the check and coin tubes at the front of the machine, and consists of an upper and a lower section 299 and 300, respectively. The upper section 300 is of inverted-cone shape and is secured at its rear to the plate 26, as at 301, in any suitable manner. The upper section 299 is of such size as to extend below all of the check and coin tubes. The lower section 300 is cylindrical in contour and projects downwardly into the receptacle 18. The lower section opens at its upper end into the upper section 299 and has its lower end closed by means of a spring-actuated sliding plate 302, having a thumb-piece 303. The plate 302 is adapted to be moved rearwardly, so as to open the combined check and coin receiving receptacle, and allows the checks and coins therein to fall therefrom into the operator's hand. The plate 302 is normally retained in its closing position through the action of a spring 304, suitably connected thereto and to said section 300.

The machine is provided with a means to prevent the return of the key-lever unless a full stroke has been imparted to the key-lever, and said means consists of a transversely-extending bar 305 (best shown in Fig. 2) and which is arranged at the back of the machine and operates vertically between the guide-keepers 306. The normal position of the bar 305 is below the rear end of the key-levers, but projects away therefrom. The ends of the bar 305 are bent upwardly, as at 307, and engage in slots 308, formed in the rear end of the arms 93 and 95, Fig. 13. When a key-lever is depressed, the arms 93 and 95 are elevated, which carries the bar 305 therewith, the movement of the bar being upwardly and inwardly and below the rear end of the depressed key-lever. If the complete stroke has not been given to the key-lever which is operated, the bar 305 remains stationary, so it will arrest the return movement of the key-lever until a complete stroke is made. The bar 305 is substantially the same as the bar for such purpose disclosed in Patent No. 750,718 and which is designated in said patent by the reference character 327.

The chute 230 of the cash receiving and separating mechanism has communicating therewith an auxiliary chute 309, by which a counterfeit coin or other device inserted in the machine to beat it is discharged therefrom. The chute 309 receives the deflected counterfeits, which are deflected through the medium of the detecting and deflecting mechanism in the same manner as that shown and described in Patent No. 750,718. The chute 309 communicates with an opening 310 in the side plate 2 of the casing.

The machine is further provided with a mechanism to prevent its operation when a counterfeit has been inserted therein, and such mechanism is operated by the counterfeit, which is discharged from the machine, or, in other words, after a counterfeit has been placed in the machine and discharged therefrom the operation of the machine cannot be had until the mechanism which has been operated by the counterfeit is released. The mechanism which is operated by the discharge of the counterfeit from the machine consists of a swinging arm 311, which extends downwardly at the front of the chute 230 and into the chute 309 in the path of the counterfeit as it is being discharged from the machine. The arm 311 is best shown in Figs. 1 and 27. The arm 311 extends over the top of the chute 230 and is pivoted to the back of the chute, as at 312, and is beveled at its rear end, as at 313. The arm 311 is adapted to have its beveled end engage and operate a rock-arm 314, secured to the back of the chute 230. The arm 314 is pivoted at 315 and has one end provided with a downwardly-inclined portion 316, which is engaged by the beveled end 313 of the swinging arm 312. The other end of the arm 314 is provided with a rearwardly-extending projection 317, adapted to be engaged by a releasing means to be hereinafter referred to. The normal position of the arm 314 is above the upper end of the slot 253; but when it is engaged by the beveled end 313 of the arm 311, said arm 311 being actuated by the passage of the counterfeit, said beveled end 313 of the arm 311 will engage the end 316 of the arm 314 and move it downwardly across the slot 253 at the back thereof, and consequently prevent the operation of the feeling or controlling finger 146, for the reason that on the forward movement of the feeling-finger 146 it enters the slot 253 at the top thereof. Therefore it will be evident that if the arm 314 extends across the slot 253 it will be in the path of the feeling or controlling finger 146, so as to arrest the movement thereof.

The arm 314 is returned to its normal position—that is, above the top of the slot 253—through the medium of a releasing mechanism operated by the releasing-lever 18'. This releasing mechanism consists of a forwardly-curved elongated arm 318, Fig. 4, carrying on its forward end a projection 319, adapted when said arm 318 is operated to engage with the projection 317 on the arm 314, thereby rocking said arm 314 in an opposite direction to that direction caused by the beveled end 313 of the arm 311, and thereby removing said arm 314 from the path of the finger 146. The arm 318 has its inner end connected to a sleeve 320, mounted upon the bar 160, Fig. 14. The sleeve 320 has depending therefrom a plate 321, provided with a cam-slot 322, in which operates a stud 323, Fig. 2, carried by the lift-rod 200, mounted upon the rear end of the releasing-lever 18'. When the releasing-lever 18' is operated, it will cause the stud 323 to travel up in the cam-slot 322, and consequently rock the plate 321, which in turn will cause a downward movement to be imparted to the arm 318, so that the projection 319 on the forward end of the arm 318 will engage the projection 317 on the arm 314 and rock the said arm 314, thereby moving the said arm 314 out of the path of the feeling or controlling finger 146, so that the machine can be operated when another coin is placed therein.

In Fig. 29 is shown the weighted follower, which consists of a circular weight 324, carrying the protuberance 325.

In Fig. 31 is shown a mechanism for locking the machine when a tube is empty, an indicating mechanism for indicating a nearly-empty tube, and a chute device for filling the check and coin tubes. The locking mechanism for locking the machine when a tube is empty is arranged at the back of the tubes and below the supporting-plate 26, and said mechanism consists of a series of vertically-extending levers 326 for each of the tubes, (only one lever 326 being shown.) Each of said levers 326 at its upper end extends above its respective tube, and its lower end is pivoted to a rod 327, extending across the machine and fixed to the supporting-standards. Depending from the rod 327 is a series of levers 328, which coöperate with the levers 326—that is to say, there is a lever 328 for every lever 326. Each of the levers 328 is pivotally connected at its upper end to the rod 327, and said rod 327 has collars suitably mounted thereon to keep each pair of levers—that is to say, a lever 326 and its respective lever 328—in their proper positions. Each of the levers 328 has the lower end of a leaf-spring 329 fixed thereto, as at 329ᵃ, while the upper part of said spring 329 bears against the lever 326. The leaf-spring 329 when the levers 326 328 are in their normal positions does not exert any pressure on said levers. At the rearward inner side of all of the check and coin tubes at their lower ends are vertical grooves, and at the top of these grooves are square openings through the real walls of the tubes. In these grooves and through the openings is loosely fitted the inverted-L-shaped members 330, whose cross-sections are squared to the holes and grooves. The vertical portion of the members 330 when in their normal positions do not project into the tubes and do not obstruct the passage of the coins and checks down the tubes. The lower ends of the members 330 will pass above the last or the last two coins or checks in the tubes. The horizontal portions of the members 330 have thereon the compression-springs 332, which are retained in place by the collars 331. These compression-springs are for the purpose of retaining the members 330 in their normal position. Passing through the plate 26, through suitable holes therein, are the levers 333. These levers are fixed to the plate 26 by means of the lugs 333'. The upper ends of the levers 333 are yoke-shaped and embrace the horizontal portion of the members 330, resting against the rearward side of the collars 331. The lower portions of the levers 328 are yoke-shaped and embrace the portion of the members 330 to the rear of the levers 333. Extending across the machine and loosely pivoted in the supporting-standards is the plate 334, pivoted as at 336. The plate 334 is suitably cut away in its upper portion, so as not to interfere with other depending parts of the machine, and is so cut away in its lower portion as to only interfere with the movement of the key-levers when in its operable position. The upper and lower portions of the plate are so adjusted as to be evenly balanced on the pivots 336. To either end of the plate 334 are fixed the curved rods 337, which pass through the studs 338, fixed in the supporting-standards on the rods 337. Between the plate 334 and the studs 338 are suitable compression-springs for holding the plate 334 in its normal position.

The foregoing mechanism is operated through the medium of an extension on the lower end of the lever 245, and said extension is in the form of an inverted T, the vertical member thereof being indicated by the reference character 245$^a$ and the horizontal member thereof being indicated by the reference character 245$^b$. The horizontal member 245$^b$ extends across the rear of the tubes and bears against the levers 326. The operation of this mechanism is as follows: When the slide 247 is drawn forward, the extension 245$^a$ of the lever 245 is moved rearwardly, and this moves in the same direction as the levers 326. If all of the tubes have a sufficient number of coins or checks therein, the members 330 will not leave their respective grooves, being prevented from so doing by the contents of the tubes, and the movements of the levers 326 are expended against the leaf-springs 329. Should one of the tubes not have a sufficient number of coins or checks in it to retain the members 330 in their grooves, then the tension on the leaf-spring 329 will cause the lever 328 to move forward, because the members 330 are free to move in the same direction, carrying lever 333 in its upper part therewith, and the lower part of lever 333 moving rearwardly depresses the lower portion of the pivoted plate 334, so that it assumes a vertical position and prevents the depression of any of the key-levers 19. As soon as the tube is replenished or the lever 245 returned to its normal position all of the other parts will assume their normal positions.

For the purpose of visibly indicating that a tube or tubes is or are about empty and that the machine will become locked each tube is provided with an indicator. This consists of the lever 339, Fig. 31, supported on the tube by the studs 340. The lower end of the lever 339 is carried rearwardly, as at 339'. Through a hole in the tube the upper end of the lever 339 is carried forwardly and supports a card or indicator 341, which is provided with any suitable inscription that can be read through the opening 6' when in its operated position. This device is shown in its operated position as the tube shows empty; but when coins or checks are placed in the rear portion of the tube and the front section closed against it the device will automatically assume the position indicated by the dotted lines.

The chute arrangement for filling the tubes is as follows: Attached to the plate 7 on the inside thereof is a series of chutes 342. These chutes are for the purpose of replenishing the various coin and check tubes without opening the machine. These chutes are of such size and shape as to be adapted to receive the coin or check of the proper denomination for the particular tube. Access to the chutes is had by means of the removable or hinged cover 7', which is normally locked. This device enables the replenishment of the tubes to be done by a subordinate who is in possession of the proper key; but it does not give him access to the inside of the machine, and no coins can be removed by him, nor can the records shown on the register be changed.

Attached to the rack-bar 139 may be arranged a suitable stud or trip, this stud or trip at each operation of the machine coming in contact with the operating mechanism of a bell, so that audible notice of such operation of the machine may be given.

The general operation of the machine is as follows: Suppose, for instance, a person desires a five-cent check and no change. The value of the five-cent check being a nickel, a nickel is inserted in the machine—that is, in the entrance-opening of the chute 230—the operating-slide 247 of the cash receiving and separating mechanism is moved forwardly, and by such operation the nickel is allowed to pass down the chute 230. The key-lever for the five-cent value is depressed, which will cause the operation of the controlling mechanism, and the feeling-finger 146 of the controlling mechanism will be moved forwardly into the slot 253, where its movement will be arrested by the edge of the nickel supported upon the offsets 247. When the controlling mechanism is operated, the fingers 100, 101, 102', 104, and 105 will be elevated until the feeling-finger 146 is arrested by the edge of the nickel in the chute 230. When the key-lever of the five-cent value is depressed, it will engage one of the tines of the comb 123, and consequently shift the finger 102' to a position back of the lug 77 of the ejector for the nickel-check. The height of all of the fingers 100, 101, 102', 104, and 105, owing to their elevation by the controlling mechanism, will be such that on the forward movement of the said fingers only the finger 102' will engage with an ejector, the finger 102' engaging with the lug 77 and operating the ejector for the nickel-checks, and consequently the nickel-check will be the only thing discharged from the machine into the check and coin receiving receptacle, so that the operator can upon opening said receptacle obtain the check. If a dime should be placed in the machine and a nickel-check is desired, the controlling mechanism will so elevate the fingers 100, 101, 102', 104, and 105 that all of said fingers, with the exception of finger 102', will not operate any of the ejectors; but the position of the finger 102' will be such as to engage the L-shaped arm 63, and consequently on the operation of the finger 102' it will operate the nickel-ejector and the nickel-check ejector simultaneously, and a nickel-check and a nickel change will be discharged from the machine. If a dime is inserted in the machine and a dime-check is desired, the key-lever of the ten-cent value will be depressed, and when depressed it will engage its respective tine 132 of the comb 122, consequently shifting said comb, and the yoke 134 of said comb will cause the finger 100 to be positioned back of the lug 90, and consequently on the forward movement of the finger 100 the dime-check ejector, of which the lug 90 is a part, will be operated, and consequently a dime-check will be discharged from the machine. If a quarter is inserted in the machine, to obtain a nickel-check and twenty-cents change the fingers 100, 101, 102', 104, and 105 will be so elevated that when the key-lever of the nickel value is depressed said fingers will be elevated by the controlling mechanism so that the fingers 100, 101, and 102' will be the only fingers that engage and operate their respective ejectors, and therefore the position of these fingers will be such as to operate on their forward movement the two dime-ejectors and the nickel-ejector as the fingers on their forward movement will engage the lugs 77 of the nickel-check ejector and the lugs 68 and 71 of the two dime-ejectors, and consequently two dimes and a check will be discharged from the machine. If a quarter is placed in the machine, so as to get two dime-checks and a nickel change the fingers 100, 101, and 102' are the only fingers that will operate the necessary ejectors, and when the key-lever of the twenty-cent value is operated it will shift the combs 121 and 122, and consequently shift the fingers 100 101 to a position back of the lugs 90, 81, and 62. On the froward movement of the fingers 100 101 102' the two dime-check ejectors will be operated and the nickel-cash ejector will be operated, and consequently two dime-checks and a nickel will be discharged from the machine. It is thought unnecessary to describe all the various combinations in connection with discharging the change and checks, for the reason that when it is necessary to discharge the checks with or without change the key-lever of the value of the check desired is depressed, and which causes the necessary shifting of the fingers 100, 101, 102', and 104, and also as the upward movement of said fingers is controlled by the controlling mechanism, which is in itself controlled by the diameter of the coin inserted in the manner as hereinafter set forth it will be evident that the necessary check and change will be discharged. It may be well to state, however, that the twenty-five-cent cash-ejector is not operated until it requires more change than the amount of twenty-five cents—that is to say, if twenty-five cents change is desired two dimes and a nickel are discharged, but if thirty cents is desired a quarter and a nickel are discharged.

The tines of the various shiftable combs are so placed that when engaged by their respective key-levers the necessary shifting movement will be imparted to the fingers 100, 101, 102', and 104 so as to engage the proper ejectors and cause the necessary checks and the change, if necessary, to be discharged from the machine. When a key-lever is operated, it will be evident that the registering mechanism will also be operated in a manner as hereinbefore described, so that the registering mechanism will record the correct value of the checks discharged from the machine. When a key-lever is depressed, the mechanism for indicating the value of the check discharged will be exposed in the compartment at the top of the machine in the manner as hereinbefore set forth, and at the same time the means for indicating the value of the coin inserted will also be exposed in the compartment at the top of the machine in the manner as hereinbefore set forth. The releasing-lever 18' enables the making of change as well as the performance of the function hereinbefore set forth. It will be observed from Fig. 17 of the drawings that the releasing-lever does not contact with any of the shiftable combs 179, 120, 121, 122, and 123 nor the bodily-movable series of cams 158. When making change, the operation of the ejecting mechanism is controlled by the controlling mechanism. The normal position of the fingers 100, 101, 102', 104, and 105 is back of and in alinement with the lugs of the various coin-ejectors, and the operation of the fingers is controlled by the diameter of the coin to be changed. If a quarter is inserted, the diameter thereof will control the vertical movement of the fingers 100, 101, 102', 104, and 105, so that the fingers 104 and 105 will pass over the twenty-five-cent and fifty-cent ejectors, but the other fingers will engage the two dime-ejectors and the nickel-ejector. If a half-dollar is inserted in the machine, the fingers will be so elevated that but one—that is, finger 105—will pass over the half-dollar-ejector, while the other fingers will operate the nickel, twenty-five-cent, and two dime ejectors, and consequently eject the necessary change. If a dollar is inserted in the machine, all of the fingers will engage the ejectors, and consequently discharge a fifty-cent piece, a quarter, two dimes, and a nickel. The locking mechanism for the key-levers and the detecting and deflecting mechanism will also be operated when the coin is inserted through the medium of the finger 237 in a manner as hereinbefore set forth.

In Figs. 32 and 33 is shown a modified form of means for indicating the value of cash inserted in the machine, and in this connection in lieu of the plate 184, carrying the separate indications referred to, a drum 343, carrying such separate indications, is employed, and which is rotatably mounted within the machine at the top thereof and provided with a pinion 344, adapted to engage with the teeth 345 of the rod 346. The rod 346 is substantially, with the exception of the teeth 345, of the same construction as the rod 183. The rod 346 is operated in the same manner as the rod 183—that is to say, by the rearwardly-extending lug 151 of the controlling mechanism.

From the foregoing description, taken in connection with the drawings, it will be evident that what may be termed a "mechanical cashier" is set forth, which will receive the cash, automatically discharge the amount of change necessary, automatically discharge the necessary purchase check or checks when the cash therefor is inserted in the machine, which registers the total amount of cash received for the purchase-checks delivered, indicates the value of the purchase check or checks delivered at each operation of the machine, indicates the value of the cash inserted in the machine when it is desired to have a check or checks delivered, and detects and discharges any counterfeit coins inserted, and it is thought the many advantages of such a machine can be thoroughly understood. It will furthermore be evident that changes, variations, and modifications can be resorted to without departing from the spirit of my invention or sacrificing any of its advantages, and I therefore do not wish to restrict myself to the details of construction hereinbefore described, and set forth in the annexed drawings, but reserve the right to make such changes, variations, and modifications as come within the scope of the protection prayed.

Having thus fully described my invention, what I claim as new, and desire to secure by Letters Patent, is—

1. In a machine of the character described, a change-making and combined purchase-check and cash ejecting mechanism, said mechanism adapted when operated to eject the change between the value of the check ejected and the value of the coin inserted in the machine, mechanism controlled by the diameter of the coin inserted for controlling the operation of said change-making and combined purchase-check and cash ejecting mechanism, and operating means for said mechanisms.

2. In a machine of the character described, a change-making and combined purchase-check and cash ejecting mechanism, said mechanism adapted when operated to eject the change between the value of the check ejected and the value of the coin inserted in the machine, mechanism controlled by the diameter of the coin inserted for controlling the operation of said change-making and combined purchase-check and cash ejecting mechanism, and a series of key-levers for operating said mechanisms.

3. In a machine of the character described, a change-making and combined purchase-check and cash ejecting mechanism, said mechanism adapted when operated to eject the change between the value of the check ejected and the value of the coin inserted in the machine, mechanism controlled by the diameter of the coin inserted for controlling the operation of said change-making and combined purchase-check and cash ejecting mechanism, means for operatively connecting said mechanisms together, and operating means for said change-making and combined purchase-check and cash ejecting mechanism, said latter mechanism when operated adapted to throw into operation said controlling mechanism.

4. In a machine of the character described, a change-making and combined purchase-check and cash ejecting mechanism, said mechanism adapted when operated to eject the change between the value of the check ejected and the value of the coin inserted in the machine, mechanism controlled by the diameter of the coin inserted for controlling the operation of said change-making and combined purchase-check and cash ejecting mechanism, means for operatively connecting said mechanisms together, and a series of levers for operating said change-making and combined purchase-check and cash ejecting mechanism, said latter mechanism when operated adapted to throw into operation said controlling mechanism.

5. In a machine of the character described, a change-making and combined purchase-check and cash ejecting mechanism, said mechanism adapted when operated to eject the change between the value of the check ejected and the value of the coin inserted in the machine, mechanism controlled by the diameter of the coin inserted for controlling the operation of said change-making and combined purchase-check and cash ejecting mechanism, a registering mechanism for registering the total values of the checks ejected, and operating means for said mechanisms.

6. In a machine of the character described, a change-making and combined purchase-check and cash ejecting mechanism, said mechanism adapted when operated to eject the change between the value of the check ejected and the value of the coin inserted in the machine, mechanism controlled by the diameter of the coin inserted for controlling the operation of said change-making and combined purchase-check and cash ejecting mechanism, a registering mechanism for registering the total value of the checks ejected, and a series of key-levers for operating said mechanism.

7. In a machine of the character described, a change-making and combined purchase-check and cash ejecting mechanism, said mechanism adapted when operated to eject the change between the value of the check ejected and the value of the coin inserted in the machine, mechanism controlled by the diameter of the coin inserted for controlling the operation of said change-making and combined purchase-check and cash ejecting mechanism, means for operatively connecting said mechanisms together, a registering mechanism for registering the total value of the checks ejected, and operating means for said registering mechanism and for said change-making and combined purchase-check and cash ejecting mechanism, said latter mechanism when operated adapted to throw into operation said controlling mechanism.

8. In a machine of the character described, a change-making and combined purchase-check and cash ejecting mechanism, said mechanism adapted when operated to eject the change between the value of the check ejected and the value of the coin inserted in the machine, mechanism controlled by the diameter of the coin inserted for controlling the operation of said change-making and combined purchase-check and cash ejecting mechanism, means for operatively connecting said mechanism together, a registering mechanism for registering the total value of the checks ejected, and a series of key-levers for operating said registering mechanism and for said change-making and combined purchase-check and cash ejecting mechanism, said latter mechanism when operated adapted to throw into operation said controlling mechanism.

9. In a machine of the character described, a change-making and combined purchase-check and cash ejecting mechanism adapted to have its operation controlled by the diameter of a circular object, a registering mechanism for registering the total value of the purchase-checks ejected, means for indicating the value of cash inserted in the machine, said means having its movement controlled by the diameter of a circular object, means for indicating the value of the check ejected, means for distributing the cash inserted in the machine, and means for operating said mechanism, cash-value-indicating, check-value-indicating and cash-separating means, said mechanisms and means operatively connected with each other.

10. In a machine of the character described, a change-making and combined purchase-check and cash ejecting mechanism adapted when operated to eject the change between the value of the check ejected and the value of the coin inserted in the machine, mechanism adapted to engage the edge of and have its movement controlled by the diameter of a coin for controlling the operation of said change-making and combined purchase-check and cash ejecting mechanism, and means for suitably operating said mechanisms.

11. In a machine of the character described, a change-making and combined purchase-check and cash ejecting mechanism adapted when operated to eject the change between the value of the check ejected and the value of the coin inserted in the machine, mechanism adapted to engage the edge of and have its movement controlled by the diameter of a coin for controlling the operation of said change-making and combined purchase-check and cash ejecting mechanism, and a series of key-levers for suitably operating said mechanisms.

12. In a machine of the character described, a change-making and combined purchase-check and cash ejecting mechanism adapted when operated to eject the change between the value of the check ejected and the value of the coin inserted in the machine, mechanism adapted to engage the edge of and have its movement controlled by the diameter of a coin for controlling the operation of said change-making and combined purchase-check and cash ejecting mechanism, a registering mechanism for registering the total value of the checks ejected, and means for suitably operating said mechanism.

13. In a machine of the character described, a change-making and combined purchase-check and cash ejecting mechanism adapted when operated to eject the change between the value of the check ejected and the value of the coin inserted in the machine, mechanism adapted to engage the edge of and have its movement controlled by the diameter of a coin for controlling the operation of said change-making and combined purchase-check and cash ejecting mechanism, a registering mechanism for registering the total value of the checks ejected, and a series of key-levers for suitably operating said mechanisms.

14. In a machine of the character described, a change-making and combined purchase-check and cash ejecting mechanism adapted when operated to eject the change between the value of the check ejected and the value of the coin inserted in the machine, mechanism adapted to engage the edge of and have its movement controlled by the diameter of a coin for controlling the operation of said change-making and combined purchase-check and cash ejecting mechanism, a registering mechanism for registering the total value of the checks ejected, and means for simultaneously operating said mechanism.

15. In a machine of the character described, a change-making and combined purchase-check and cash ejecting mechanism adapted when operated to eject the change between the value of the check ejected and the value of the coin inserted in the machine, mechanism adapted to engage the edge of and have its movement controlled by the diameter of a coin for controlling the operation of said change-making and combined purchase-check and cash ejecting mechanism, a registering mechanism for registering the total value of the checks ejected, and a series of key-levers for simultaneously operating said mechanisms.

16. A machine of the character described comprising a series of check and coin receptacles, a cash receiving and separating mechanism for delivering cash to the said coin-receptacles, a cash detecting and deflecting mechanism engaging with and operated by said receiving and separating mechanism, a change-making and combined purchase-check and cash ejecting mechanism, a controlling mechanism for said change-making and combined purchase-check and cash ejecting mechanism, a registering mechanism, and means for operating the registering mechanism, check and cash ejecting and change-making mechanism and said controlling mechanism.

17. A machine of the character described, comprising a series of check and coin receptacles, a cash receiving and separating mechanism for delivering cash to the said coin-receptacles, a cash detecting and deflecting mechanism engaging with and operated by said receiving and separating mechanism, a change-making and combined purchase-check and cash ejecting mechanism, a controlling mechanism for said change-making and combined purchase-check and cash ejecting mechanism, a registering mechanism, and means for simultaneously operating the registering mechanism, check and cash ejecting and change-making mechanism and said controlling mechanism.

18. A machine of the character described, comprising a series of check and cash receptacles, a cash receiving and separating mechanism adapted when operated to deliver cash to the cash-receptacles, a cash deflecting and detecting mechanism engaging with and operated by said receiving and separating mechanism, a change-making and combined purchase-check and cash ejecting mechanism, a controlling mechanism for said change-making and purchase-check and cash ejecting mechanism, and means for operating said ejecting and changing mechanism and said controlling mechanism.

19. A machine of the character described, comprising a series of check and cash receptacles, a cash receiving and separating mechanism adapted when operated to deliver cash to the cash-receptacles, a cash deflecting and detecting mechanism engaging with and operated by said receiving and separating mechanism, a change-making and combined purchase-check and cash ejecting mechanism, a controlling mechanism for said change-making and purchase-check and cash ejecting mechanism, and means for simultaneously operating said ejecting and changing mechanism and said controlling mechanism.

20. A machine of the character described, comprising a series of check and cash receptacles, a cash receiving and separating mechanism adapted when operated to deliver cash to the cash-receptacles, a cash deflecting and detecting mechanism engaging with and operated by said receiving and separating mechanism, a change-making and combined purchase-check and cash ejecting mechanism, a controlling mechanism for said change-making and purchase-check and cash ejecting mechanism, and a series of key-levers for operating said ejecting and changing mechanism and said controlling mechanism.

21. A machine of the character described, comprising a series of check and cash receptacles, a cash receiving and separating mechanism adapted when operated to deliver cash to the cash-receptacles, a cash deflecting and detecting mechanism engaging with and operated by said receiving and separating mechanism, a change-making and combined purchase-check and cash ejecting mechanism, a controlling mechanism for said change-making and purchase-check and cash ejecting mechanism, and a series of key-levers for simultaneously operating said ejecting and changing mechanism and said controlling mechanism.

22. A machine of the character described, comprising a series of purchase-check and cash receptacles, a cash receiving and separating mechanism adapted when operated to deliver cash to said cash-receptacles, a change-making and purchase-check and cash ejecting mechanism, a controlling mechanism for said change-making and purchase-check and cash ejecting mechanism, and means engaging with and operating the check and cash ejecting and change-making mechanism, causing thereby the operation of said controlling mechanism.

23. A machine of the character described, comprising a series of purchase-check and cash receptacles, a cash receiving and separating mechanism adapted when operated to deliver the cash to said cash-receptacles, a change-making and purchase-check and cash ejecting mechanism, a controlling mechanism for said change-making and purchase-check and cash ejecting mechanism, and a series of key-levers engaging with and operating the check and cash ejecting and change-making mechanism, causing thereby the operation of said controlling mechanism.

24. In a machine of the character described, a series of purchase-check and cash receptacles, a cash receiving and separating mechanism adapted when operated to deliver cash to said cash-receptacles, a change-making and purchase-check and cash ejecting mechanism adapted when operated to discharge checks and cash from said receptacles, a controlling mechanism for said change making and ejecting mechanism, a registering mechanism for registering the total value of the checks ejected from said receptacles, and means engaging with the registering mechanism and the ejecting and changing mechanism for operating them, said change making and ejecting mechanism when operated adapted to operate said controlling mechanism.

25. In a machine of the character described, a series of purchase-check and cash receptacles, a cash receiving and separating mechanism adapted when operated to deliver cash to said cash-receptacles, a change-making and purchase-check and cash ejecting mechanism adapted when operated to discharge checks and cash from said receptacles, a controlling mechanism for said change making and ejecting mechanism, a registering mechanism for registering the total value of the checks ejected from said receptacles, and means engaging with the registering mechanism and the ejecting and changing mechanism for simultaneously operating them, said change making and ejecting mechanism when operated adapted to operate said controlling mechanism.

26. In a machine of the character described, a series of purchase-check and cash receptacles, a cash receiving and separating mechanism adapted when operated to deliver cash to said cash-receptacles, a change-making and purchase-check and cash ejecting mechanism adapted when operated to simultaneously discharge checks and cash from said receptacles, a controlling mechanism for said change making and ejecting mechanism, a registering mechanism for registering the total value of the checks ejected from said receptacles, and a series of key-levers engaging with the registering mechanism and the ejecting and changing mechanism for operating them, said change making and ejecting mechanism when operated adapted to operate said controlling mechanism.

27. In a machine of the character described, a series of purchase-check and cash receptacles, a cash receiving and separating mechanism adapted when operated to deliver cash to said cash-receptacles, a change-making and purchase-check and cash ejecting mechanism adapted when operated to simultaneously discharge checks and cash from said receptacles, a controlling mechanism for said change making and ejecting mechanism, a registering mechanism for registering the total value of the checks ejected from said receptacles, and a series of key-levers engaging with the registering mechanism and the ejecting and changing mechanism for simultaneously operating them, said change making and ejecting mechanism when operated adapted to operate said controlling mechanism.

28. In a machine of the character described, a change-making and combined purchase-check and cash ejecting mechanism, said mechanism adapted when operated to separately eject purchase-checks, to simultaneously eject purchase-checks and the change between the value of the check ejected and the value of the cash inserted in the machine, and to eject cash independently of the checks, mechanism controlled by the diameter of the coin inserted for controlling the operation of said change-making and purchase-check and cash ejecting mechanism, means for operating said mechanisms, causing thereby the separate discharging of checks or the discharging of checks and change or the discharge of change, and means for operating said mechanisms, causing thereby the discharge of change independently of the discharge of the checks.

29. In a machine of the character described, a change-making and combined purchase-check and cash ejecting mechanism, said mechanism adapted when operated to separately eject purchase-checks, to simultaneously eject purchase-checks and the change between the value of the check ejected and the value of the cash inserted in the machine, and to eject cash independently of the checks, mechanism controlled by the diameter of the coin inserted for controlling the operation of said change-making and purchase-check and cash ejecting mechanism, a series of key-levers for operating said mechanisms, causing thereby the separate discharging of checks or the discharging of checks and change or the discharging of change, and a key-lever for operating said mechanisms, causing thereby the discharge of change independently of the discharge of the checks.

30. A machine of the character described, comprising a series of check and a series of cash receptacles, a cash receiving and separating mechanism adapted when operated to suitably deliver cash to the cash-receptacles, ejectors for discharging checks and cash from said receptacles, mechanism for regulating the movement of the said ejectors, means engaging with the ejectors for operating them to separately discharge cash or checks or to discharge simultaneously cash and checks, mechanism for controlling the operating means for the ejectors, and means for operating said regulating and controlling mechanism and said operating means.

31. A machine of the character described, comprising a series of check and a series of cash receptacles, a cash receiving and separating mechanism adapted when operated to suitably deliver cash to the cash-receptacles, ejectors for discharging checks and cash from said receptacles, mechanism for regulating the movement of the said ejectors, means engaging with the ejectors for operating them to separately discharge cash or checks or to discharge simultaneously cash and checks, mechanism for controlling the operating means for the ejectors, and a series of key-levers for operating said regulating and controlling mechanism and said operating means.

32. A machine of the character described, comprising a series of check and a series of cash receptacles, a cash receiving and separating mechanism adapted when operated to suitably deliver cash to the cash-receptacles, ejectors for discharging checks and cash from said receptacles, mechanism for regulating the movement of the said ejectors, means engaging with the ejectors for operating them to separately discharge cash or checks or to discharge simultaneously cash and checks, mechanism for controlling the operating means for the ejectors, and means for operating the ejectors' operating means and said regulating and controlling mechanisms simultaneously.

33. A machine of the character described, comprising a series of check and a series of cash receptacles, a cash receiving and separating mechanism adapted when operated to suitably deliver cash to the cash-receptacles, ejectors for discharging checks and cash from said receptacles, mechanism for regulating the movement of the said ejectors, means engaging with the ejectors for operating them to separately discharge cash or checks or to discharge simultaneously cash and checks, mechanism for controlling the operating means for the ejectors, and a series of key-levers for operating the ejectors' operating means and said regulating and controlling mechanism simultaneously.

34. A machine of the character described, comprising a series of check and a series of cash receptacles, a cash receiving and separating mechanism adapted when operated to suitably deliver cash to the cash-receptacles, ejectors for discharging checks and cash from said receptacles, mechanism for regulating the movement of the said ejectors, means engaging with the ejectors for operating them to separately discharge cash or checks or to discharge simultaneously cash and checks, mechanism for controlling the operating means for the ejectors, a registering mechanism, and means for operating said regulating, controlling and registering mechanisms and said ejectors' operating means.

35. A machine of the character described, comprising a series of check and a series of cash receptacles, a cash receiving and separating mechanism adapted when operated to suitably deliver cash to the cash-receptacles, ejectors for discharging checks and cash from said receptacles, mechanism for regulating the movement of the said ejectors, means engaging with the ejectors for operating them to separately discharge cash or checks or to discharge simultaneously cash and checks, mechanism for controlling the operating means for the ejectors, a registering mechanism, and a means for operating said regulating, controlling and registering mechanisms and said ejectors' operating means simultaneously.

36. A machine of the character described, comprising a series of check and a series of cash receptacles, a cash receiving and separating mechanism adapted when operated to suitably deliver cash to the cash-receptacles, ejectors for discharging checks and cash from said receptacles, mechanism for regulating the movement of the said ejectors, means engaging with the ejectors for operating them to separately discharge cash or checks or to discharge simultaneously cash and checks, mechanism for controlling the operating means for the ejectors, a registering mechanism, and a series of key-levers for operating said regulating, controlling and registering mechanisms and said ejectors' operating means.

37. A machine of the character described, comprising a series of check and a series of cash receptacles, a cash receiving and separating mechanism adapted when operated to suitably deliver cash to the cash-receptacles, ejectors for discharging checks and cash from said receptacles, mechanism for regulating the movement of the said ejectors, means engaging with the ejectors for operating them to separately discharge cash or checks or to discharge simultaneously cash and checks, mechanism for controlling the operating means for the ejectors, a registering mechanism, and a series of key-levers for operating said regulating, controlling and registering mechanisms and said ejectors' operating means simultaneously.

38. A machine of the character described, comprising means for storing purchase-value checks and cash, a change-making and check and cash ejecting mechanism, said mechanism having its movement controlled by the diameter of a circular object and adapted when operated to suitably eject the checks and the cash from said storing means, and operating means for said mechanism.

39. A machine of the character described, comprising means for storing purchase-value checks and cash, a change-making and check and cash ejecting mechanism, said mechanism having its movement controlled by the diameter of a circular object and adapted when operated to suitably eject the checks and the cash from said storing means, operating means for said mechanism adapted to have its movement controlled by the diameter of a circular object, and means for operating the operating means for said mechanism.

40. A machine of the character described, comprising means for storing purchase-value checks and cash, a change-making and check and cash ejecting mechanism, said mechanism having its movement controlled by the diameter of a circular object and adapted when operated to suitably eject the checks and the cash from said storing means, operating means for said mechanism adapted to have its movement controlled by the diameter of a circular object, and a series of key-levers for operating the operating means for said mechanism.

41. A machine of the character described, comprising means for storing purchase-value checks and cash, a change-making and check and cash ejecting mechanism, said mechanism having its movement controlled by the diameter of a circular object and adapted when operated to suitably eject the checks and the cash from said storing means, operating means for said mechanism adapted to have its movement controlled by the diameter of a circular object, means for operating the operating means for said mechanism, a registering mechanism for registering the total value of the checks ejected, and means for operating the registering mechanism and the means for operating the ejecting mechanism.

42. A machine of the character described, comprising means for storing purchase-value checks and cash, a change-making and check and cash ejecting mechanism, said mechanism having its movement controlled by the diameter of a circular object and adapted when operated to suitably eject the checks and the cash from said storing means, operating means for said mechanism adapted to have its movement controlled by the diameter of a circular object, means for operating the operating means for said mechanism, a registering mechanism for registering the total value of the checks ejected, and a series of key-levers for operating the registering mechanism and the means for operating the ejecting mechanism.

43. A machine of the character described comprising means for storing purchase-value checks and cash, a cash receiving and separating mechanism adapted when operated to suitably deliver cash to the cash-storing means, ejectors for discharging checks and cash from said storage means, means engaging with the ejectors for operating them, mechanism for regulating the ejectors' operating means, causing thereby when said operating means is operated the discharge of a check or checks, or a check or checks and cash simultaneously or cash independently of a check or checks from said storage means, mechanism for controlling the operating means for the ejectors, and means for operating said controlling means and the ejectors' operating means.

44. A machine of the character described, comprising means for storing purchase-value checks and cash, a cash receiving and separating mechanism adapted when operated to suitably deliver cash to the cash-storing means, ejectors for discharging checks and cash from said storage means, means engaging with the ejectors for operating them, mechanism for regulating the ejectors' operating means, causing thereby when said operating means is operated the discharge of a check or checks, or a check or checks and cash simultaneously or cash independently of a check or checks from said storage means, mechanism for controlling the operating means for the ejectors, and a series of key-levers for operating said controlling means and the ejectors' operating means.

45. A machine of the character described comprising means for storing purchase-value checks and cash, a cash receiving and separating mechanism adapted when operated to suitably deliver cash to the cash-storing means, ejectors for discharging checks and cash from said storage means, means engaging with the ejectors for operating them, mechanism for regulating the ejectors' operating means, causing thereby when said operating means is operated the discharge of a check or checks, or a check or checks and cash simultaneously or cash independently of a check or checks from said storage means, mechanism for controlling the operating means for the ejectors, a registering mechanism, and means for operating said regulating, controlling and registering mechanism and said operating means for the ejectors.

46. A machine of the character described, comprising means for storing purchase-value checks and cash, a cash receiving and separating mechanism adapted when operated to suitably deliver cash to the cash-storing means, ejectors for discharging checks and cash from said storage means, means engaging with the ejectors for operating them, mechanism for regulating the ejectors' operating means, causing thereby when said operating means is operated the discharge of a check or checks, or a check or checks and cash simultaneously or cash independently of a check or checks from said storage means, mechanism for controlling the operating means for the ejectors, a registering mechanism, and a series of key-levers for operating said regulating, controlling and registering mechanism and said operating means for the ejectors.

47. A machine of the character described, comprising a plurality of check and a plurality of cash receptacles, a cash receiving and separating mechanism communicating with the said cash-receptacles and adapted when operated to suitably distribute cash to said cash-receptacles, ejectors for discharging checks and cash from said receptacles, means engaging with the ejectors for operating them, mechanism for regulating the ejectors' operating means, causing thereby when said operating means is operated, the discharge of a check or checks, or a check or checks and cash simultaneously, or cash independently of a check or checks from said receptacle or receptacles, mechanism for controlling the operating means for the ejectors, and means for operating said regulating and controlling mechanisms and said operating means for the ejectors.

48. A machine of the character described, comprising a plurality of check and a plurality of cash receptacles, a cash receiving and separating mechanism communicating with said cash-receptacles and adapted when operated to suitably distribute cash to said cash-receptacles, ejectors for discharging checks and cash from said receptacles, means engaging with the ejectors for operating them, mechanism for regulating the ejectors' operating means, causing thereby when said operating means is operated, the discharge of a check or checks, or a check or checks and cash simultaneously, or cash independently of a check or checks from said receptacle or receptacles, mechanism for controlling the operating means for the ejectors, and a series of key-levers for operating said regulating and controlling mechanisms and said operating means for the ejectors.

49. A machine of the character described, comprising a plurality of check and a plurality of cash receptacles, a cash receiving and separating mechanism communicating with the said cash-receptacles and adapted when operated to suitably distribute cash to said cash-receptacles, ejectors for discharging checks and cash from said receptacles, means engaging with the ejectors for operating them, mechanism for regulating the ejectors' operating means, causing thereby when said operating means is operated, the discharge of a check or checks, or a check or checks and cash simultaneously, or cash independently of a check or checks from said receptacle or receptacles, mechanism for controlling the operating means for the ejectors, a registering mechanism for registering the total value of the checks discharged, and means for operating said regulating, controlling and registering mechanisms and said operating means for the ejectors.

50. A machine of the character described, comprising a plurality of check and a plurality of cash receptacles, a cash receiving and separating mechanism communicating with the said cash-receptacles and adapted when operated to suitably distribute cash to said cash-receptacles, ejectors for discharging checks and cash from said receptacles, means engaging with the ejectors for operating them, mechanism for regulating the ejectors' operating means, causing thereby when said operating means is operated, the discharge of a check or checks, or a check or checks and cash simultaneously, or cash independently of a check or checks from said receptacle or receptacles, mechanism for controlling the operating means for the ejectors, a registering mechanism for registering the total value of the checks discharged, and a series of key-levers for operating said regulating, controlling and registering mechanisms and said operating means for the ejectors.

51. A machine of the character described, comprising a plurality of check and a plurality of cash receptacles, a cash receiving and separating mechanism communicating with the said cash-receptacles and adapted when operated to suitably distribute cash to said cash-receptacles, ejectors for discharging checks and cash from said receptacles, means engaging with the ejectors for operating them, mechanism for regulating the ejectors' operating means, causing thereby when said operating means is operated, the discharge of a check or checks, or a check or checks and cash simultaneously, or cash independently of a check or checks from said receptacle or receptacles, mechanism for controlling the operating means for the ejectors, a registering mechanism for registering the total value of the checks discharged, and means for operating said regulating, controlling and registering mechanisms and said operating means for the ejectors simultaneously.

52. A machine of the character described, comprising a plurality of check and a plurality of cash receptacles, a cash receiving and separating mechanism communicating with the said cash-receptacles and adapted when operated to suitably distribute cash to said cash-receptacles, ejectors for discharging checks and cash from said receptacles, means engaging with the ejectors for operating them, mechanism for regulating the ejectors' operating means, causing thereby when said operating means is operated, the discharge of a check or checks, or a check or checks and cash simultaneously, or cash independently of a check or checks from said receptacle or receptacles, mechanism for controlling the operating means for the ejectors, a registering mechanism for registering the total value of the checks discharged, and a series of key-levers for operating said regulating, controlling and registering mechanisms and said operating means for the ejectors simultaneously.

53. A machine of the character described, comprising a plurality of check and a plurality of cash receptacles, a cash receiving and separating mechanism communicating with said cash-receptacles and adapted when operated to suitably distribute cash to said cash-receptacles, ejectors for discharging checks and cash from said receptacles, means engaging with the ejectors for operating them, a transversely-shiftable mechanism for regulating the ejectors' operating means, causing thereby when said operating means is operated the discharge of a check or checks, or a check or checks and cash simultaneously or cash independently of a check or checks from said receptacle or receptacles, mechanism for controlling the operating means for the ejectors, and means for operating said regulating and controlling mechanisms and said operating means for the ejectors.

54. A machine of the character described, comprising a plurality of check and a plurality of cash receptacles, a cash receiving and separating mechanism communicating with said cash-receptacles and adapted when operated to suitably distribute cash to said cash-receptacles, ejectors for discharging checks and cash from said receptacles, means engaging with the ejectors for operating them, a transversely-shiftable mechanism for regulating the ejectors' operating means, causing thereby when said operating means is operated the discharge of a check or checks, or a check or checks and cash simultaneously or cash independently of a check or checks from said receptacle or receptacles, mechanism for controlling the operating means for the ejectors, and means for operating said regulating and controlling mechanism and said operating means for the ejectors simultaneously.

55. A machine of the character described, comprising a plurality of check and a plurality of cash receptacles, a cash receiving and separating mechanism communicating with said cash-receptacles and adapted when operated to suitably distribute cash to said cash-receptacles, ejectors for discharging checks and cash from said receptacles, means engaging with the ejectors for operating them, a transversely-shiftable mechanism for regulating the ejectors' operating means, causing thereby when said operating means is operated the discharge of a check or checks, or a check or checks and cash simultaneously or cash independently of a check or checks from said receptacle or receptacles, mechanism for controlling the operating means for the ejectors, and a series of key-levers for operating said regulating and controlling mechanisms and said operating means for the ejectors.

56. A machine of the character described, comprising a plurality of check and a plurality of cash receptacles, a cash receiving and separating mechanism communicating with said cash-receptacles and adapted when operated to suitably distribute cash to said cash-receptacles, ejectors for discharging checks and cash from said receptacles, means engaging with the ejectors for operating them, a transversely-shiftable mechanism for regulating the ejectors' operating means, causing thereby when said operating means is operated the discharge of a check or checks, or a check or checks and cash simultaneously or cash independently of a check or checks from said receptacle or receptacles, mechanism for controlling the operating means for the ejectors, and a series of key-levers for operating said regulating and controlling mechanisms and said operating means for the ejectors simultaneously.

57. A machine of the character described, comprising a plurality of check and a plurality of cash receptacles, a cash receiving and separating mechanism communicating with said cash-receptacles and adapted when operated to suitably deliver cash to said cash-receptacles, ejectors for discharging checks and cash from said receptacles, means engaging with the ejectors for operating them, a transversely-shiftable mechanism for regulating the ejectors' operating means, causing thereby when said operating means is operated the discharge of a check or checks or a check or checks and cash simultaneously, or cash independently of a check or checks from a receptacle or receptacles, mechanism for controlling the operating means for the ejectors, a registering mechanism, and means for operating said regulating, controlling and registering mechanisms and said operating means for the ejectors.

58. A machine of the character described, comprising a plurality of check and a plurality of cash receptacles, a cash receiving and separating mechanism communicating with said cash-receptacles and adapted when operated to suitably deliver cash to said cash-receptacles, ejectors for discharging checks and cash from said receptacles, means engaging with the ejectors for operating them, a transversely-shiftable mechanism for regulating the ejectors' operating means, causing thereby when said operating means is operated the discharge of a check or checks or a check or checks and cash simultaneously, or cash independently of a check or checks from a receptacle or receptacles, mechanism for controlling the operating means for the ejectors, a registering mechanism, and means for operating said regulating, controlling and registering mechanism and said operating means for the ejectors simultaneously.

59. A machine of the character described, comprising a plurality of check and a plurality of cash receptacles, a cash receiving and separating mechanism communicating with said cash-receptacles and adapted when operated to suitably deliver cash to said cash-receptacles, ejectors for discharging checks and cash from said receptacles, means engaging with the ejectors for operating them a transversely-shiftable mechanism for regulating the ejectors' operating means, causing thereby when said operating means is operated the discharge of a check or checks or a check or checks and cash simultaneously, or cash independently of a check or checks from a receptacle or receptacles, mechanism for controlling the operating means for the ejectors, a registering mechanism, and a series of key-levers for operating said regulating, controlling and registering mechanisms and said operating means for the ejectors.

60. A machine of the character described, comprising a plurality of check and a plurality of cash receptacles, a cash receiving and separating mechanism communicating with said cash-receptacles and adapted when operated to suitably deliver cash to said cash-receptacles, ejectors for discharging checks and cash from said receptacles, means engaging with the ejectors for operating them a transversely-shiftable mechanism for regulating the ejectors' operating means, causing thereby when said operating means is operated the discharge of a check or checks or a check or checks and cash simultaneously, or cash independently of a check or checks from a receptacle or receptacles, mechanism for controlling the operating means for the ejectors, a registering mechanism, and a series of key-levers for operating said regulating, controlling and registering mechanism and said operating means for the ejectors simultaneously.

61. A machine of the character described, comprising a plurality of check and a plurality of cash receptacles, a cash receiving and separating mechanism communicating with said cash-receptacle and adapted when operated to suitably deliver cash to said cash-receptacles, ejectors for discharging checks and cash from said receptacles, means engaging with the ejectors for operating them, a transversely-shiftable mechanism for regulating the ejectors' operating means, causing thereby when said operating means is operated the discharge of a check or checks, or a check or checks and cash simultaneously or cash independently of a check or checks from a receptacle or receptacles, mechanism for controlling the operating means for the ejectors, a detecting and deflecting mechanism operated by the cash receiving and separating mechanism, a registering mechanism for registering the total value of the checks ejected, and means for operating said regulating, controlling and registering mechanisms and said operating means for the ejectors.

62. A machine of the character described, comprising a plurality of check and a plurality of cash receptacles, a cash receiving and separating mechanism communicating with said cash-receptacle and adapted when operated to suitably deliver cash to said cash-receptacles, ejectors for discharging checks and cash from said receptacles, means engaging with the ejectors for operating them, a transversely-shiftable mechanism for regulating the ejectors' operating means, causing thereby when said operating means is operated, the discharge of a check or checks, or a check or checks and cash simultaneously or cash independently of a check or checks from a receptacle or receptacles, mechanism for controlling the operating means for the ejectors, a detecting and deflecting mechanism operated by the cash receiving and separating mechanism, a registering mechanism for registering the total value of the checks ejected, and a series of key-levers for operating said regulating, controlling and registering mechanisms and said operating means for the ejectors.

63. In a machine of the character described, comprising a plurality of check and a plurality of cash receptacles, a cash receiving and separating mechanism communicating with said receptacles and adapted when operated to suitably deliver cash to said cash receptacles, ejectors for discharging checks and cash from said receptacles, means engaging with the ejectors for operating them, a transversely-shiftable mechanism for regulating the ejectors' operating means, causing thereby when said operating means is operated, the discharge of a check or checks, or a check or checks and cash simultaneously or cash independently of a check or checks from a receptacle or receptacles, mechanism for controlling the operating means for the ejectors, a series of key-levers for operating said regulating and controlling mechanism and said operating means for the ejectors, and a locking mechanism for the key-levers normally in locking engagement therewith and adapted to be suitably moved out of locking engagement with the key-levers when said cash receiving and separating mechanism is operated, thereby permitting of the operation of the key-levers.

64. In a machine of the character described, comprising a plurality of check and a plurality of cash receptacles, a cash receiving and separating mechanism communicating with said receptacles and adapted when operated to suitably deliver cash to said cash-receptacles, ejectors for discharging checks and cash from said receptacles, means engaging with the ejectors for operating them, a transversely-shiftable mechanism for regulating the ejectors' operating means, causing thereby when said operating means is operated, the discharge of a check or checks, or a check or checks and cash simultaneously or cash independently of a check or checks from a receptacle or receptacles, mechanism for controlling the operating means for the ejectors, a registering mechanism for recording the total value of the checks ejected, a series of key-levers for operating said regulating, controlling and registering mechanisms and said operating means for the ejectors, and a locking mechanism for the key-levers normally in locking engagement therewith and adapted to be suitably moved from out of locking engagement with the key-levers when said cash receiving and separating mechanism is operated, thereby permitting of the operation of the key-levers.

65. In a machine of the character described, comprising a plurality of check and a plurality of cash receptacles, a cash receiving and separating mechanism communicating with said receptacles and adapted when operated to suitably deliver cash to said cash-receptacles, ejectors for discharging checks and cash from said receptacles, means engaging with the ejectors for operating them, mechanism for regulating the ejectors' operating means, causing thereby when said operating means is operated, the discharge of a check or checks, or a check or checks and cash simultaneously or cash independently of a check or checks from a receptacle or receptacles, mechanism for controlling the operating means for the ejectors, a series of key-levers for operating said regulating and controlling mechanism and said operating means for the ejectors, and a locking mechanism for the key-levers normally in locking engagement therewith and adapted to be suitably moved out of locking engagement with the key-levers when said cash receiving and separating mechanism is operated, thereby permitting of the operation of the key-levers.

66. In a machine of the character described, comprising a plurality of check and a plurality of cash receptacles, a cash receiving and separating mechanism communicating with said receptacles and adapted when operated to suitably deliver cash to said cash-receptacles, ejectors for discharging checks and cash from said receptacles, means engaging with the ejectors for operating them, mechanism for regulating the ejectors' operating means, causing thereby when said operating means is operated, the discharge of a check or checks, or a check or checks and cash simultaneously or cash independently of a check or checks from a receptacle or receptacles, mechanism for controlling the operating means for the ejectors, a registering mechanism for recording the total value of the checks ejected, a series of key-levers for operating said regulating, controlling and registering mechanism and said operating means for the ejectors, and a locking mechanism for the key-levers normally in locking engagement therewith and adapted to be suitably moved from out of locking engagement with the key-levers when said cash receiving and separating mechanism is operated, thereby permitting of the operation of the key-levers.

67. In a machine of the character described, comprising a plurality of check and a plurality of cash receptacles, a cash receiving and separating mechanism communicating with said cash-receptacles and adapted when operated to suitably deliver cash to said cash-receptacles, ejectors for discharging checks and cash from said receptacles, means engaging with the ejectors for operating them, a series of transversely-shiftable combs engaging with the ejectors' operating means for regulating them, causing thereby when said operating means is operated the discharge of a check or checks, or a check or checks and cash simultaneously, or cash independently of a check or checks from a receptacle or receptacles, mechanism for controlling the operating means for the ejectors, and means for operating said combs and controlling mechanism and said operating means for the ejectors.

68. In a machine of the character described, comprising a plurality of check and a plurality of cash receptacles, a cash receiving and separating mechanism communicating with said cash-receptacles and adapted when operated to suitably deliver cash to said cash-receptacles, ejectors for discharging checks and cash from said receptacles, means engaging with the ejectors for operating them, a series of transversely-shiftable combs engaging with the ejectors' operating means for regulating them, causing thereby when said operating means is operated the discharge of a check or checks, or a check or checks and cash simultaneously, or cash independently of a check or checks from a receptacle or receptacles, mechanism for controlling the operating means for the ejectors, and a series of key-levers for operating said combs and controlling mechanism and said operating means for the ejectors.

69. In a machine of the character described, comprising a plurality of check and a plurality of cash receptacles, a cash receiving and separating mechanism communicating with said cash-receptacles and adapted when operated to suitably deliver cash to said cash-receptacles, ejectors for discharging checks and cash from said receptacles, means engaging with the ejectors for operating them, a series of transversely-shiftable combs engaging with the ejectors' operating means for regulating them, causing thereby when said operating means is operated the discharge of a check or checks, or a check or checks and cash simultaneously, or cash independently of a check or checks from a receptacle or receptacles, mechanism for controlling the operating means for the ejectors, a series of key-levers for operating said combs and the controlling mechanism and said operating means for the ejectors, and a locking mechanism for the key-levers normally in locking engagement therewith and adapted to be suitably moved out of locking engagement with the key-levers when said cash receiving and separating mechanism is operated, thereby permitting of the operation of the key-levers.

70. In a machine of the character described, comprising a plurality of check and a plurality of cash receptacles, a cash receiving and separating mechanism communicating with said cash-receptacles and adapted when operated to suitably deliver cash to said cash-receptacles, ejectors for discharging checks and cash from said receptacles, means engaging with the ejectors for operating them, a series of transversely-shiftable combs engaging with the ejectors' operating means for regulating them, causing thereby when said operating means is operated, the discharge of a check or checks, or a check or checks and cash simultaneously, or cash independently of a check or checks from a receptacle or receptacles, mechanism for controlling the operating means for the ejectors, a series of key-levers for operating said combs and the controlling mechanism and said operating means for the ejectors, a locking mechanism for the key-levers normally in locking engagement therewith and adapted to be suitably moved out of locking engagement with the key-levers when said cash receiving and separating mechanism is operated thereby permitting of the operation of the key-levers, and a registering mechanism for registering the total value of the checks ejected, said registering mechanism operated by the key-levers.

71. A machine of the character described, comprising a plurality of check and a plurality of cash receptacles, a cash receiving and separating mechanism communicating with said cash-receptacles and adapted when operated to suitably deliver the cash to said cash-receptacles, ejectors for discharging checks and cash from said receptacles, a plurality of vertically-adjustable and pivoted fingers adapted to engage with the ejectors for operating them, mechanism for regulating the position of said fingers with respect to the ejectors, causing thereby when said fingers are operated the discharge of a check or checks or a check or checks and cash simultaneously or cash independently of a check or checks from a receptacle or receptacles, mechanism for controlling the vertical movement of said fingers, and means for operating said controlling mechanism, and said fingers.

72. A machine of the character described, comprising a plurality of check and a plurality of cash receptacles, a cash receiving and separating mechanism communicating with said cash-receptacles and adapted when operated to suitably deliver the cash to said cash-receptacles, ejectors for discharging checks and cash from said receptacles, a plurality of vertically-adjustable and pivoted fingers adapted to engage with the ejectors for operating them, a comb mechanism for regulating the position of said fingers with respect to the ejectors, causing thereby when said fingers are operated the discharge of a check or checks or a check or checks and cash simultaneously or cash independently of a check or checks from a receptacle or receptacles, mechanism for controlling the vertical movement of said fingers, a registering mechanism for registering the total value of the checks ejected, and means for operating said controlling and registering mechanisms, said comb mechanism and said fingers.

73. A machine of the character described, comprising a plurality of check and a plurality of cash receptacles, a cash receiving and separating mechanism communicating with said cash-receptacles and adapted when operated to suitably deliver the cash to said cash-receptacles, ejectors for discharging checks and cash from said receptacles, a plurality of vertically-adjustable and pivoted fingers adapted to engage with the ejectors for operating them, a comb mechanism for regulating the position of said fingers with respect to the ejectors, causing thereby when said fingers are operated the discharge of a check or checks or a check or checks and cash simultaneously or cash independently of a check or checks from a receptacle or receptacles, mechanism for controlling the vertical movement of said fingers, a registering mechanism for registering the total value of the checks ejected, and means for operating said controlling and registering mechanism, said comb mechanism and said fingers simultaneously.

74. A machine of the character described, comprising a plurality of check and a plurality of cash receptacles, a cash receiving and separating mechanism communicating with said cash-receptacles and adapted when operated to suitably deliver the cash to said cash-receptacles, ejectors for discharging checks and cash from said receptacles, a plurality of vertically-adjustable and pivoted fingers adapted to engage with the ejectors for operating them, a comb mechanism for regulating the position of said fingers with respect to the ejectors, causing thereby when said fingers are operated the discharge of a check or checks or a check or checks and cash simultaneously or cash independently of a check or checks from a receptacle or receptacles, mechanism for controlling the vertical movement of said fingers, a series of key-levers for operating said comb mechanism, fingers and controlling mechanism, and a locking mechanism for the key-levers normally in locking engagement therewith and adapted to be suitably moved from out of locking engagement with the key-levers when said cash receiving and separating mechanism is operated, thereby permitting of the operation of said key-levers.

75. A machine of the character described, comprising a plurality of check and a plurality of cash receptacles, a cash receiving and separating mechanism communicating with said cash-receptacles and adapted when operated to suitably deliver the cash to said cash-receptacles, ejectors for discharging checks and cash from said receptacles, a plurality of vertically-adjustable and pivoted fingers adapted to engage with the ejectors for operating them, a comb mechanism for regulating the position of said fingers with respect to the ejectors, causing thereby when said fingers are operated the discharge of a check or checks or a check or checks and cash simultaneously or cash independently of a check or checks from a receptacle or receptacles, mechanism for controlling the vertical movement of said fingers, a registering mechanism for registering the total value of the checks discharged, a series of key-levers for operating said comb mechanism, fingers, controlling and registering mechanisms, and a locking mechanism for the levers normally in a locking engagement therewith and adapted to be suitably moved from out of locking engagement with the key-levers when said cash receiving and separating mechanism is operated, thereby permitting of the operation of the key-levers.

76. A machine of the character described, comprising a plurality of check and a plurality of cash receptacles, a cash receiving and separating mechanism communicating with said cash-receptacles and adapted when operated to suitably deliver the cash to said cash-receptacles, ejectors for discharging checks and cash from said receptacles, a plurality of vertically-adjustable and pivoted fingers adapted to engage with the ejectors for operating them, a comb mechanism for regulating the position of said fingers with respect to the ejectors, causing thereby when said fingers are operated the discharge of a check or checks or a check or checks and cash simultaneously or cash independently of a check or checks from a receptacle or receptacles, mechanism for controlling the vertical movement of said fingers, a registering mechanism for registering the total value of the checks discharged, a series of key-levers for operating said comb mechanism, fingers, controlling and registering mechanisms, a locking mechanism for the levers normally in a locking engagement therewith and adapted to be suitably moved from out of locking engagement with the key-levers when said cash receiving and separating mechanism is operated, thereby permitting of the operation of the key-levers, and a detecting and deflecting mechanism operated by said cash receiving and separating mechanism.

77. In a machine of the character described, a detecting and deflecting mechanism for counterfeits, a locking mechanism for the machine to prevent the operation thereof, said locking mechanism operated by the passage of a counterfeit, and a releasing means for said locking mechanism.

78. In a machine of the character described, a detecting and deflecting mechanism for counterfeits, a controlling mechanism for the machine, mechanism adapted to be operated by the counterfeit deflected from the machine to prevent the operation of the controlling mechanism, and means for releasing said preventative mechanism to permit of the operation of the controlling mechanism.

79. In a machine of the character described, a series of key-levers, indicating means adapted to be engaged and operated by said key-levers, a series of pivotal plates normally in engagement with the key-levers for locking them from movement, a series of levers connected with said plates and adapted when operated to move the said plates from locking engagement with said levers and permitting thereby the operation of the key-levers, and means having its movement controlled by the diameter of a circular object adapted to engage with and suitably operate the levers for said plates, causing thereby the moving of the plates out of locking engagement with the key-levers.

80. A machine of the character described, comprising a change-making and check and cash ejecting mechanism, mechanism controlled by the diameter of a coin for controlling the operation of said change-making and check and cash ejecting mechanism, means operated by said controlling mechanism for indicating the value of the coin, and operating means for said mechanism.

81. A machine of the character described, comprising a change-making and check and cash ejecting mechanism, mechanism controlled by the diameter of a coin for controlling the operation of said change-making and check and cash ejecting mechanism, means operated by said controlling mechanism for indicating the value of the coin, a series of key-levers for operating said mechanism, means for indicating the value of the check or checks discharged at one operation of the machine, and means operated by the key-levers for operating the means to indicate the value of the checks discharged.

82. A machine of the character described, comprising a change-making and check and cash ejecting mechanism, mechanism for controlling the operation of said change-making and check and cash ejecting mechanism, means operated by said controlling mechanism for indicating the value of cash to be changed, and means for simultaneously operating said mechanisms.

83. A machine of the character described, comprising a change-making and check and cash ejecting mechanism, mechanism for controlling the operation of said change-making and check and cash ejecting mechanism, means operated by said controlling mechanism for indicating the value of cash to be changed, a registering mechanism, means for indicating the value of the check or checks discharged at one operation of the machine, and means for simultaneously operating said mechanisms.

84. In a machine of the character described, comprising a change-making and check and cash ejecting mechanism, mechanism for controlling the operation of said change-making and check and cash ejecting mechanism, means operated by said controlling mechanism for indicating the amount of cash inserted in the machine, means for indicating the value of the check or checks discharged from the machine at one operation thereof, releasing means for the indicating means, and a series of key-levers for simultaneously operating said mechanisms.

85. In a machine of the character described, comprising a change-making and check and cash ejecting mechanism, mechanism for controlling the operation of said change-making and check and cash ejecting mechanism, a series of indicators for indicating the value of the check or checks discharged from the machine at one operation, a locking mechanism to prevent the operation of more than one of said indicating means in a series, a series of key-levers for operating said mechanisms and said indicating means, and a releasing means for said indicating means, said releasing means operated by the key-levers and said means adapted to form a support for the operated indicating means when said means is in its normal position.

86. In a machine of the character described, a means for indicating the value of the check or checks discharged at each operation of the machine, a locking mechanism to prevent the operation of more than one of said indicating means in a series, operating means for said indicating means, a series of key-levers for operating the operating means for the indicating means, and releasing means for said indicating means operated by the key-levers, said means when in its normal position adapted to form a support for the operated indicating means.

87. In a machine of the character described, the combination with a change-making and a check-ejecting mechanism, of an operating means therefor, said means comprising a plurality of vertically-extending transversely-shiftable and vertically-adjustable fingers.

88. In a machine of the character described, the combination with a change-making and check and cash ejecting mechanism, of an operating means therefor, said operating means comprising a plurality of transversely-shiftable, forwardly-movable and vertically-adjustable pivoted fingers.

89. In a machine of the character described, the combination with a change-making and a check and cash ejecting mechanism, of an operating means therefor, said means comprising a plurality of vertically-extending transversely-shiftable and vertically-adjustable fingers, and a carrying-plate for said fingers.

90. In a machine of the character described, the combination with a change-making and check and cash ejecting mechanism, of an operating means therefor, said operating means comprising a plurality of transversely-shiftable, forwardly-movable and vertically-adjustable pivoted fingers, and a carrying-plate for said fingers.

91. In a machine of the character described, the combination with a change-making, check and cash ejecting mechanism, of an operating means therefor, said means comprising a plurality of transversely-shiftable, vertically-adjustable and forwardly-movable pivoted fingers; combined with a plurality of combs for shifting said fingers, and a series of key-levers for operating the combs.

92. In a machine of the character described, an ejector's operating mechanism, said mechanisms comprising a plurality of vertically-adjustable, transversely-shiftable and forwardly-movable pivoted fingers, a carrying-plate for said fingers, and means engaging with the said plate for forwardly moving said fingers.

93. In a machine of the character described, the combination with the change-making, cash and check ejecting mechanism, of a series of key-levers, a plurality of vertically-adjustable, transversely-shiftable and forwardly-movable fingers adapted to engage with and operate said change-making and ejecting mechanism, a carrying-plate adapted to engage with said fingers for forwardly moving them, a series of arms arranged above and operated by the key-levers, means carried by a pair of said arms and adapted to engage the said plate for operating it in one direction, imparting thereby a forward movement to said fingers, and means connected with one of the arms and with said fingers for vertically adjusting said fingers when said arms are operated.

94. In a machine of the character described, the combination with a change-making and check and cash ejecting mechanism, of a plurality of vertically-adjustable, transversely-shiftable and forwardly-movable pivoted fingers adapted to engage with and operate said mechanism, a rocking-plate adapted to engage with said fingers for imparting a forward movement thereto, a bar carried by said plate, means engaging with the bar for operating the plate, and means connected with said operating means and said fingers for controlling the vertical movement of said fingers.

95. In a machine of the character described, the combination with a change-making and cash and check ejecting mechanism, of a series of key-levers, a bar extending transversely of said levers and adapted when the levers are operated to be elevated, a series of arms carried by said bar, a series of vertically-adjustable, transversely-shiftable and forwardly-movable fingers adapted to engage with said mechanism for operating it, a carrying-plate through which said fingers extend, a bar secured to said plate and having each end suitably projecting therefrom, means carried by a pair of said arms and adapted to engage with the projecting ends of said bar for operating said plate, and means connected with one of the arms and with said fingers and adapted to control the vertical adjustment of said fingers.

96. In a machine of the character described, the combination with a check and cash ejecting mechanism, of a series of shiftable fingers adapted to engage the said mechanism for operating it, a plurality of combs connected with said fingers for shifting them, and a series of key-levers for shifting said combs.

97. In a machine of the character described, the combination with a check and cash ejecting mechanism, of a regulating means therefor, said means consisting of a plurality of transversely-shiftable combs having their tines beveled at the lower ends.

98. In a machine of the character described, a plurality of check and a plurality of cash receptacles, said cash-receptacles formed of two sections and said check-receptacles formed of two sections, one section of said check-receptacles formed integral with one section of the cash-receptacles and the other section of said check-receptacles formed integral with the other section of the cash-receptacles.

99. In a machine of the character described, a series of check and a series of cash receptacles, said cash-receptacles formed of forward and rearward sections adapted to be suitably connected together, the forward section of said cash-receptacles being semicylindrical in contour and the rear section of said cash-receptacles being semicylindrical in contour a portion of its length and cylindrical in contour the remaining portion of its length, said check-receptacles formed of two sections, the upper of which is secured to the forward section of the cash-receptacles and the lower of which is secured to the rear section of the cash-receptacles, and means carried by the cylindrical portions of the rear section of the cash-receptacle for supporting the lower section of the check-receptacle.

100. In a machine of the character described, a series of vertically-extending rods carrying indicators for indicating the value of a check or checks discharged from the machine, each of said rods provided at its lower end with a forwardly-extending tongue, a series of vertically-operable lift-rods adapted to engage with said tongues for elevating said indicators to expose them, a series of abutting disks for supporting said indicator-rods when operated to an elevated position when said disks are in their abutting positions, means for releasing said disks to permit of the raising and lowering of said indicating-rods and for returning said disks to their abutting positions to support said indicator-rods, and operating means for said releasing means.

101. In a machine of the character described, the combination with an indicating means for indicating the value of the check or checks discharged from the machine, of a locking mechanism to support said indicating means, said locking mechanism consisting of a plurality of abutting disks, a pair of slidable retaining-blocks adapted to normally retain said disks in an abutting position, and means for operating said blocks in one direction to permit of the separation of the disks.

102. In a machine of the character described, the combination with an indicating means for indicating the value of the check or checks discharged from the machine, of a locking mechanism to support said indicating means, said locking mechanism consisting of a plurality of abutting disks, a pair of slidable retaining-blocks adapted to normally retain said disks in an abutting position, a pair of vertically-operable rods adapted to engage with said blocks for moving them away from said disks to permit of the separation thereof, said rods on their upward movement releasing said disks so as to permit of their separation and on their downward movement engaging said blocks so as to retain the blocks against the disks so that the disks will abut.

103. In a machine of the character described, a series of transversely-shiftable regulating-combs having their tines beveled at the lower ends, said combs further provided with forwardly-extending yokes, and change-making devices coöperating with said yokes.

104. In a machine of the character described, a change-making and purchase-value check and cash ejecting mechanism, and operatable devices coöperating with said mechanism.

105. In a machine of the character described, a change-making and check and cash ejecting mechanism, said mechanism consisting of a plurality of ejectors for the cash, a pair of which is superposed, and a plurality of check-ejectors, said check-ejectors being interposed between said cash-ejectors, combined with a supporting-plate for said ejectors.

106. In a machine of the character described, a change-making and check and cash ejecting mechanism, said mechanism comprising a single ejector, respectively, for half-dollars, quarters and nickels, and a pair of ejectors for dimes, a quarter-check ejector interposed between said quarter cash-ejector and half-dollar cash-ejector, a nickel-check ejector interposed between said nickel cash-ejector and quarter cash-ejector, and a pair of dime-check ejectors interposed between the pair of dime cash-ejectors and the nickel cash-ejectors, combined with a supporting-plate for said ejectors.

107. In a machine of the character described, a check-ejector, said ejector consisting of an elongated bar having an upwardly-extending lug at the rear end and an upwardly-extending shouldered projection at its forward end and a depending lug, operatable devices coöperating with said ejector, and a supporting means for said ejector.

108. In a machine of the character described, a check-ejector consisting of an elongated bar having its rear end provided with an upwardly-extending shouldered lug and at its forward end with an upwardly-extending shouldered projection, said ejector further provided with a depending lug, operatable devices coöperating with said ejector, and a supporting means for said ejector.

109. In a machine of the character described, a check-ejector consisting of a bar of zigzag form having its rear end provided with an upwardly-extending lug and its forward end with an upwardly-extending shouldered projection, a check-discharger connected with the said projection, said bar further provided with a depending lug, operatable devices coöperating with said ejector, and a supporting means for said ejector.

110. In a machine of the character described, a cash-storing means having its lower face provided with channels, a check-storing means carried by said cash-storing means, cash-ejectors operating in said cash-storing means for discharging cash therefrom, and check-ejectors operating through said channels and engaging in the check-storing means for discharging checks therefrom.

111. In a machine of the character described, a cash-storing means having its lower face provided with channels, a check-storing means carried by said cash-storing means, cash-ejectors operating in said cash-storing means for discharging cash therefrom, and check-ejectors operating through said channels and engaging in the check-storing means for discharging checks therefrom; combined with means for regulating and operating said ejectors so as to discharge a check or checks, or a check or checks and cash simultaneously, or cash independently of said check or checks from said storage means.

112. In a machine of the character described, the combination with a series of key-levers, of a locking mechanism normally in engagement therewith, said mechanism comprising a series of forwardly-operable plates adapted to have their movement controlled by the diameter of a circular object, said plates when moved forwardly adapted to release said key-levers to permit of the operation thereof.

113. A machine of the character described comprising a series of key-levers and mechanism normally in engagement therewith for locking said levers, said mechanism consisting of a series of pivoted plates terminating at their top in a neck portion, levers suitably connected to the neck portions for operating the plates, thereby moving said plates away from their engagement with the key-levers to permit of the operation of said key-levers, and means for selectively operating said levers, thereby releasing the plates from their engagement with the key-levers.

114. In a machine of the character described, a series of transversely-shiftable regulating-combs having their tines cut away at the lower end thereof, a series of forwardly-projecting yokes carried by said combs, a series of fingers adapted to be shifted by the said yokes, a slotted supporting-plate, a series of forwardly-movable ejectors mounted upon said plate and provided with lugs depending through the slots of the plate, means for moving said fingers forwardly for operating the ejectors in a forward direction, said means automatically returnable to its normal position, and means engaging with the depending lugs of the ejectors for automatically returning said ejectors to their normal position.

115. In a machine of the character described, a series of shiftable combs, each provided with a forwardly-extending yoke, and ejectors' operating-fingers coöperating with said yokes.

116. In a machine of the character described a support, a slotted supporting-plate suitably secured thereto, a series of cash-receptacles mounted upon said plate, a series of check-receptacles carried by said cash-receptacles, a registering device suitably supported within said frame, a cash receiving and separating mechanism arranged above the said cash-receptacles and adapted when operated to deliver cash to said receptacles, ejectors mounted upon said plate and when operated adapted to move between said plate and receptacles to eject cash and checks therefrom, means suspended in the frame and adapted to suitably engage with said ejectors to operate them, a series of transversely-shiftable combs for regulating the movement of said means, means for controlling the operation of the ejectors' operating means and engaging with the receiving and separating mechanism for returning it to its normal position, operating mechanism for the registering device, and a series of key-levers engaging with and operating said combs, said means for operating the ejectors and the operating mechanism for the registering device.

117. In a machine of the character described a support, a slotted supporting-plate suitably secured thereto, a series of cash-receptacles mounted upon said plate, a series of check-receptacles carried by said cash-receptacles, a registering device suitably supported within said frame, a cash receiving and separating mechanism arranged above the said cash-receptacles and adapted when operated to deliver cash to said receptacles, ejectors mounted upon said plate and when operated adapted to move between said plate and receptacles to eject cash and checks therefrom, means suspended in the frame and adapted to suitably engage with said ejectors to operate them, a series of transversely-shiftable combs for regulating the movement of said means, means for controlling the operation of the ejectors' operating means and engaging with the receiving and separating mechanism for returning it to its normal position, operating mechanism for the registering device, and a series of key-levers engaging with and simultaneously operating said combs, said means for operating ejectors and the operating mechanism for the registering device.

118. In a machine of the character described, a shaft, a series of key-levers mounted thereon, a series of transversely-shiftable regulating-combs operated by the key-levers when they are operated, a plurality of arms connected with the shaft and normally engaged by the levers and adapted to be rocked when the key-levers are operated, a series of ejectors, a series of check and cash receptacles arranged in suitable relation to the said ejectors, means arranged in suitable relation to the ejectors and when operated adapted to suitably operate the ejectors, said operating means for the ejectors operatively connected with said combs so as to be regulated by the operation thereof, a controlling mechanism connected with said arm and when operated adapted to control the movement of the ejectors' operating means, and a check and cash receiving receptacle adapted to receive the checks and cash ejected from the said receptacles.

119. In a machine of the character described, an arresting mechanism operated by the passage of a counterfeit, said arresting mechanism comprising a swinging arm having a beveled end, and a rock-arm adapted to be engaged and operated by the beveled end of the swinging arm, combined with operatable devices coöperating with said arresting means.

120. In a machine of the character described, an arresting mechanism operated by the passage of a counterfeit, a releasing mechanism for said arresting mechanism, combined with operatable devices coöperating with said mechanisms.

121. In a machine of the character described, the combination with an arresting mechanism operated by the passage of a counterfeit, and operatable devices coöperating with said mechanism, of a releasing means for said arresting mechanism, said means consisting of a rocking plate having a cam-slot, and an elongated arm adapted when the plate is operated to engage with said arresting mechanism to release it.

122. In a machine of the character described, a change-making and check and cash ejecting mechanism, operating means therefor, a bodily-movable series of cams, a transversely-shiftable comb, a registering mechanism connected with said comb and cams and adapted to be operated when said cams and comb are or is operated, and a series of key-levers adapted to operate said cams, comb and operating means for said ejecting mechanism.

123. In a machine of the character described, the combination with a change-making and check and cash ejecting mechanism, of an operating means therefor, a series of shiftable combs for regulating the movement of said operating means, and a controlling mechanism for said operating means, said controlling mechanism adapted to return said combs to their normal position after being shifted.

124. In a machine of the character described, a series of indicator-rods, a series of lift-rods for operating said indicator-rods, a series of locking-disks for supporting indicator-rods when operated, a series of disks for locking the remainder of said lift-rods from movement while one of said rods is being operated, and means for releasing the locking-disks for the indicator-rods.

125. In a machine of the character described, a series of indicator-rods, a series of lift-rods for operating said indicator-rods, a series of locking-disks for supporting indicator-rods when operated, a series of disks for locking the remainder of said lift-rods from movement while one of said rods is being operated, means for releasing the locking-disks for the indicator-rods, means for indicating the value of cash inserted in the machine, and means carried by said releasing means for retaining said means for indicating the value of the cash inserted in an elevated position.

126. In a machine of the character described, a series of indicator-rods, operating means therefor, a locking mechanism for supporting said indicator-rods after being operated, and means for releasing said locking mechanism to permit of the operation of the indicator-rods.

127. In a machine of the character described, the combination with a plurality of indicator-rods, operating means therefor, a mechanism for supporting the rods when operated, of a releasing means for said mechanism, said releasing means consisting of a pair of vertically-movable bars having portions of their length cut away so as to form said bars of different thicknesses.

128. In a machine of the character described, the combination with a plurality of indicator-rods, operating means for said rods, and a series of abutting disks for supporting said rods after being operated, of means for retaining said disks in abutting position, said means consisting of a pair of spring-actuated retaining-blocks having beveled lugs.

129. In a machine of the character described, the combination with a plurality of indicator-rods, operating means therefor, a series of abutting disks adapted to prevent the operation of said rods and for supporting said rods when operated, and a pair of transversely-operable blocks for retaining said disks in an abutting position, said blocks provided with beveled lugs, of means for moving said blocks from their engagement with the disks, said means consisting of a pair of vertically-operable rods having beveled ends and portions of their length cut away to form said rods of different thicknesses.

130. In a machine of the character described, a cash receiving and separating mechanism, said mechanism comprising an elongated lever, an operating-slide for said mechanism carried on the upper end of said lever, said slide adapted to be moved forwardly by the operator, causing thereby the operation of said mechanism, a holding-arm provided with offsets adapted to be operated when said lever is operated, a rack-bar adapted to be connected with said lever when said lever is moved forwardly, retaining thereby said lever in its forward position, a releasing-lever forming a continuation of said rack-bar and when operated adapted to release said elongated lever, causing thereby the rearward movement of said slide, and means carried by said elongated lever to permit of the return of said holding-arm when the releasing-lever is operated if the slide should be held by an operator.

131. In a machine of the character described, a cash receiving and separating mechanism, comprising in its construction, a pair of chutes, one of which is provided with an entrance-opening for the cash, means forming a part of said mechanism for closing said entrance-opening after the cash has been inserted, said means consisting of an arm having a beveled rearward extension adapted to arrest the operation of the cash receiving and separating mechanism until the said entrance-opening is closed through the medium of said arm, a closure-plate carried by the upper end of the arm, and a tongue projecting forwardly from the lower end of the arm.

132. In a machine of the character described, a cash receiving and separating mechanism, a change-making, check and cash ejecting mechanism, operating means for said ejecting mechanism, and a mechanism controlled by the diameter of a coin for controlling the movement of said operating means, said controlling mechanism adapted to tip and engage with said cash receiving and separating mechanism for returning it to its normal position.

133. In a machine of the character described, a cash receiving and separating mechanism comprising in its construction an elongated lever provided with a notch and carrying a pivoted arm having a forward projection, said lever further carrying a lever pivoted thereto and to said arm, said lever pivoted to the slotted lever provided with a forwardly-projecting curved extension combined with operatable devices coöperating therewith.

134. In a machine of the character described, the combination with a change-making and purchase-check and cash ejecting mechanism, an operating means therefor, and a registering mechanism for registering the total value of the purchase-checks ejected, of an operating mechanism for said registering mechanism, said operating mechanism consisting of a bodily-movable series of cams, a transversely-shiftable comb, a bell-crank lever operated by said combs, a lever operated by said bell-crank lever, an arm operated by said lever, a lever in the form of an escapement having a forwardly-projecting extension, a toothed wheel provided with teeth and pins adapted to be engaged by said arm and said lever in the form of an escapement, and a lever mechanism connected with said cams.

135. In a machine of the character described, a change-making, check and cash ejecting mechanism, a shiftable and vertically-adjustable operating means for said mechanism, means for operating said ejectors' operating means, key-levers for operating the means for operating said ejectors' operating means, a lifting-bar for the key-levers connected to the means for operating said ejectors' operating means and a suitable compulsory full-stroke mechanism for the key-levers.

136. In a machine of the character described, a change-making and check and cash ejecting mechanism, operating means therefor, check and cash storage receptacles, means for distributing the cash to the storage-receptacles, and replenishing indicating means for said check and cash receptacles.

137. In a machine of the character described, a change-making and check and cash ejecting mechanism, operating means therefor, check and cash storage receptacles, means for distributing the cash to the storage-receptacles, and replenishing indicating means for said check and cash receptacles, and means adapted when operated to lock the machine to prevent the operation thereof until the receptacles have been replenished.

138. In a machine of the character described, a change-making and combined purchase-check and cash ejecting mechanism, said mechanism adapted when operated to eject the change between the value of the check ejected and the value of the coin inserted in the machine, mechanism controlled by the diameter of the coin inserted for controlling the operation of said change-making and combined purchase-check and cash ejecting mechanism, an indicating mechanism for indicating when the machine is nearly emptied of cash, and a means for operating said mechanism.

139. In a machine of the character described, storage-receptacles for the checks and cash, a change-making and combined purchase-check and cash ejecting mechanism, said mechanism adapted to eject checks and cash from said receptacles and further adapted when operated to eject the change between the value of the check or checks ejected and the value of the coin inserted in the machine, a locking mechanism for locking the machine when a receptacle is empty, an indicating mechanism for indicating a nearly-empty receptacle, and operating means for said mechanism.

140. In a machine of the character described, storage-receptacles for the checks and cash, a change-making and combined purchase-check and cash ejecting mechanism, said mechanism adapted to eject checks and cash from said receptacles and further adapted when operated to eject the change between the value of the check or checks ejected and the value of the coin inserted in the machine, mechanism controlled by the diameter of a circular object for controlling the operation of said change-making and combined purchase-check and cash ejecting mechanism, a locking mechanism for locking the machine when a receptacle is empty, an indicating mechanism for indicating a nearly-empty receptacle, and operating means for said mechanism.

141. In a machine of the character described, storage-receptacles for the checks and cash, a change-making and combined purchase-check and cash ejecting mechanism, said mechanism adapted to eject checks and cash from said receptacles and further adapted when operated to eject the change between the value of the check or checks ejected and the value of the coin inserted in the machine, mechanism controlled by the diameter of a circular object for controlling the operation of said change-making and combined purchase-check and cash ejecting mechanism, a locking mechanism for locking the machine when a receptacle is empty, an indicating mechanism for indicating a nearly-empty receptacle, operating means for said mechanism, and means for filling the said receptacles.

142. A machine of the character described, involving check and cash storage receptacles, mechanism for ejecting checks and cash of varying value, a locking mechanism for locking the machine when a receptacle is empty, an indicating mechanism for indicating a nearly-empty receptacle, and operating means for said mechanism.

143. In a machine of the character described, check and cash storage receptacles, mechanism for ejecting checks and cash from said receptacles, mechanism controlled by the diameter of a circular object for controlling the operation of said check and cash ejecting mechanism, a series of key-levers for operating said mechanisms, a locking mechanism for locking the machine when a receptacle is empty, and an indicating mechanism for indicating a nearly-empty receptacle.

144. In a machine of the character described, check and cash storage receptacles, mechanism for ejecting checks and cash from said receptacles, mechanism controlled by the diameter of a circular object for controlling the operation of said check and cash ejecting mechanism, a series of key-levers for operating said mechanisms, a locking mechanism for locking the machine when a receptacle is empty, an indicating mechanism for indicating a nearly-empty receptacle, a chute device for filling the said receptacles, and an alarm mechanism to indicate when the machine is operated.

145. In a machine of the character described, check and cash storage receptacles, a change-making and combined purchase-check and cash ejecting mechanism adapted to eject cash and checks from said receptacles, said mechanism further adapted when operated to eject the change between the value of the check or checks ejected and the value of the coin inserted in the machine, mechanism controlled by the diameter of the coin inserted for controlling the operation of said change-making and combined purchase-check and cash ejecting mechanism, means for operatively connecting said mechanisms together, a series of key-levers for operating said change-making and combined purchase-check and cash ejecting mechanism, said latter mechanism when operated adapted to throw into operation, said controlling mechanism, and a locking mechanism for locking the machine when a receptacle is empty.

146. In a machine of the character described, check and cash storage receptacles, a change-making and combined purchase-check and cash ejecting mechanism adapted to eject cash and checks from said receptacles, said mechanism further adapted when operated to eject the change between the value of the check or checks ejected and the value of the coin inserted in the machine, mechanism controlled by the diameter of the coin inserted for controlling the operation of said change-making and combined purchase-check and cash ejecting mechanism, means for operatively connecting said mechanisms together, a series of key-levers for operating said change-making and combined purchase-check and cash ejecting mechanism, said latter mechanism when operated adapted to throw into operation said controlling mechanism, a locking mechanism for locking said machine when a receptacle is empty, and an indicating mechanism for indicating a nearly-empty receptacle.

147. In a machine of the character described, check and cash storage receptacles, a change-making and combined purchase-check and cash ejecting mechanism adapted to eject cash and checks from said receptacles, said mechanism further adapted when operated to eject the change between the value of the check or checks ejected and the value of the coin inserted in the machine, mechanism controlled by the diameter of the coin inserted for controlling the operation of said change-making and combined purchase-check and cash ejecting mechanism, means for operatively connecting said mechanisms together, a series of key-levers for operating said change-making and combined purchase-check and cash ejecting mechanism, said latter mechanism when operated adapted to throw into operation said controlling mechanism, a locking mechanism for locking said machine when a receptacle is empty, an indicating mechanism for indicating a nearly-empty receptacle, and a chute device for filling the said receptacles.

148. In a machine of the character described, check and cash storage receptacles, a change-making and combined purchase-check and cash ejecting mechanism adapted to eject cash and checks from said receptacles, said mechanism further adapted when operated to eject the change between the value of the check or checks ejected and the value of the coin inserted in the machine, mechanism controlled by the diameter of the coin inserted for controlling the operation of said change-making and combined purchase-check and cash ejecting mechanism, means for operatively connecting said mechanisms together, a series of key-levers for operating said change-making and combined purchase-check and cash ejecting mechanism, said latter mechanism when operated adapted to throw into operation said controlling mechanism, a locking mechanism for locking said machine when a receptacle is empty, an indicating mechanism for indicating a nearly-empty receptacle, a chute device for filling the said receptacles, and an alarm mechanism for indicating that the machine has been operated.

149. A machine of the character described involving check and cash storage receptacles adapted to have checks and cash ejected therefrom, and a locking mechanism for locking the entire machine from operation when a receptacle is empty.

150. A machine of the character described involving check and cash storage receptacles adapted to have checks and cash ejected therefrom, a locking mechanism for locking the entire machine from operation when a receptacle is empty, and an indicating mechanism for indicating a nearly-empty receptacle.

151. A machine of the character described involving check and cash storage receptacles adapted to have checks and cash ejected therefrom, a locking mechanism for locking the entire machine from operation when a receptacle is empty, an indicating mechanism for indicating a nearly-empty receptacle, and a chute device for replenishing the said receptacles.

152. A machine of the character described involving check and cash storage receptacles, mechanism for ejecting checks and cash from said receptacles, a locking mechanism for locking the entire machine from operation when a receptacle is empty, an indicating mechanism for indicating a nearly-empty receptacle, and a chute device for replenishing the said receptacles.

153. A machine of the character described involving a finger mechanism for the purpose set forth, said finger mechanism consisting of a forwardly-extending section 237, a rearwardly-extending section 237$^a$, a pair of links for pivotally connecting said sections together, a tension-spring connecting the upper ends of said links together, and a tension-spring connected to the upper end of one of said links.

154. A machine of the character described involving a finger mechanism for the purpose set forth, said finger mechanism consisting of a forwardly and a rearwardly extending section arranged one above the other a portion of their length and pivotally connected together at two points, and tension-springs suitably connected with said sections.

155. A machine of the character described involving a finger mechanism for the purpose set forth, said finger mechanism consisting of a forwardly-projecting and a rearwardly-extending section arranged substantially parallel with each other a portion of their length, a pair of links for pivotally connecting said sections together, one of said links being pivotally supported, and tension-springs suitably connected with said links.

156. A machine of the character described involving check and cash storage receptacles, means for ejecting checks and cash from said receptacles, key-levers for operating said means, and means for locking all of said key-levers from movement when one of the receptacles becomes empty.

157. A machine of the character described involving check and cash storage receptacles, means for ejecting checks and cash from said receptacles, key-levers for operating said means, means for locking all of said key-levers from movement when one of the receptacles becomes empty, and mechanism for indicating a nearly-empty receptacle.

158. A machine of the character described involving check and cash storage receptacles, means for suitably ejecting checks and cash from said receptacles, mechanism for controlling the operation of said means, a series of key-levers for operating said ejecting means, and means for locking said series of key-levers from movement when one of the said receptacles becomes empty.

159. A machine of the character described involving check and cash storage receptacles, means for suitably ejecting checks and cash from said receptacles, mechanism for controlling the operation of said means, a series of key-levers for operating said ejecting means, means for locking said series of key-levers from movement when one of the said receptacles becomes empty, and means for indicating a nearly-empty receptacle.

160. A machine of the character described involving check and cash storage receptacles, means for suitably ejecting checks and cash from said receptacles, mechanism for controlling the operation of said means, a series of key-levers for operating said ejecting means, means for locking said series of key-levers from movement when one of the said receptacles becomes empty, means for indicating a nearly-empty receptacle, and a chute device for replenishing said receptacles.

161. A machine of the character described involving check and cash storage receptacles, means for suitably ejecting checks and cash from said receptacles, mechanism for controlling the operation of said means, means for operating said ejecting means, means for locking the operating means for said ejecting means from movement when one of the said receptacles becomes empty, means for indicating a nearly-empty receptacle, and a chute device for replenishing said receptacles.

162. In a machine of the character described, a change-making and combined purchase-check and cash ejecting mechanism, said mechanism adapted when operated to eject the change between the value of the check or checks ejected and the value of the coin inserted in the machine, mechanism controlled by the diameter of the coin inserted for controlling the operation of said change-making and combined purchase-check and cash ejecting mechanism, operating means for said mechanisms, a rotatable drum provided with suitable inscriptions for indicating the value of the coin inserted, and means operated by said controlling mechanism for operating said drum.

163. A machine of the character described, involving a change-making and combined purchase-check and cash ejecting mechanism operable on the insertion of cash in the machine, and means for indicating the value of the cash inserted.

164. In a machine of the character described, a change-making and combined purchase-check and cash ejecting mechanism operable upon the insertion in the machine of a coin, said mechanism adapted when operated to eject change between the value of the check ejected and the value of the coin inserted in the machine, operating means for said mechanism, and means for indicating the value of the coin inserted in the machine.

165. A machine of the character described involving a change-making and combined purchase-check and cash ejecting mechanism operable on the insertion of a circular movable object.

166. A combined cash-register, change-maker, change-deliverer and purchase-value-check-discharging machine comprising a change-making and purchase-value-check and cash ejecting mechanism, said mechanism having its movement controlled by the diameter of a circular object and adapted when operated to discharge a check or checks, or a check or checks and cash simultaneously, or cash independent of a check or checks.

167. In a combined cash-register, change-maker, change-deliverer and purchase-value-check-discharging machine, a cash receiving and separating mechanism having its movement controlled by the diameter of a movable circular object, and means associating with said mechanism for preventing the retention of said object in its operative position during more than one cycle of movement.

168. In a combined cash-register, change-maker, change-deliverer and purchase-value-check-discharging machine, means for receiving a movable circular object, said means having its operation controlled by the diameter of said object, said means embodying mechanism to prevent the retention of said object in its operative position during more than one cycle of movement.

169. In a cash-register, change-maker, change-deliverer and purchase-value-check-discharging machine, a cash receiving and separating mechanism provided with an entrance-opening for a traveling circular object, said object traveling on its edge and controlling the operation of said mechanism, said mechanism having as a part thereof, means to prevent the retention of said object in its operative position during more than one cycle of movement.

170. In a machine of the character described embodying the combination with a cash-storage receptacle, of means for locking the entire machine from operation when the cash-receptacle is empty or nearly so.

171. In a machine of the character described, a series of of verically-extending rods carrying indicators for indicating the value of a check or checks discharged from the machine, each of said rods provided at its lower end with a protuberance, a series of vertically-operable lift-rods adapted to engage with said protuberance for elevating said indicators to expose them, a series of abutting elements for supporting said indicator-rods when operated in an elevated position when said elements are in their abutting positions, means for releasing said elements to permit of the raising and lowering of said indicator-rods and for returning said elements to their abutting positions to support said indicator-rods, and operating means for said releasing means.

172. In a machine of the character described, the combination with an indicating means for indicating the value of the check or checks discharged from the machine, of a locking mechanism adapted to support said indicating means, said locking mechanism consisting of a plurality of abutting elements, a pair of slidable retaining members adapted to normally retain said elements in an abutting position, and means for operating said members in one direction to permit of the separation of the said elements.

173. In a machine of the character described, the combination with an indicating means for indicating the value of the check or checks discharged from the machine, of a mechanism adapted to support said indicating means, said mechanism consisting of a plurality of abutting elements, a pair of slidable retaining members adapted to normally retain said elements in an abutting position, a pair of vertically-operable members adapted to engage with said slidable members for moving them away from said elements to permit of the separation thereof, said vertically-operable members on their upward movement releasing said elements so as to permit of their separation and on their downward movement engaging said slidable members so as to move them against the elements so that said elements will abut.

174. In a machine of the character described, a series of indicator-rods, a series of lift-rods for elevating said indicator-rods, a series of elements for supporting said indicator-rods, a series of locking elements for locking the remainder of said lift-rods from movement while one of said rods is being operated, and means for releasing the elements for the indicator-rods.

175. In a machine of the character described, a series of indicator-rods, a series of lift-rods for elevating said indicator-rods, a series of elements for supporting said indicator-rods, a series of locking elements for locking said lift-rods from movement during the operation of one of said lift-rods, means for releasing the elements for the indicator-rods, means for indicating the value of cash inserted in the machine, and means carried by said releasing means for retaining said means for indicating the value of the cash inserted in an elevated position.

176. In a machine of the character described, an indicating mechanism, operating means therefor, abutting elements for supporting said indicating mechanism after the same has been operated, and means for releasing said abutting elements to permit of the operation of the indicating mechanism.

177. In a machine of the character described, the combination with a plurality of indicator-rods, operating means therefor, and a series of abutting elements for supporting said rods after being operated, of means for retaining said elements in abutting position, said means consisting of a pair of spring-actuated retaining members having beveled lugs.

178. In a machine of the character described, the combination with a plurality of indicator-rods, operating means therefor, a series of abutting elements adapted to support said rods when operated, and a pair of transversely-operable members for retaining said elements in an abutting position, said members provided with beveled lugs, of means for moving said members from their engagement with the abutting elements, said means consisting of a pair of vertically-movable members having beveled ends and portions of their length cut away to form said members of different thickness throughout their length.

179. In a machine of the character described, a series of indicator-rods, a series of lift-rods for elevating said indicator-rods, a series of elements for supporting said indicator-rods, a series of locking elements for locking said lift-rods from movement during the operation of one of said lift-rods, and means for releasing the elements for the indicator-rods.

180. In a machine of the character described, a plurality of vertically-movable members, elements for supporting said members when operated, a plurality of vertically-movable members for operating said first-mentioned plurality of members, a plurality of locking elements for locking said plurality of second members from operation during the operation of one of said members, and means for releasing the elements for the first-mentioned plurality of members.

181. In a machine of the character described, a plurality of vertically-movable members, a plurality of abutting elements for supporting said members when operated in one direction, a plurality of vertically-movable members for operating the first-mentioned plurality of members, a plurality of abutting elements for locking said second-mentioned plurality of elements from movement during the operation of one of the members of said second-mentioned plurality of members, and means for releasing the first-mentioned plurality of abutting elements to permit of the return of the first-mentioned plurality of members to normal position.

182. A machine of the character described, embodying a vertically-movable member, a plurality of abutting elements for supporting said member when operated in one direction, a vertically-movable member for operating said first-mentioned member in one direction, and means for releasing said abutting elements to permit of the return of the first-mentioned vertically-movable member to normal position.

183. A machine of the character described, embodying a cash receiving and separating mechanism provided with an entrance-opening for the cash, said mechanism further provided with means for closing said entrance-opening after the cash has been inserted and for arresting the operation of said mechanism until the said entrance-opening is closed by said means.

184. A machine of the character described having an entrance-opening, and an element for closing said opening and arresting the operation of the machine until the said opening is closed.

185. A machine of the character described, embodying a cash receiving and separating mechanism provided with an entrance-opening for the cash, said mechanism further provided with means operated by the cash inserted for closing said entrance-opening after the cash has been inserted and for arresting the operation of said mechanism until the said entrance-opening is closed by said means.

186. A machine of the character described having an entrance-opening and an automatically-operating means comprising a coin-actuated element for closing said opening and arresting the operation of the machine until the said means is moved to inoperative position.

187. A machine of the character described having an entrance-opening for a coin, and an element automatically operated by the coin inserted for closing said opening and arresting the operation of the machine until the said opening is closed.

188. A machine of the character described having an entrance-opening for a coin, and an element for closing said opening and arresting the operation of the machine until said opening is closed, said means adapted to be engaged by the edge of the coin and operated by the weight thereof.

189. A machine of the character described having an entrance-opening, and a pivotal element actuated by the cash inserted in said opening for closing said opening and arresting the operation of the machine until the said opening is closed.

190. A machine of the character described having an entrance-opening for cash, and an element actuated by the cash inserted for closing said opening and arresting the operation of the machine until said opening is closed.

191. A machine of the character described having an entrance-opening for cash and a swinging member arranged in operative relation with respect to said entrance-opening and adapted to be actuated by the cash inserted for closing said opening and further adapted to arrest the operation of the machine until the said opening is closed.

192. A machine of the character described having an entrance-opening for cash, and a swinging member arranged in operative relation with respect to said opening and adapted to close it, said swinging member provided with a closure at one end and a protuberance at its other end, said protuberance adapted to be engaged by the cash inserted, causing thereby the actuation of said member and the closing of said opening, said member further adapted to arrest the operation of the machine until said entrance-opening is closed.

193. In a combined cash-register, change-maker, change-deliverer and purchase-value-check-discharging machine, having its operation controlled by the diameter of a movable circular object, means for receiving said object, said means embodying mechanism to prevent the retention of said object in its operative position during more than one cycle of movement, and releasing means for said mechanism.

194. In a combined cash-register, change-maker, change-deliverer and purchase-value-check-discharging machine having its operation controlled by the diameter of a traveling circular object, said object traveling on its edge, a cash receiving and separating mechanism provided with an entrance-opening for said object, said mechanism having as a part thereof, means to prevent the retention of said object in its operative position during more than one cycle of movement, combined with releasing means for the preventing means.

195. A machine of the character described, comprising a series of check and cash receptacles, a cash receiving and separating mechanism for delivering cash to the said cash-receptacles, means for delivering checks to said check-receptacles, a change-making and combined purchase-check and cash ejecting mechanism, a controlling mechanism for said change-making and combined purchase-check and cash ejecting mechanism, means for operating said check and cash ejecting and change-making mechanism and said controlling mechanism, and means for locking the machine from operation when a cash-receptacle is empty or nearly so.

196. A machine of the character described, comprising a series of check and cash receptacles, a cash receiving and separating mechanism for delivering cash to the said cash-receptacles, means for delivering checks to said check-receptacles, a change-making and combined purchase-check and cash ejecting mechanism, a controlling mechanism for said change-making and combined purchase-check and cash ejecting mechanism, a registering mechanism, means for operating the registering mechanism, check and cash ejecting and change-making mechanism and said controlling mechanism, and means for locking the machine from operation when a cash-receptacle is empty or nearly so.

197. A machine of the character described, comprising a series of check and cash receptacles, a cash receiving and separating mechanism for delivering cash to the said cash-receptacles, means for delivering checks to said check-receptacles, a change-making and combined purchase-check and cash ejecting mechanism, a controlling mechanism for said change-making and combined purchase-check and cash ejecting mechanism, a registering mechanism, means for operating the registering mechanism, check and cash ejecting and change-making mechanism and said controlling mechanism, means for locking the machine from operation when a cash-receptacle is empty or nearly so, and a cash detecting and deflecting mechanism engaging with and operated by said cash receiving and separating mechanism.

198. A machine of the character described, comprising a series of cash-receptacles, a cash receiving and separating mechanism for delivering cash to the said cash-receptacle, a change-making and cash-ejecting mechanism, a controlling mechanism for said change-making and cash-ejecting mechanism, means for operating said change-making and cash-ejecting mechanism and said controlling mechanism, and means for locking the machine from operation when a cash-receptacle is empty or nearly so.

199. In a machine of the character described, embodying the combination with a cash-storage receptacle, and a cash receiving and separating mechanism for delivering cash to the said cash-receptacle, of means for locking the machine from operation when the cash-receptacle is empty or nearly so.

200. In a machine of the character described, embodying the combination with a cash-storage receptacle, and a cash receiving and separating mechanism for delivering cash to the said cash-receptacle, of means for locking the machine from operation when the cash-receptacle is empty or nearly so, and means for ejecting cash from the said receptacle.

201. In a machine of the character described, embodying the combination with a cash-storage receptacle, and a cash receiving and separating mechanism for delivering cash to the said cash-receptacle, of means for locking the machine from operation when the cash-receptacle is empty or nearly so, means for ejecting cash from the said receptacle, and controlling means for said ejecting means.

202. In a machine of the character described, embodying the combination with a cash-storage receptacle, and a cash receiving and separating mechanism for delivering cash to the said cash-receptacle, of means for locking the machine from operation when the cash-receptacle is empty or nearly so, means for ejecting cash from the said receptacle, controlling means for said ejecting means, and operating means for said ejecting and controlling means.

203. In a machine of the character described, a change-making and check and cash ejecting mechanism, operating means therefor, check and cash storage receptacles, means for distributing cash to the cash-storage receptacles, means for locking the machine from operation when any one of the cash-storage receptacles is empty or nearly so, and replenishing-indicating means for said cash-storage receptacles.

204. In a machine of the character described, a change-making and check and cash ejecting mechanism, operating means therefor, check and cash storage receptacles, means for distributing cash to the cash-storage receptacles, and means for locking the machine from operation when a cash-storage receptacle is empty or nearly so.

205. In a machine of the character described, a change-making and combined purchase-check and cash ejecting mechanism, said mechanism adapted when operated to eject the change between the value of the check or checks ejected and the value of the coin inserted in the machine, mechanism controlled by the diameter of the coin inserted for controlling the operation of said change-making and combined purchase-check and cash ejecting mechanism, combined with a cash-storage receptacle associating with said ejecting mechanism, and indicating mechanism for indicating when said receptacle is empty or nearly so, means for locking the machine from operation when the cash-receptacle is empty or nearly so, and operating means for said mechanisms.

206. In a machine of the character described, storage-receptacles for the checks and cash, a change-making and combined purchase-check and cash ejecting mechanism, said mechanism adapted to eject a check or checks and cash from said receptacles and further adapted when operated to eject the change between the value of the check or checks ejected and the value of the coin inserted in the machine, a locking mechanism for locking the machine when a receptacle is empty or nearly so, an indicating mechanism for indicating a nearly-empty receptacle, a controlling mechanism for said combined purchase-check and cash ejecting mechanism, and operating means for said mechanisms.

207. In a machine of the character described, storage-receptacles for the checks and cash, a change-making and combined purchase-check and cash ejecting mechanism, said mechanism adapted to eject a check or checks and cash from said receptacles and further adapted when operated to eject the change between the value of the check or checks ejected and the value of the coin inserted in the machine, a locking mechanism for locking the machine when a receptacle is empty or nearly so, an indicating mechanism for indicating a nearly-empty receptacle, a controlling mechanism for said combined purchase-check and cash ejecting mechanism, a registering mechanism, and operating means for said mechanisms.

208. A change-making and cash-ejecting mechanism comprising cash-ejectors, pendent levers for operating said ejectors, and shiftable combs for controlling the said levers.

209. A change-making and cash-ejecting mechanism comprising cash-ejectors, pendent levers for operating said ejectors, shiftable combs for controlling the said levers.

210. A change-making and cash-ejecting mechanism having pendent levers for operating cash-ejectors, and combs for controlling the operation of the levers.

In testimony whereof I have hereunto set my hand in presence of two subscribing witnesses.

EDWIN HUDSON SPEAR.

Witnesses:
   A. NUTTING,
   FREDK. L. RAND.